US012739162B2

(12) United States Patent
Panwar et al.

(10) Patent No.: US 12,739,162 B2
(45) Date of Patent: Sep. 15, 2026

(54) TECHNIQUES FOR ACTIVATION TRIGGERING USING TIME-SERIES BASED EVENT DATA

(71) Applicant: Microsoft Technology Licensing, LLC, Redmond, WA (US)

(72) Inventors: Abhilash Panwar, Redmond, WA (US); Clemens Alden Szyperski, Bellevue, WA (US); James Douglas Hutton, London (GB); John Te-Jui Sheu, Bellevue, WA (US); Luca Colantonio, Redmond, WA (US); Maxim Kiryushin, London (GB); Pawel Mateusz Chodarcewicz, Redmond, WA (US); Phanidhar Gopavaram, Redmond, WA (US); William Charles Thompson, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/332,428

(22) Filed: Jun. 9, 2023

(65) Prior Publication Data

US 2024/0291708 A1 Aug. 29, 2024

Related U.S. Application Data

(60) Provisional application No. 63/487,609, filed on Feb. 28, 2023.

(51) Int. Cl.

*H04L 41/0631* (2022.01)
*G06F 11/07* (2006.01)
(Continued)

(52) U.S. Cl.

CPC ...... *H04L 41/0631* (2013.01); *G06F 11/0784* (2013.01); *G06F 11/3058* (2013.01);
(Continued)

(58) Field of Classification Search

CPC ............................ H04L 41/0631; H04L 41/22
See application file for complete search history.

(56) References Cited

U.S. PATENT DOCUMENTS

| | | | | |
|---|---|---|---|---|
| 8,560,611 | B2 * | 10/2013 | Martinez ................ | G05B 15/02 709/204 |
| 9,516,053 | B1 | 12/2016 | Muddu et al. | |

(Continued)

FOREIGN PATENT DOCUMENTS

| | | | |
|---|---|---|---|
| WO | 2016032986 | A1 | 3/2016 |

OTHER PUBLICATIONS

Buddhika, et al., "Living on the Edge", ACM Transactions on internet of things, vol. 2, Issue 3, Jul. 8, 2021, pp. 1-31.

(Continued)

*Primary Examiner* — Joe Chacko
(74) *Attorney, Agent, or Firm* — ArentFox Schiff LLP

(57) ABSTRACT

Aspects of the present disclosure relate to detecting occurrence of triggers related to properties of objects indicated in event data in a discoverable event stream. These techniques may include identifying a namespace associated with an activation trigger, and identifying a plurality of time-series based objects of a discoverable event stream associated with the namespace. The techniques may further include determining that an activation rule is met over the plurality of time-series based objects. Additionally, the techniques may include transmitting an activation trigger event to an activation component, the activation trigger event including a generic activation identifier identifying an action to perform, and an actor identifier identifying an actor to perform the action.

20 Claims, 31 Drawing Sheets

(51) Int. Cl.
*G06F 11/30* (2006.01)
*G06F 16/2455* (2019.01)
*G06F 16/2458* (2019.01)
*G06F 16/26* (2019.01)
*H04L 41/22* (2022.01)

(52) U.S. Cl.
CPC .... *G06F 11/3075* (2013.01); *G06F 16/24568* (2019.01); *G06F 16/2474* (2019.01); *G06F 16/26* (2019.01); *H04L 41/22* (2013.01)

(56) References Cited

U.S. PATENT DOCUMENTS

| | | | |
|---|---|---|---|
| 9,798,830 | B2 | 10/2017 | Imaki et al. |
| 10,514,966 | B2 | 12/2019 | Alfred et al. |
| 10,558,516 | B2 | 2/2020 | Leverich et al. |
| 10,762,097 | B1 | 9/2020 | Porath |
| 10,936,585 | B1 | 3/2021 | Echeverria et al. |
| 11,042,454 | B1 | 6/2021 | Jain et al. |
| 11,055,273 | B1 | 7/2021 | Meduri et al. |
| 11,269,808 | B1 | 3/2022 | Yuan et al. |
| 11,341,150 | B1 | 5/2022 | Ganesan |
| 11,397,752 | B1 | 7/2022 | Goyal et al. |
| 11,461,347 | B1 | 10/2022 | Das |
| 11,487,762 | B2 | 11/2022 | May et al. |
| 11,803,562 | B2 | 10/2023 | Sarma et al. |
| 11,818,156 | B1 | 11/2023 | Parikh et al. |
| 11,847,038 | B1 | 12/2023 | Jha et al. |
| 11,853,317 | B1 | 12/2023 | Goyal |
| 12,028,208 | B1 | 7/2024 | Hsiao et al. |
| 2003/0172151 | A1 | 9/2003 | Schade |
| 2004/0073720 | A1 | 4/2004 | Clough et al. |
| 2007/0203816 | A1 | 8/2007 | Costache et al. |
| 2008/0215546 | A1 | 9/2008 | Baum et al. |
| 2009/0018994 | A1 | 1/2009 | Hajdukiewicz |
| 2009/0292877 | A1 | 11/2009 | Piper |
| 2011/0131588 | A1 | 6/2011 | Allam et al. |
| 2012/0148088 | A1 | 6/2012 | Mital et al. |
| 2013/0262369 | A1 | 10/2013 | Guanwardana et al. |
| 2014/0095483 | A1 | 4/2014 | Toillion et al. |
| 2014/0095535 | A1 | 4/2014 | Deshmukh |
| 2014/0095541 | A1* | 4/2014 | Herwadkar ......... G06F 16/2474 707/774 |
| 2014/0149444 | A1 | 5/2014 | Pompey |
| 2015/0149507 | A1 | 5/2015 | Imaki |
| 2015/0186434 | A1 | 7/2015 | Eichinger |
| 2015/0199413 | A1 | 7/2015 | Brown |
| 2015/0293954 | A1 | 10/2015 | Hsiao et al. |
| 2015/0295778 | A1 | 10/2015 | Hsiao et al. |
| 2015/0295779 | A1 | 10/2015 | Ching et al. |
| 2015/0295780 | A1 | 10/2015 | Hsiao et al. |
| 2015/0295796 | A1 | 10/2015 | Hsiao et al. |
| 2015/0317363 | A1 | 11/2015 | Manzano Macho et al. |
| 2015/0324439 | A1 | 11/2015 | Bhave |
| 2015/0341212 | A1 | 11/2015 | Hsiao |
| 2015/0363464 | A1 | 12/2015 | Alves |
| 2016/0019266 | A1 | 1/2016 | Katsunuma |
| 2016/0054952 | A1 | 2/2016 | Mathur |
| 2016/0063080 | A1* | 3/2016 | Nano .................... G06F 16/254 707/602 |
| 2016/0070430 | A1 | 3/2016 | Kim et al. |
| 2016/0070451 | A1 | 3/2016 | Kim et al. |
| 2016/0085810 | A1 | 3/2016 | De Castro Alves |
| 2016/0127180 | A1 | 5/2016 | Shcherbakov et al. |
| 2016/0127401 | A1 | 5/2016 | Chauhan et al. |
| 2016/0127517 | A1 | 5/2016 | Shcherbakov et al. |
| 2016/0210332 | A1 | 7/2016 | Milton |
| 2016/0224899 | A1 | 8/2016 | Nguyen |
| 2016/0359910 | A1 | 12/2016 | Chen et al. |
| 2016/0359940 | A1 | 12/2016 | Chen et al. |
| 2017/0060947 | A1 | 3/2017 | Zhang |
| 2017/0083175 | A1 | 3/2017 | Layman |
| 2017/0124151 | A1 | 5/2017 | Ji et al. |
| 2017/0177546 | A1 | 6/2017 | Heinz et al. |
| 2017/0201606 | A1 | 7/2017 | Ding |
| 2018/0004812 | A1 | 1/2018 | Shawver et al. |
| 2018/0074856 | A1 | 3/2018 | Park |
| 2018/0075125 | A1 | 3/2018 | Stiel |
| 2018/0089205 | A1 | 3/2018 | Soora |
| 2018/0107530 | A1 | 4/2018 | Gupta |
| 2018/0181537 | A1 | 6/2018 | Crabtree et al. |
| 2018/0218046 | A1* | 8/2018 | Woo .................. G06F 16/24564 |
| 2018/0253468 | A1 | 9/2018 | Gurajada et al. |
| 2018/0268003 | A1 | 9/2018 | Barsness |
| 2018/0314740 | A1 | 11/2018 | Van Osten |
| 2018/0357267 | A1 | 12/2018 | Zenger et al. |
| 2019/0028506 | A1 | 1/2019 | Rodriguez |
| 2019/0095510 | A1 | 3/2019 | Cruise |
| 2019/0102431 | A1 | 4/2019 | Bishnoi et al. |
| 2019/0102791 | A1 | 4/2019 | Park |
| 2019/0124105 | A1 | 4/2019 | Chauhan et al. |
| 2019/0138641 | A1 | 5/2019 | Pal |
| 2019/0138967 | A1 | 5/2019 | Akella |
| 2019/0146970 | A1 | 5/2019 | Chamieh |
| 2019/0155804 | A1 | 5/2019 | Miller et al. |
| 2019/0155809 | A1 | 5/2019 | Shankar |
| 2019/0171748 | A1 | 6/2019 | Duffield |
| 2019/0294598 | A1* | 9/2019 | Hsiao ...................... G06F 16/22 |
| 2019/0303385 | A1 | 10/2019 | Ching et al. |
| 2020/0320005 | A1 | 10/2020 | Shulman |
| 2020/0412810 | A1* | 12/2020 | Knight .................... H04L 69/18 |
| 2021/0004144 | A1 | 1/2021 | Burke |
| 2021/0019292 | A1 | 1/2021 | Kholodkov et al. |
| 2021/0026888 | A1 | 1/2021 | Pang |
| 2021/0049797 | A1 | 2/2021 | Cervelli et al. |
| 2021/0081373 | A1 | 3/2021 | Tian |
| 2021/0117384 | A1 | 4/2021 | Leite et al. |
| 2021/0124786 | A1 | 4/2021 | Bursik |
| 2021/0157811 | A1 | 5/2021 | Wang |
| 2021/0191769 | A1 | 6/2021 | Eschinger |
| 2021/0311834 | A1 | 10/2021 | Sapuntzakis |
| 2021/0365449 | A1 | 11/2021 | Ha et al. |
| 2021/0397616 | A1 | 12/2021 | Iranmanesh |
| 2022/0030066 | A1 | 1/2022 | Govindaraju |
| 2022/0058174 | A1 | 2/2022 | Lemberg et al. |
| 2022/0100763 | A1 | 3/2022 | Sen et al. |
| 2022/0121689 | A1 | 4/2022 | James |
| 2022/0147518 | A1 | 5/2022 | Schindlauer et al. |
| 2022/0198263 | A1 | 6/2022 | Guo et al. |
| 2022/0292021 | A1 | 9/2022 | Bitincka |
| 2023/0048668 | A1 | 2/2023 | Danilov et al. |
| 2023/0134030 | A1 | 5/2023 | Zhou |
| 2023/0401466 | A1 | 12/2023 | Zhao |
| 2024/0039954 | A1 | 2/2024 | Shete et al. |
| 2024/0070233 | A1 | 2/2024 | Blackburn |
| 2024/0078221 | A1 | 3/2024 | Song |
| 2024/0289244 | A1 | 8/2024 | Panwar et al. |
| 2024/0289336 | A1 | 8/2024 | Panwar et al. |
| 2024/0289337 | A1 | 8/2024 | Szyperski |
| 2024/0289347 | A1 | 8/2024 | Panwar et al. |
| 2024/0289714 | A1 | 8/2024 | Panwar et al. |
| 2025/0151126 | A1 | 5/2025 | Yin et al. |
| 2026/0032013 | A1 | 1/2026 | Danielson et al. |
| 2026/0037537 | A1 | 2/2026 | Dhenia et al. |

OTHER PUBLICATIONS

International Search Report and Written Opinion received for PCT Application No. PCT/US2024/016446, May 17, 2024, 13 pages.

International Search Report and Written Opinion received for PCT Application No. PCT/US2024/016573, Jun. 5, 2024, 15 pages.

International Search Report and Written Opinion received for PCT Application No. PCT/US2024/016580, Jun. 5, 2024, 12 pages.

International Search Report and Written Opinion received for PCT Application No. PCT/US2024/016590, Jun. 6, 2024, 13 pages.

Invitation to pay additional fees received for PCT Application No. PCT/US2024/016587 May 29, 2024, 13 pages.

Levy, Eran, "Batch, Stream, and Micro-batch Processing: A Cheat Sheet Upsolver", Retrieved from the URL: https://web.archive.org/web/20221207202218/https://www.upsolver.com/blog/batch-stream-a-cheat-sheet, Dec. 7, 2022, 6 Pages.

Non-Final Office Action mailed on May 3, 2024, in U.S. Appl. No. 18/332,523, 15 pages.

(56) References Cited

OTHER PUBLICATIONS

Etzion, et al., "Event Processing in Action," Retrieved from URL: https://web.archive.org/web/20190711095302if/ http://www-di.inf.puc-rio.br:80/-endler/courses/RT-Analytics/transp/Books/Event%20Processing%20in%20Action.pdf, Jul. 11, 2019, pp. 1-386.
International Search Report and Written Opinion received for PCT Application No. PCT/US2024/016455, Jul. 18, 2024, 15 pages.
International Search Report and Written Opinion received for PCT Application No. PCT/US2024/016587, mailed on Jul. 22, 2024, 22 pages.
International Search Report and Written Opinion received for PCT Application No. PCT/US2024/016789, Jul. 2, 2024, 15 pages.
International Search Report and Written Opinion received for PCT Application No. PCT/US2024/016968, mailed on Jul. 29, 2024, 10 pages.
Non-Final Office Action mailed on Aug. 1, 2024, in U.S. Appl. No. 18/332,502, 37 pages.
Non-Final Office Action mailed on Jul. 31, 2024, in U.S. Appl. No. 18/332,316, 12 pages.
Non-Final Office Action mailed on Jun. 11, 2024, in U.S. Appl. No. 18/332,301, 18 pages.
Grund, et al., "HYRISE—A Main Memory Hybrid Storage Engine", Proceedings of the VLDB Endowment, vol. 4, Issue No. 2, Nov. 2010, pp. 105-116.
Non-Final Office Action mailed on Oct. 9, 2024, in U.S. Appl. No. 18/332,523, 25 pages.
Non-Final Office Action mailed on Sep. 30, 2024, in U.S. Appl. No. 18/332,312, 19 pages.
Final Office Action mailed on Nov. 22, 2024, in U.S. Appl. No. 18/332,502, 39 pages.
Non-Final Office Action mailed on Oct. 23, 2024, in U.S. Appl. No. 18/332,316, 12 pages.
Final Office Action mailed on Dec. 13, 2024, in U.S. Appl. No. 18/332,301, 19 Pages.
Final Office Action mailed on Mar. 19, 2025, in U.S. Appl. No. 18/332,523, 25 pages.
Non-Final Office Action mailed on Mar. 25, 2025, in U.S. Appl. No. 18/332,466, 17 pages.
Notice of Allowance mailed on Mar. 13, 2025, in U.S. Appl. No. 18/332,502 13 pages.
Penchikala, Srini, "Big Data Processing with Apache Spark—Part 3: Spark Streaming", Retrieved from URL: https://www.infoq.com/articles/apache-spark-streaming/, Jan. 7, 2016, 17 pages.
Final Office Action mailed on Apr. 22, 2025, in U.S. Appl. No. 18/332,316, 15 pages.
Final Office Action mailed on May 22, 2025, in U.S. Appl. No. 18/332,312, 15 pages.
Golab Lukasz, "Sliding Window Query Processing over Data Streams", 2006, 180 pages.
Notice of Allowance mailed on Apr. 28, 2025, in U.S. Appl. No. 18/332,301, 15 pages.
Kim, et al., "A Review of Window Query Processing for Data Streams", Journal of Computing Science and Engineering, Dec. 2013, vol. 7, No. 4, pp. 220-230.
Non-Final Office Action mailed on Jul. 29, 2025, in U.S. Appl. No. 18/332,523, 28 pages.
Notice of Allowance mailed on Aug. 4, 2025, in U.S. Appl. No. 18/332,316, 9 pages.
Notice of Allowance mailed on Jun. 24, 2025, in U.S. Appl. No. 18/332,502, 14 pages.
Armstrong, et al., "LinkBench: a database benchmark based on the Facebook social graph", In Proceedings of the Acm Sigmod International Conference on Management of Data, Jun. 2013, pp. 1185-1196.
Final Office Action mailed on Oct. 1, 2025, in U.S. Appl. No. 18/332,466, 36 pages.
International Preliminary Report on Patentability (Chapter 1) received for PCT Application No. PCT/US2024/016580), mailed on Sep. 11, 2025, 07 Pages.
International Preliminary Report on Patentability (Chapter I) received for PCT Application No. PCT/US2024/016455, Sep. 11, 2025, 09 pages.
International Preliminary Report on Patentability (Chapter I) received for PCT Application No. PCT/US2024/016587, Sep. 11, 2025, 15 pages.
International Preliminary Report on Patentability (Chapter I) received for PCT Application No. PCT/US2024/016590, Sep. 11, 2025, 7 pages.
International Preliminary Report on Patentability (Chapter I) received for PCT Application No. PCT/US2024/016968, Sep. 11, 2025, 7 pages.
International Preliminary Report on Patentability (Chapter I) received for PCT Application No. PCT/US2024/016446, mailed on Sep. 11, 2025, 8 pages.
International Preliminary Report on Patentability received for PCT Application No. PCT/US2024/016789, mailed on Sep. 11, 2025, 9 pages.
Notice of Allowance mailed on Aug. 26, 2025, in U.S. Appl. No. 18/332,301, 14 pages.
Notice of Allowance mailed on Nov. 10, 2025, in U.S. Appl. No. 18/332,502, 14 Pages.
Notice of Allowance mailed on Oct. 15, 2025, in U.S. Appl. No. 18/332,483, 12 Pages.
Notice of Allowance mailed on Oct. 23, 2025, in U.S. Appl. No. 18/332,316, 10 Pages.
Tulone, et al., "PAQ: Time Series Forecasting for Approximate Query Answering in Sensor Networks", Wireless Sensor Networks, 2006, 16 Pages.
International Preliminary Report on Patentability (Chapter I) received for PCT Application No. PCT/US2024/016573, mailed on Sep. 11, 2025, 9 Pages.
Georgiou, et al., "StreamSight: A Query-Driven Framework for Streaming Analytics in Edge Computing", 2018, 10 pages.
Notice of Allowance mailed on Jul. 20, 2026, in U.S. Appl. No. 18/332,483, 7 pages.
Ex Parte Quayle Action mailed on Apr. 30, 2026, in U.S. Appl. No. 18/332,483, 6 pages.
Notice of Allowance mailed on Apr. 29, 2026, in U.S. Appl. No. 18/332,301, 14 Pages.
Notice of Allowance mailed on Aug. 6, 2026, in U.S. Appl. No. 18/332,312, 29 pages.
Notice of Allowance mailed on Jun. 22, 2026, in U.S. Appl. No. 18/332,523, 19 Pages.
Notice of Allowance mailed on May 13, 2026, in U.S. Appl. No. 18/332,316, 11 pages.
Notice of Allowance mailed on Aug. 4, 2026, in U.S. Appl. No. 18/332,316, 9 pages.
Notice of Allowance mailed on Jun. 9, 2026, in U.S. Appl. No. 18/332,502, 11 pages.
Non-Final Office Action mailed on Jan. 16, 2026, in U.S. Appl. No. 18/332,312, 14 pages.
Notice of Allowance mailed on Jan. 21, 2026, in U.S. Appl. No. 18/332,523, 20 Pages.
Notice of Allowance mailed on Mar. 4, 2026, in U.S. Appl. No. 18/332,316, 10 pages.
Notice of Allowance mailed on Mar. 9, 2026, in U.S. Appl. No. 18/332,502, 11 Pages.
Notice of Allowance mailed on Mar. 10, 2026, in U.S. Appl. No. 18/332,483, 07 Pages.
Notice of Allowance mailed on Mar. 13, 2026, in U.S. Appl. No. 18/332,301, 14 Pages.
Bozkurt et al., "Utilizing Flink and Kafka Technologies for Real-Time Data Processing: A Case Study", 2023, The Eurasia Proceedings of Science, Technology, Engineering & Mathematics (EPSTEM), Vo.I 24, p. 177-183.
Non-Final Office Action mailed on Mar. 26, 2026, in U.S. Appl. No. 18/332,466, 20 pages.

* cited by examiner

1300

OBTAIN AN INDICATION OF A QUERY TO BE EXECUTED OVER A TIME WINDOW IN A DISCOVERABLE EVENT STREAM — 1302

EXECUTE THE QUERY OVER THE TIME WINDOW OF EVENT DATA IN THE DISCOVERABLE EVENT STREAM TO IDENTIFY INSTANCES OF THE EVENT DATA RELATED TO AN OBJECT AND BASED ON A VALUE OF A PROPERTY CORRESPONDING TO THE OBJECT THAT IS INDICATED IN THE INSTANCES OF THE EVENT DATA — 1304

OBTAIN, FROM THE EVENT DATA AND BASED ON THE QUERY INCLUDING A FUNCTION TO PERFORM AN OPERATION USING THE VALUE OF THE PROPERTY, A LAST OCCURRING INSTANCE OF THE INSTANCES OF THE EVENT DATA TO USE IN PERFORMING THE FUNCTION — 1310

EXECUTE THE QUERY OVER A SUBSET OF EVENT DATA TO PROVIDE A REPRESENTATIVE SAMPLE OF THE INSTANCES OF THE EVENT DATA — 1312

CREATE, BASED ON THE INSTANCES OF EVENT DATA IDENTIFIED FROM THE DISCOVERABLE EVENT STREAM, A NEW EVENT FOR ADDING TO THE DISCOVERABLE EVENT STREAM — 1306

ADD THE NEW EVENT TO THE DISCOVERABLE EVENT STREAM INCLUDING APPLYING A TIMESTAMP TO THE NEW EVENT IN THE DISCOVERABLE EVENT STREAM — 1308

EXECUTE A MANAGEMENT POLICY FOR THE EVENT DATA BASED ON ONE OR MORE PARAMETERS OF THE QUERY — 1314

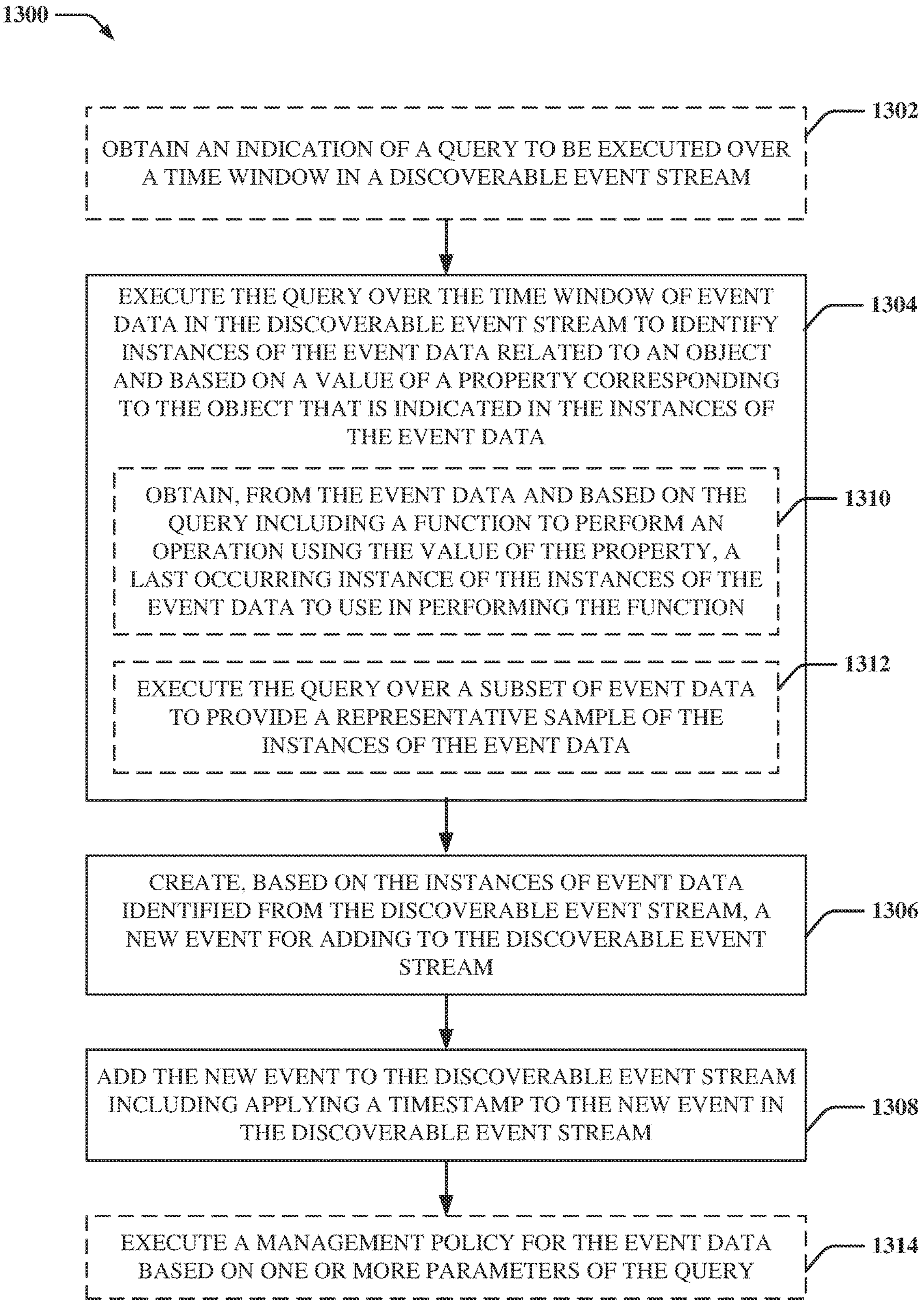

Figure 13

| Event ID | Event time | Freezer ID | Interior temperatu.. | Ambient temperat.. | Interior humidity | Ambient humidity | Status code | Store ID | Filler 1 | Filler 2 | Filler 3 | Filler 4 |
|---|---|---|---|---|---|---|---|---|---|---|---|---|
| 3210012 | 11:58:32 PM 11.29... | 1171 | 00.00 | 69.21 | 00.00 | 00.00 | 0000 | 122 | sample | 123 | 0000xyz | name |
| 3210011 | 11:52:21 PM 11.29... | 2145 | 00.12 | 68.13 | 00.00 | 00.00 | 0000 | 150 | sample | 123 | 0000xyz | name |
| 3210010 | 11:51:02 PM 11.29... | 1078 | 00.04 | 68.11 | 00.00 | 00.00 | 0000 | 023 | sample | 123 | 0000xyz | name |
| 3210009 | 11:46:88 PM 11.29... | 0977 | 00.32 | 68.08 | 00.00 | 00.00 | 0000 | 057 | sample | 123 | 0000xyz | name |
| 3210008 | 11:45:12 PM 11.29... | 1673 | 00.00 | 67.14 | 00.00 | 00.00 | 0000 | 391 | sample | 123 | 0000xyz | name |
| 3210007 | 11:45:04 PM 11.29... | 0332 | 00.00 | 69.00 | 00.00 | 00.00 | 0000 | 077 | sample | 123 | 0000xyz | name |
| 3210006 | 11:42:77 PM 11.29... | 0117 | 00.92 | 72.37 | 00.00 | 00.00 | 0000 | 107 | sample | 123 | 0000xyz | name |
| 3210005 | 11:37:39 PM 11.29... | 3756 | 01.51 | 68.01 | 00.00 | 00.00 | 0000 | 322 | sample | 123 | 0000xyz | name |
| 3210004 | 11:35:52 PM 11.29... | 1845 | 15.04 | 70.56 | 00.00 | 00.00 | 1001 | 279 | sample | 123 | 0000xyz | name |
| 3210003 | 11:33:76 PM 11.29... | 0383 | 00.10 | 72.68 | 00.00 | 00.00 | 0000 | 212 | sample | 123 | 0000xyz | name |
| 3210002 | 11:32:32 PM 11.29... | 2536 | 00.17 | 70.10 | 00.00 | 00.00 | 0000 | 186 | sample | 123 | 0000xyz | name |
| 3210001 | 11:31:39 PM 11.29... | 1004 | 01.78 | 67.32 | 00.00 | 00.00 | 0000 | 097 | sample | 123 | 0000xyz | name |
| 3210000 | 11:31:33 PM 11.29... | 0672 | 00.00 | 71.31 | 00.00 | 00.00 | 0000 | 092 | sample | 123 | 0000xyz | name |
| 3209999 | 11:30:11 PM 11.29... | 0007 | 07.83 | 69.77 | 00.00 | 00.00 | 1001 | 249 | sample | 123 | 0000xyz | name |
| 3209998 | 11:29:89 PM 11.29... | 3745 | 30.34 | 82.72 | 00.00 | 00.00 | 3333 | 088 | sample | 123 | 0000xyz | name |
| 3209997 | 11:28:72 PM 11.29... | 1268 | 03.62 | 67.58 | 00.00 | 00.00 | 1001 | 117 | sample | 123 | 0000xyz | name |
| 3209996 | 11:27:66 PM 11.29... | 1017 | 01.00 | 69.43 | 00.00 | 00.00 | 0000 | 147 | sample | 123 | 0000xyz | name |
| 3209995 | 11:25:73 PM 11.29... | 2899 | 00.57 | 76.11 | 00.00 | 00.00 | 0000 | 231 | sample | 123 | 0000xyz | name |
| 3209994 | 11:24:44 PM 11.29... | 2034 | 02.71 | 67.09 | 00.00 | 00.00 | 0000 | 267 | sample | 123 | 0000xyz | name |
| 3209993 | 11:22:17 PM 11.29... | 0056 | 22.99 | 84.56 | 00.00 | 00.00 | 3333 | 336 | sample | 123 | 0000xyz | name |
| 3209992 | 11:21:49 PM 11.29... | 0103 | 00.00 | 58.13 | 00.00 | 00.00 | 0000 | 112 | sample | 123 | 0000xyz | name |
| 3209991 | 11:21:11 PM 11.29... | 3104 | 00.99 | 68.57 | 00.00 | 00.00 | 0000 | 009 | sample | 123 | 0000xyz | name |
| 3209990 | 11:20:02 PM 11.29 | 0776 | 00.01 | 67.53 | 00.00 | 00.00 | 0000 | 111 | sample | 123 | 0000xyz | name |

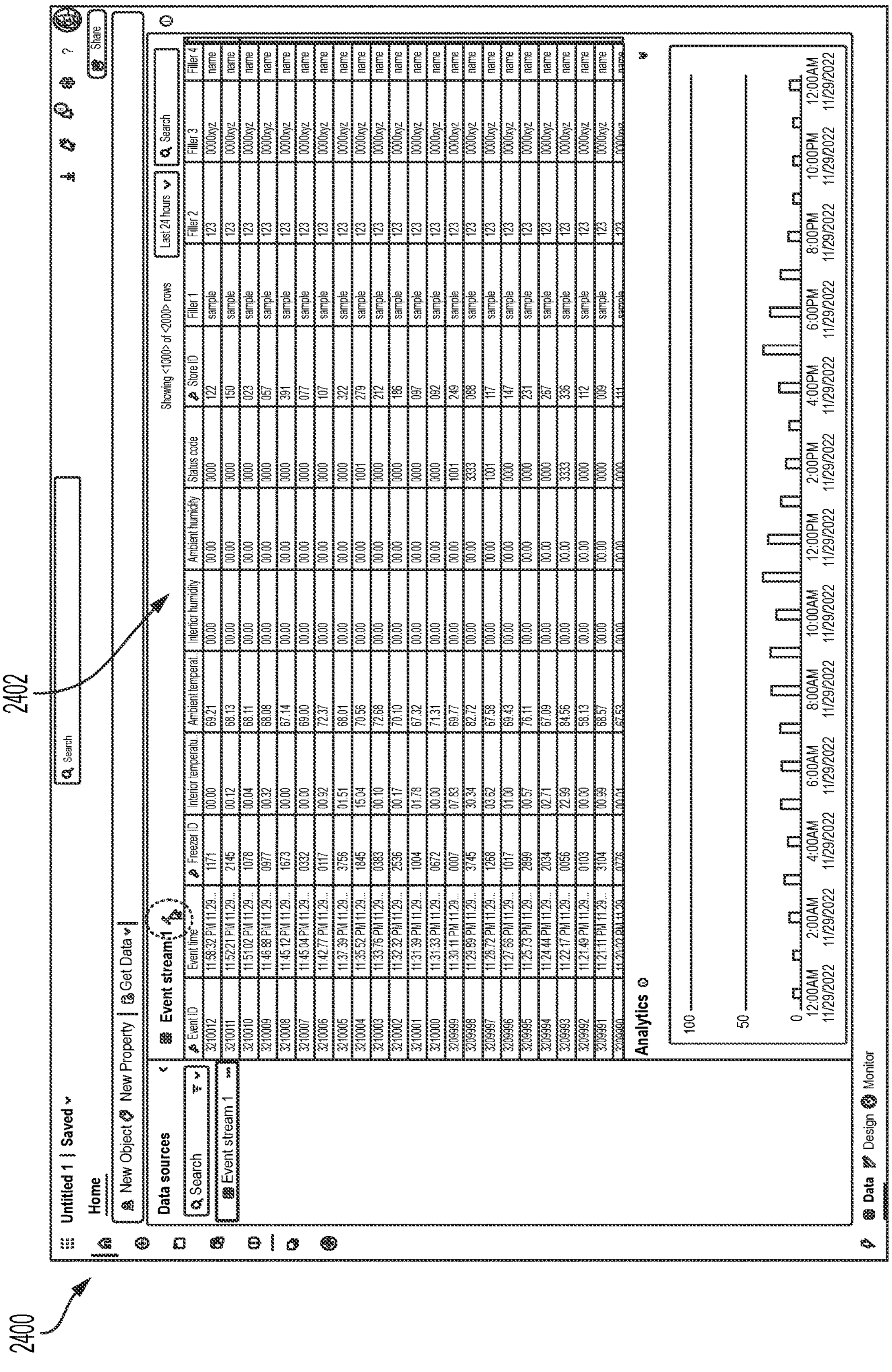

Figure 24

TECHNIQUES FOR ACTIVATION TRIGGERING USING TIME-SERIES BASED EVENT DATA

CLAIM OF PRIORITY

The present Application for Patent claims priority to Provisional Patent Application No. 63/487,609, entitled "TECHNIQUES FOR MANAGING TIME-SERIES BASED EVENT DATA" filed Feb. 28, 2023, which is assigned to the assignee hereof and hereby expressly incorporated by reference herein for all purpose.

BACKGROUND

Connected systems can include a vast number of interconnected devices that may be relevant to an organization, which may include various computing devices, Internet-of-Things (IoT) devices, factory automation devices, sensors, etc. Event data for connected systems can originate from many different sources, and the sources of data may not communicate with, or be compatible with, one another. Many vendors offer complex, custom-built software for collecting event data from various sources or devices, analyzing the data to detect potential issues, and reporting the issues for resolution. Such software is often provided in a platform as a service (PaaS) implementation. This software, however, is complex and specific to an architecture of connected devices, associated software, etc., of an organization, and is not able to be integrated with other organizations.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an example, a computer-implemented method or apparatus may include one or more of the following.

A method comprising: receiving an activation trigger event via a discoverable event stream, the activation trigger event including a generic activation identifier and an actor identifier; generating, based on the generic activation identifier and the actor identifier, an activation instruction event for causing an action associated with the generic activation identifier at an actor corresponding to the actor identifier; configuring, based on the activation trigger event, the activation instruction event to trigger the action at the actor; and transmitting the activation instruction event to the actor based on the actor identifier.

An apparatus, comprising: a memory; and a processor coupled with the memory and configured to: receive an activation trigger event via a discoverable event stream, the activation trigger event including a generic activation identifier and an actor identifier; generate, based on the generic activation identifier and the actor identifier, an activation instruction event for causing an action associated with the generic activation identifier at an actor corresponding to the actor identifier; configure, based on the activation trigger event, the activation instruction event to trigger the action at the actor; and transmit the activation instruction event to the actor based on the actor identifier.

A method comprising: identifying one or more time-series events of a discoverable event stream that triggered an activation rule; determining explainability information based on the one or more time-series events, the explainability information identifying an importance value of the one or more time-series events; and presenting the explainability information via a graphical user interface.

An apparatus, comprising: a memory; and a processor coupled with the memory and configured to: identify one or more time-series events of a discoverable event stream that triggered an activation rule; determine explainability information based on the one or more time-series events, the explainability information identifying an importance value of the one or more time-series events; and present the explainability information via a graphical user interface.

A method comprising: identifying a namespace associated with an activation trigger; identifying a plurality of time-series based objects of a discoverable event stream associated with the namespace; determining that an activation rule is met over the plurality of time-series based objects; and transmitting an activation trigger event to an activation component, the activation trigger event including a generic activation identifier identifying an action to perform, and an actor identifier identifying an actor to perform the action.

An apparatus, comprising: a memory; and a processor coupled with the memory and configured to: identify a namespace associated with an activation trigger; identify a plurality of time-series based objects of a discoverable event stream associated with the namespace; determine that an activation rule is met over the plurality of time-series based objects; and transmit an activation trigger event to an activation component, the activation trigger event including a generic activation identifier identifying an action to perform, and an actor identifier identifying an actor to perform the action.

Additionally, other aspects may include a non-transitory computer readable medium storing instructions configured to perform one or any combination of the above-noted methods. Further aspects may include an apparatus including a means for performing one or any combination of the above-noted methods To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a flowchart of an example of a method for adding event data to a discoverable event stream, in accordance with aspects described herein.

FIG. 24 illustrates an example of a UI that may be displayed based on a query, in accordance with aspects described herein.

DETAILED DESCRIPTION

Figure 1:
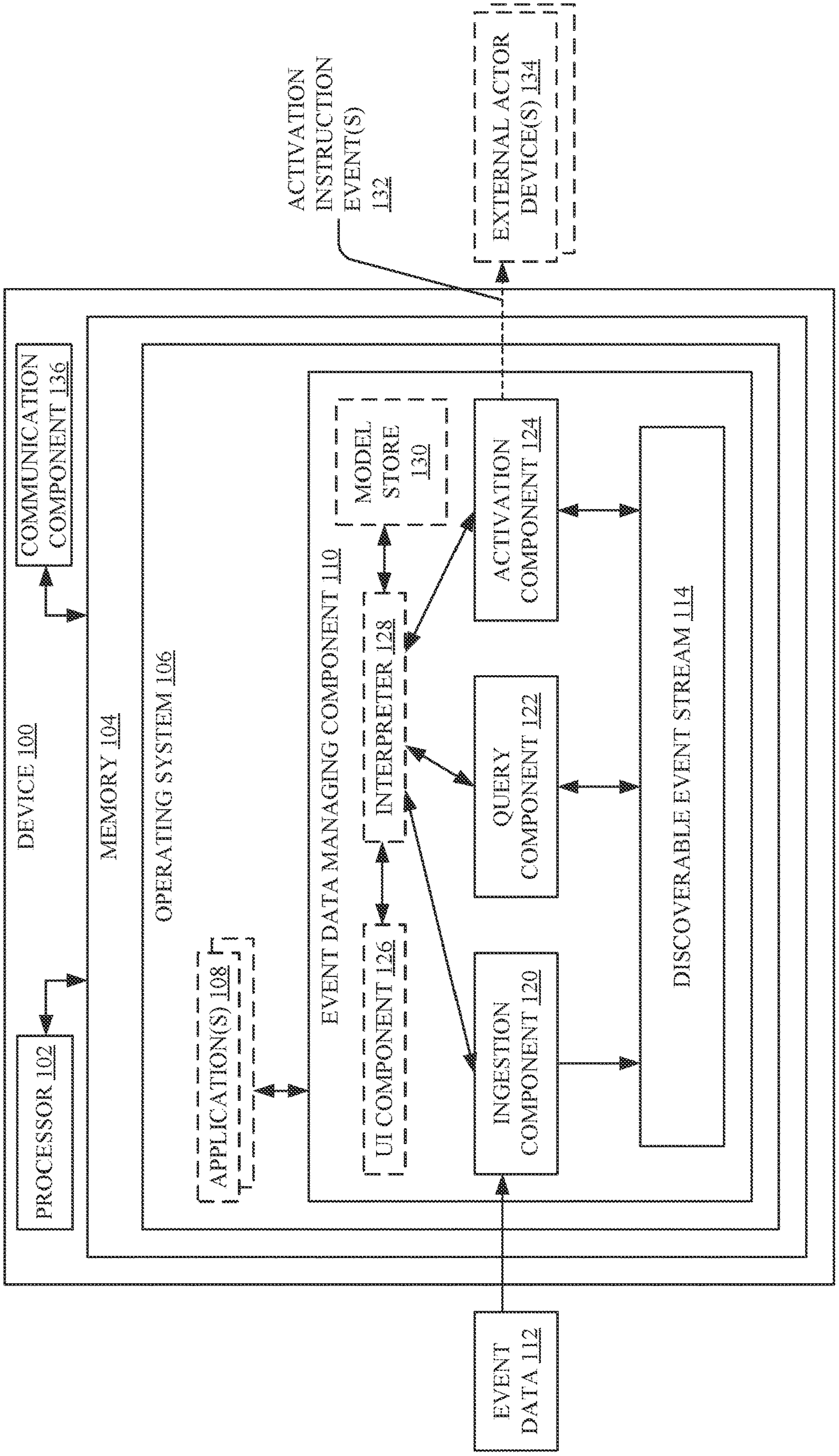
FIG. 1 is a schematic diagram of an example of a device for performing functions related to managing event data, in accordance with aspects described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to a system for managing event data from multiple event data sources, which can, in some examples, be controlled by an event data managing component. As used herein, "event data" includes time-series data, also referred to as a stream of data. The system may include multiple streams, which together may be referred to as a "river" of event data. In other words, the system includes a river of one or more time-series events of a discoverable event stream. For example, the examples described herein can apply to, and be used in, connected systems having various devices connected to one or more networks and reporting or recording events (e.g., in an event log). As indicated by reference to a "time-series" of events, the events can have a temporal property, such that the events occur a certain points in time. Events from a multitude of sources, such as computers, Internet-of-Things (IoT) devices, factory automation devices, sensors, etc., can be collected and ingested into a discoverable event stream that defines the time-series events of a discoverable event stream, where one or more of such event streams defines at least a portion of the river of discoverable, time-series-based event data.

In accordance with some aspects of the present disclosure, an activation component may be configured to activate target systems based on observations identified within a river. For example, the activation component may monitor activation of a system of action and trigger actions at a diverse collection of target systems. Some examples of follow actions include causing outgoing communications, executing a configured workflow, and providing data to an operational store. Accordingly, the present invention provides advantages over existing systems which do not to bridge systems of intelligence, systems of detection, and systems of action, and thus fail to efficiently drive system action based on streaming event information.

The event data managing component includes an ingestion component configured to receive one or more discoverable event streams, e.g., event data associated with one or more time-series events of a discoverable event stream. For example, the ingestion component can ingest the event data based on one or more filters or instructions to filter out certain events from the event data (e.g., from event logs) for ingesting into the discoverable event stream. In one example, events to be published to the discoverable event stream can be defined (e.g., by or using the event data managing component). In this regard, the discoverable event stream can include events from multiple sources as the events occur in time.

In addition, the event data managing component can include a query component configured to query the discoverable event stream. In an example, the query component executes queries that can monitor the discoverable event stream to detect occurrence of certain events, for instance, where each query is a defined query for certain events or other event-based logic. Based on query results, in some examples, additional event data can be added to the discoverable event stream. For example, the query results and/or additional event data can initiate or define trigger events that can cause certain actions to be performed based on the event data.

Further, the event data managing component can include an activation component configured to detect the trigger events and initiate one or more actions to be performed by one or more connected systems. The one or more connected systems may be local to and/or associated with, or remote from and/or independent from, the system for managing event data and/or the event data managing component. For example, the activation component can initiate an email, text message, or other notification to be issued to an administrator or other person or system that can operate or manage objects for which event data is provided.

Moreover, the event data managing component can also provide a user interface that allows for defining such queries, which may include a scripting language interpreter that parses and formulates queries from script language syntax.

In sum, the event data managing component can allow for one or more of defining a schema that can specify data to be ingested into the discoverable event stream, querying the discoverable event stream for certain event data, defining actions to be performed when the certain event data is detected, adding associated activation trigger events to the discoverable event stream, optionally adding data to the discoverable event stream that causes the actions to be performed, detecting the added data that defines the actions to be performed, performing the actions, etc.

FIG. 1 is a schematic diagram of an example of a device 100 (e.g., a computing device) for performing functions related to managing event data. In an example, device 100 can include a processor 102 and/or memory 104 configured to execute or store instructions or other parameters related to providing an operating system 106, which can execute one or more applications or processes. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component), and/or the like. In another example, processor 102 can include multiple processors of one or more devices (e.g., distributed devices, including cloud-based processing capabilities) and/or memory 104 can include multiple memories of one or more devices (e.g., distributed devices, including cloud-based memory resources). Memory 104 may store instructions, parameters, data structures, etc. for use/execution by processor 102 to perform functions described herein.

In one example, the operating system 106 can execute one or more applications 108 or processes, such as, but not limited to, an event data managing component 110, other applications 108 that can interact with the event data managing component 110, etc. For example, event data managing component 110 can receive event data 112 for various sources (not shown), such as computing devices, Internet-of-Things (IoT) devices, factory automation devices, sensors, etc., which may be connected via a network and/or relate to an organization. In one example, event data managing component 110 can receive the event data 112 directly from a data source connection (e.g., via one or more networks or cloud-based storage), from memory 104 where the event data 112 is stored by or otherwise provided to), from an event hub that gathers and stores event data received from the various sources (e.g., via one or more networks or cloud-based storage), from memory 104 where the event data 112 is stored by or otherwise provided to the device 100 for storage, etc.

In an example, event data managing component 110 can manage a discoverable event stream 114 based on the event data 112. For example, event data managing component 110 can include an ingestion component 120 for ingesting a portion of the event data 112 as time series data into the discoverable event stream 114, which may be based on one or more defined schemas defining fields or properties to be ingested and/or added for certain events in event data 112, a query component 122 for querying the discoverable event stream 114 for certain events based on one or more criteria and/or adding data to the discoverable event stream 114 to cause certain actions based on the queries, and/or an activation component 124 for monitoring the discoverable event stream 114 for action data added by the query component 122 and/or transmitting one or more activation instruction events 132 to one or more external actor devices 134 based on the detected actions. In some examples, the discoverable event stream 114 may be referred to herein as a "River," and the query component 122 can be referred to herein as a "Riverhouse."

Optionally, for example, event data managing component 110 may include a user interface (UI) component 126 for providing an interface for defining queries to manage the discoverable event stream 114, and/or an interpreter 128 to parse or otherwise compile the queries for performing via one or more of the ingestion component 120, query component 122, or activation component 124.

In an example, UI component 126 can provide the interface as a graphical user interface (GUI) to allow for generating models for shaping the event data, which can be stored in model store 130. For example, UI component 126 can allow a user to generate multiple stacked visual representations of the event data to indicate how the event data is to be ingested into the discoverable event stream 114, to indicate one or more functions to be performed on the data to create an associated model that may be achieved by executing one or more queries on the event data, further transforming the event data, adding event data back to the discoverable event stream, monitoring the discoverable event stream for added event data, which may include event data that triggers activation trigger events, etc., as described herein. In an example, UI component 126 can translate created visual representations into queries and/or a script of commands (that may include queries) that the query component 122 can interpret and use to execute corresponding queries over the discoverable event stream 114 at certain times to trigger activation trigger events, as described further herein. In another example, UI component 126 can provide an input box for entering the script of commands and/or corresponding queries.

In an example, the script of commands or queries can include functions performed on the event data in a scripting language syntax for specifying query commands or other commands that may cause ingestion component 120 to ingest certain event data 112 into the discoverable event stream 114 according to a schema, query component 122 to query the discoverable event stream 114 for certain events, activation component 124 to add an activation trigger event to the discoverable event stream 114, etc. In another example, the syntax can allow for specifying query commands to perform, by the activation component 124, the actions based on the detected action data from the discoverable event stream 114. Interpreter 128 can interpret the queries for executing via query component 122 and can cause query component 122 to execute the queries of the model to shape the event data and/or insert corresponding activation trigger events into the discoverable event stream 114. This may be based on a periodic interval (which may be indicated in the model or queries), based on detecting occurrence of certain events in the discoverable event stream 114, etc.

Further, device 100 may include a communications component 136 that provides for establishing and maintaining communications with one or more other devices, parties, entities, etc. utilizing hardware, software, and services as described herein. Communications component 136 may carry communications between components on device 100, as well as between device 100 and external devices, such as devices located across a wired or wireless communications network and/or devices serially or locally connected to device 100. For example, communications component 136 may include one or more buses, and may further include transmit chain components and receive chain components associated with one or more types of wireless or wired transmitters and receivers (or a transceivers) or modems, respectively, operable for interfacing with external devices.

Figure 2:
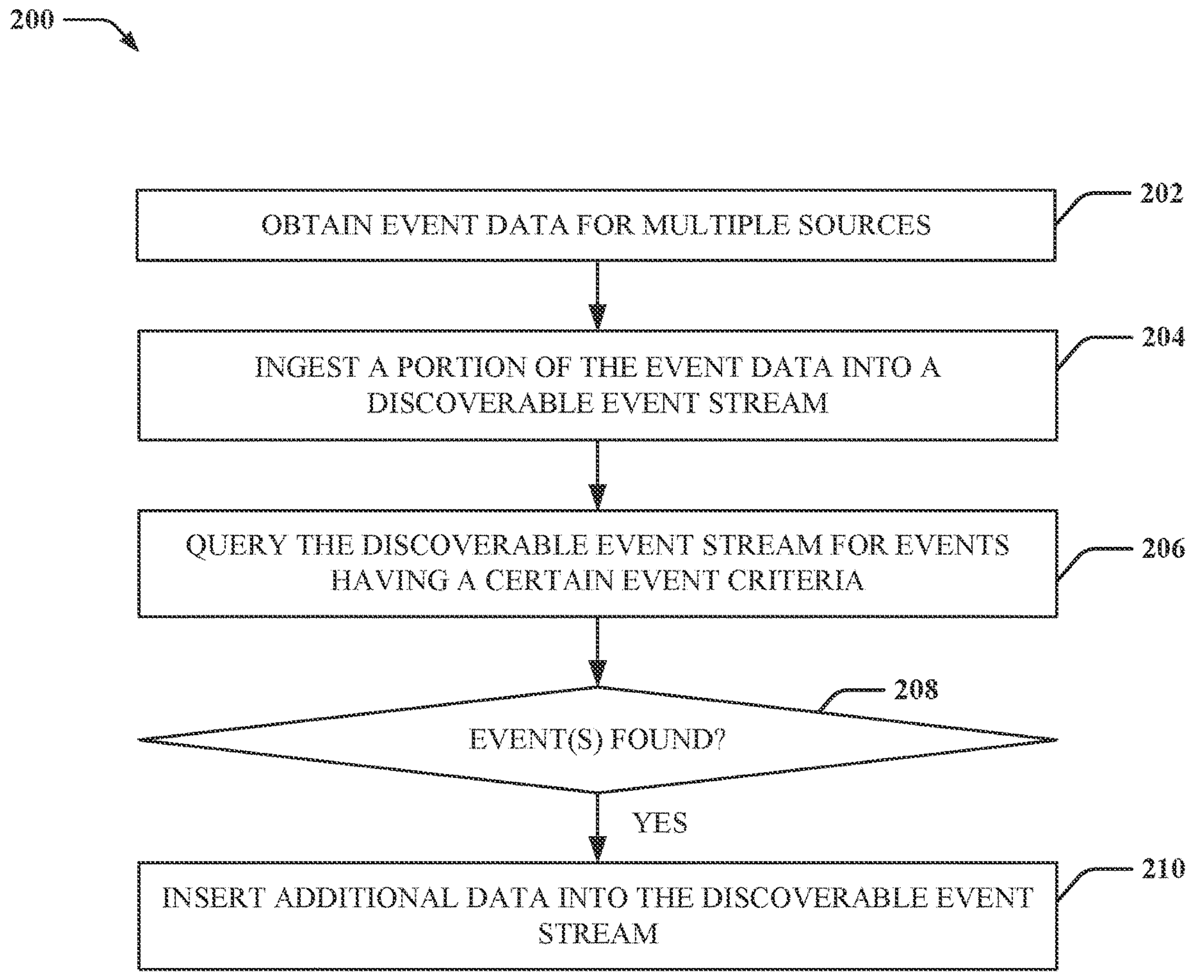
FIG. 2 is a flow diagram of an example of a method for providing an indication of incentive-based resource allocation, in accordance with aspects described herein.

FIG. 2 is a flowchart of an example of a method 200 for managing event data. For example, method 200 can be performed by a device 100 and/or one or more components thereof to facilitate management of event data from multiple sources.

In method 200, at action 202, event data can be obtained from multiple sources. In an example, event data managing component 110, e.g., in conjunction with processor 102, memory 104, operating system 106, etc., can obtain the event data 112 from multiple sources. For example, event data managing component 110 can receive the event data 112 from the multiple sources or from an event hub that stores event data 112 from the multiple sources. In an example, event data managing component 110 can query the sources or event hub for the event data 112 or can otherwise subscribe to or receive events published by the sources or event hub. As described, for example, the device 100 may be coupled to the sources or event hub via one or more networks, and in some examples, the sources or event hub may be accessible via, or may publish event data 112 to, cloud-based storage from which the event data managing component 110 can obtain the event data 112.

For example, the event data 112 can be of substantially any granularity, and can include various events and types of events from a given source. The event data can include, for example, parameter values of a device or sensor, events occurring at a device or sensor that are to be written to an event log, etc., and can be periodically stored event data (e.g., in an event log) or stored based on occurrence of a detected event, etc. In addition, the event data 112 can have a temporal property, such that the event data 112 defines a status, parameter value(s), event occurring, etc. at the sensor or device at a point in time. In this regard, the event data 112 can be ordered, or orderable (e.g., based on a timestamp) according to time.

In method 200, at action 204, a portion of the event data can be ingested into a discoverable event stream. In an example, ingestion component 120, e.g., in conjunction with processor 102, memory 104, operating system 106, event data managing component 110, etc., can ingest the portion of the event data 112 into the discoverable event stream 114. For example, ingestion component 120 can select or filter the event data 112 to be ingested based on one or more queries defined by or via the event data managing component 110. In one specific example, UI component 126 can provide the UI to allow for specifying, e.g., via a scripting language, commands for ingesting certain event data 112 into the discoverable event stream 114. For example, the scripting language can allow specifying of types of sources for which event data is to be ingested, types or corresponding criteria of event data to be ingested, etc. In this example, interpreter 128 can interpret the scripting language to parse the commands and generate models or other executable query instructions, which may be stored in model store 130 or otherwise executed via ingestion component 120. In an example, ingestion component 120 can ingest the event data 112 based on or while otherwise maintaining a temporal property of the event data 112 being ingested (e.g., in a temporal order, based on an associated timestamp, etc.).

In another example, ingestion component 120 can ingest the event data 112 according to a common schema that can include some fields that are added to the event data 112 from any source, such as an object identifier, a timestamp, an indicator of one or more properties of the object, etc. For example, ingestion component 120 can map the object identifier to a field of the event data 112, where the mapping may be specified by a user via UI component 126 or otherwise automatically selected by ingestion component 120 (e.g., as a field relating to an identifier or have a certain proportion of unique values, etc.). Similarly, for example, ingestion component 120 can map one or more of the other fields in the event data 112 as properties of the object in ingesting the event data 112 into the discoverable event stream 114.

In method 200, at action 206, the discoverable event stream can be queried for events having a certain event criteria. In an example, query component 122, e.g., in conjunction with processor 102, memory 104, operating system 106, event data managing component 110, etc., can query the discoverable event stream 114 for events having certain event criteria. For example, query component 122 can monitor the discoverable event stream 114 for events that have the certain event criteria, such as a namespace, an object type, a value or value range of a property of the object, etc. The event criteria for monitoring can be specified by one or more queries. For example, as described, UI component 126 can provide the UI to allow for specifying queries for the events having the certain criteria. In addition, the queries can define new event data to be written to the discoverable event stream 114 when the events with the certain criteria are located. In an example, a given query can specify event criteria to be observed over a period of time in the discoverable event stream 114, one or more different event criteria for a given event or multiple events, etc.

In method 200, at action 208, it can be determined if event(s) having the certain event criteria are found in the discoverable event stream, and if so, at action 210, additional data can be inserted into the discoverable event stream. In an example, query component 122, e.g., in conjunction with processor 102, memory 104, operating system 106, event data managing component 110, etc., can determine if or when event(s) having the certain event criteria are found in the discoverable event stream 114, and can insert additional data into the discoverable event stream for located event(s). For example, query component 122 can query the discoverable event stream 114 for one or more queries, which may occur periodically (e.g., based on a period specified in the queries), based on detecting an event, based on ingestion of event data into the discoverable event stream 114, etc. In an example, the additional data can specify an action to be performed based on locating the event(s), such as an activation trigger event for a reporting or alert command, an additional value for the property, such as an intermediate result for executing an intermediate query or other optimizations, etc., as described further herein.

Figure 3:
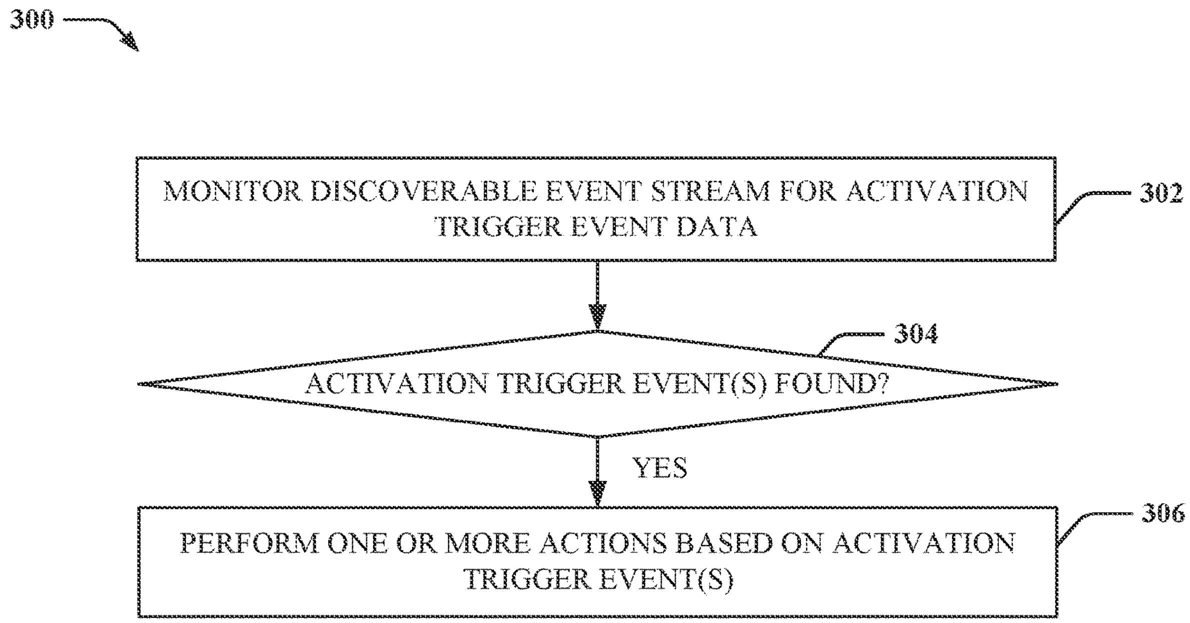
FIG. 3 is a flowchart of an example of a method for performing actions based on event data, in accordance with aspects described herein.

FIG. 3 is a flowchart of an example of a method 300 for performing actions based on event data. For example, method 300 can be performed by a device 100 and/or one or more components thereof to facilitate performing of actions based on the event data from multiple sources.

In method 300, at action 302, a discoverable event stream can be monitored for activation trigger event data. In an example, activation component 124, e.g., in conjunction with processor 102, memory 104, operating system 106, event data managing component 110, etc., can monitor the discoverable event stream 114 for activation trigger event data. As described, for example, query component 122 can insert additional data, which may include activation trigger events, into the discoverable event stream 114 where events having certain criteria are identified in the discoverable event stream 114. In an example, activation component 124 can monitor the discoverable event stream 114 periodically, based on occurrence of an event, etc. For example, the activation trigger event data may be labeled as action data in the discoverable event stream 114 or may otherwise include an indication of an action to be performed, such as reporting or alerting of a detected event or event data in discoverable event stream 114. For example, the action data may cause an email or pop-up alert to be sent to a user (e.g., by command an associated application to send the email or pop-up alert, etc.), a rectification action such as resetting of a device, and/or the like.

In method 300, at action 304, it can be determined if activation trigger events(s) are found in the discoverable event stream, and if so, at action 306, one or more actions can be performed based on the activation trigger event(s). In an example, activation component 124, e.g., in conjunction with processor 102, memory 104, operating system 106, event data managing component 110, etc., can determine if or when activation trigger events(s) are found in the discoverable event stream 114, and can perform one or more actions based on the activation trigger events. For example, the activation trigger events data may indicate an action to be performed, certain parameter values for the action or associated reporting, alerting, etc. In an example, activation component 124 can accordingly perform the actions, or cause the actions to be performed, based on the activation trigger event(s). In one specific example, UI component 126 can provide the UI to allow for specifying the actions to be performed when certain event data is detected, parameters to be specified in the activation trigger event, etc. For example, the scripting language can allow specifying of types of actions that can be performed, variables representing parameters to be included in performing the actions, etc. In this example, interpreter 128 can interpret the scripting language to parse the commands and generate models for performing the actions when action data is encountered in the discoverable event stream 114.

Ingestion Component Examples

Figure 4:
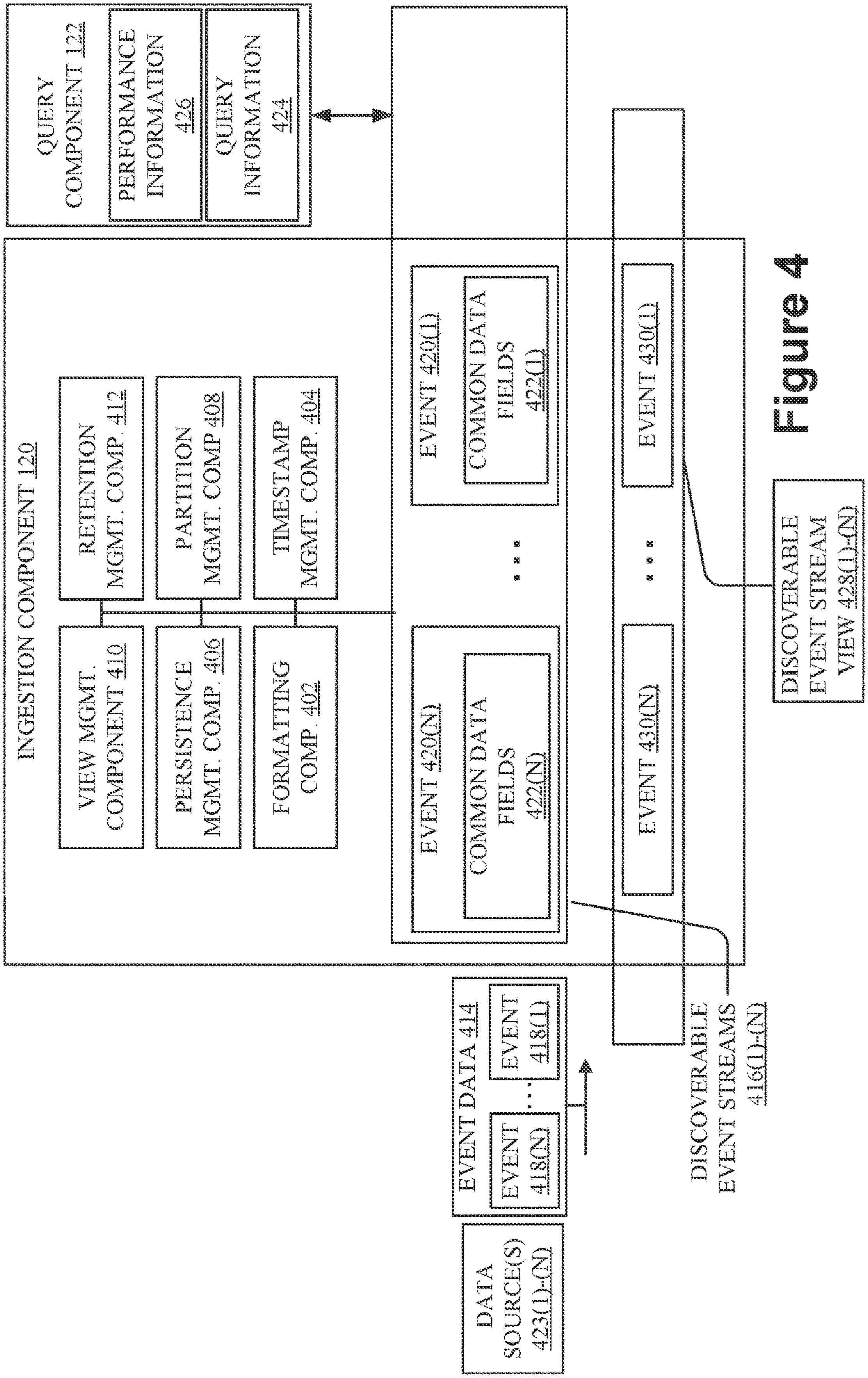
FIG. 4 illustrates an example of an ingestion component in accordance with aspects described herein.
Figure 5:
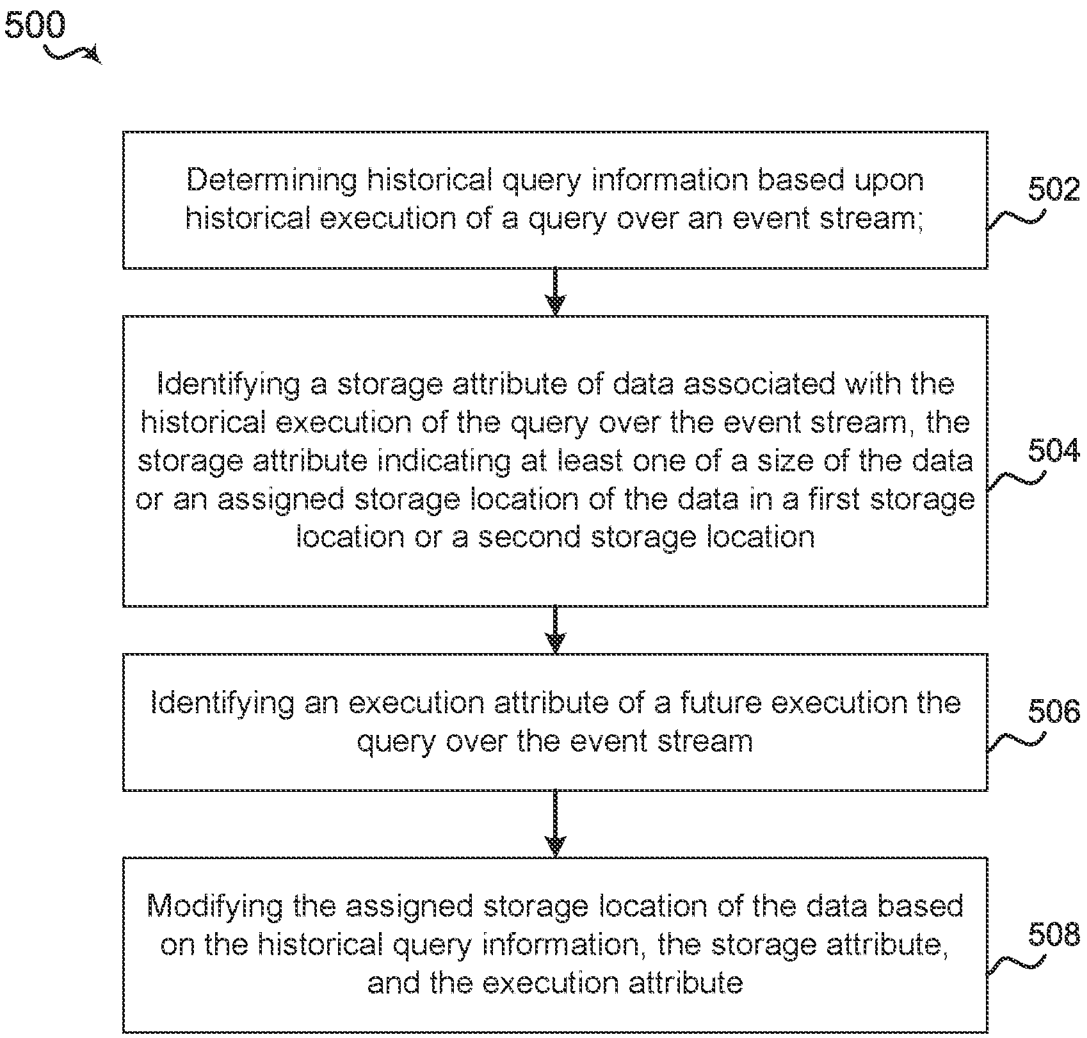
FIG. 5 is a flowchart of an example of a method for managing storage of event data in a multi-tiered system of a discoverable event stream, in accordance with aspects described herein.

As illustrated in FIG. 4, in one implementation, the ingestion component 120 includes a formatting component 402, a timestamp management component 404, a persistence management component 406, a partition management component 408, a view management component 410, and a retention management component 412. As described in detail herein, in some aspects, the ingestion component 120 is configured to ingest event data 414 (e.g., the event data 112) into a discoverable event stream 416 (e.g., the discoverable event stream 114) and manage the schema, contents, and metadata of the discoverable event stream 416.

In some aspects, the discoverable event stream 416 is an abstraction of a multi-tiered storage system that can include one or more levels of hot row store (e.g., non-persistent cache layers) and one or more layers of a cold store (e.g., persistent storage) for storing the ingested version of the event data 112, which serves to optimize performance of the system. Further, in some aspects, the ingestion component 120 appends the ingested data to the discoverable event stream 416 and does not update the contents of the multi-tiered storage system. In addition, in some aspects, deletion of data from the discoverable event stream 416 is restricted to the removal of expired data as described with respect to the retention management component 412 or compliance with a regulatory requirement (e.g. the General Data Protection Regulation (GDPR)).

The formatting component 402 is configured to format the event data 414 as the discoverable event stream 416. For example, in some aspects, the formatting component 402 receives an event 418 of the event data 414 and outputs an event 420 to the discoverable event stream 416. In some aspects, the formatting component 402 standardizes the event data 414 by adding one or common data fields 422 to the events 418 to generate the event 420. In some aspects, the common data fields 422 include an event identifier identifying an event 420, a name of the event 420, a first timestamp indicating the time of occurrence of the event 420, a source identifier identifying a source of the event 420, a second timestamp indicating the arrival time of the event 420 of the event data 414 corresponding to the event 418 at the ingestion component 120, and and/or a tenant identifier identifying a tenant of a multi-tenant system associated with the event 418. In some aspects, the common data fields 422 provide discoverability, time-series compatibility, resiliency, and reliability features to the discoverable event stream 416 within the event data managing component 110. For example, the common data fields 422 provide a global association between an object or instance identifier and a timestamp to account for the temporal property of the data.

In some instances, one or more values of the common data fields 422 are determined from the corresponding event 418. For instance, the value of a source field of the event 420 may be determined from the value of a source field of the event 418. As an example, in some aspects, the formatting component 402 receives a first event 418 of a pre-processed event stream (e.g., the event data 414), the first event including a plurality of event data fields representing the first event 418. As a result, the formatting component 402 generates one or more common data fields 422 based at least in part on the data fields of the event 418, the one or more common data fields 422 shared across a plurality of discoverable event streams 416 having different data sources 423. Further, the formatting component 402 generates a second event 420 of a discoverable event stream 416 corresponding to the pre-processed event stream based on combining the plurality of event data fields of the event 418 and the one or more common data fields 422.

In some aspects, the formatting component 402 validates the fields of an event 418 before using the values of the fields within an event 420 of the discoverable event stream 416. For example, the formatting component 402 employs the timestamp management component 404 to validate and/or determine timestamp information for the time-based fields of the common data fields 422. For example, in some aspects, the timestamp management component 404 utilizes a local clock to determine the arrival time of an event 418 for the arrival time field of the event 420. As another example, the timestamp management component 404 determines whether a timestamp of the event 418 is a valid time of occurrence that will be used as the first timestamp of the common data field 422. In some aspects, the timestamp management component 404 utilizes other events 418 within the event data 414 and/or other events 420 within the discoverable event stream 416 to determine the validity of timestamp information within the event 418. For example, if the timestamp management component 404 identifies that an event 418(2) depends on the occurrence of an event 418(1) and the timestamp for the timestamp for the event 418(2) is earlier than the timestamp for the event 418(2), the timestamp management component 404 determines that the timestamps for the events 418(1)-(2) are invalid. Further, in some aspects, the timestamp management component 404 determines valid timestamp information for an events 418 (1)-(2) of the discoverable event stream 416 corresponding to the events 418(1)-(2) of the event data 414. In some aspects, the timestamp management component 404 infers the correct timing information for an event 420. For example, in some aspects, the timestamp management component 404 employs one or more machine learning and/or pattern recognition techniques to determine valid timestamp information for the common data fields 422. In some examples, a machine learning technique may infer the valid timestamp information based on event periodicity information, event source, and other attributes of the events 418.

In some aspects, the timestamp management component 404 corrects clock skew of a source of one or more events 418. For example, in some aspects, a source of one or more events 418 includes a client application and/or client library that provides timing information independent of a system clock of the source. Further, in some aspects, the timestamp management component 404 computes a correction value based on first timing information provided by the system clock of the source that indicates a time of occurrence of an event, and the second timing information provided by the client application that indicates a time of occurrence of an event. Further, the timestamp management component 404 computes the correction value by subtracting the second timing information from the current timing information of the timestamp management component 404. In addition, the timestamp management component 404 applies the correction value to the first timing information to determine the corrected timing information to use within the event 420 of the discoverable event stream 416. In some instances, the client application transmits the timing information within header information of a communication including the event 418 of the event data 414. As another example, in some other aspects, the timestamp management component 404 corrects timing information based on a correction value calculated by subtracting the maximum of all event times received from the source from the local clock. This assumes that the event 418 with the largest event time value is the best approximation to the source's system time at the point of transmission to the ingestion component 120.

In some aspects, a group of fields of the event 420 may define an interface. Further, the fields of an event 420 may implement a predefined interface when the fields of the event 420 include the group of fields defining the interface. In some aspects, one or more consumers of the discoverable event stream 416 may be configured to perform processes on the required fields of the interface when receiving an event 420 that implements the interface. Further, in some aspects, the formatting component 402 may validate whether an event 420 meets the requirements of a predefined interface. Additionally, or alternatively, the formatting component 402 may indicate which interfaces are met by an event 420 within the metadata of the event 420. For example, in some aspects, consumers may subscribe to events 420 having particular tags or other types of metadata. As such, a formatting component 402 may tag an event as implementing a particular interface, and consumers configured to process the interface may receive the event 420 based on the tag.

The persistence management component 406 is configured to assign a storage location to the data of the events 420 of the discoverable event stream 416. For example, once the formatting component generates an event 420, the persistence management component 406 determines the storage location of the event 420 during a storage lifecycle of the event 420. In order to improve efficiency, the use of the hot row store and the cold store can be based on a balance between updating data and organizing data. In some aspects, the bulk of the data can be stored on the cold store, which can include cheaper storage, and data that desired to be more readily available can be stored at least temporarily in the hot row store, which can be more expensive but provide faster access storage. Further, in some aspects, the persistence management component 406 determines a storage location for an event 420 based on query information 424 identifying the standing queries over the event 420 and/or the performance information 426 related to the execution of the standing queries, which may be defined in the query component 122.

As an example, in some aspects, the persistence management component 406 determines historical query information (e.g., the query information 424 and/or the performance information 426) based upon historical execution of a query over the discoverable event stream 416. Further, the persistence management component 406 identifies a storage attribute of data associated with the historical execution of the query over the discoverable event stream 416. In some aspects, the storage attribute includes at least one of a cost, a size of the data or an assigned storage location of the data in a first storage location or a second storage location. Further, the first storage location may be a first level of persistent storage or non-persistent storage, and the second storage location may be a second level of persistent storage or non-persistent storage. Additionally, the persistence management component 406 identifies an execution attribute of a future execution the query over the event stream. For instance, in some aspects, the persistence management component 406 identifies the date and/or time of the next execution of a query. In addition, in some aspects, the persistence management component 406 modifies the assigned storage location of the data based on the historical query information, the storage attribute, and/or the execution attribute. For instance, in some aspects, the persistence management component 406 assigns data associated with an object identifier that may be subject to an upcoming query that will be executed within a predefined period of time to a hot row store to improve query performance. Additionally, the data can be moved to a level of non-persistent storage after the query is executed. As such, the cache layers can be managed based on an understanding of the query execution by the query component 122.

The partition management component 408 is configured to implement data partitioning and/or indexing strategies over the data of the discoverable event streams 416. For example, in some aspects, the partition management component 408 determines and implements data partitioning and/or indexing strategies over the data of the discoverable event streams 416 based on the query information 424. In some instances, the data partitioning and/or indexing strategies involve proactively updating the one or more levels of hot row store with data that will be used for upcoming queries. Further, these data partitioning/indexing strategies may dynamic re-partition the data corresponding to the discoverable event stream 416 without user input. In some aspects, the dynamic re-partitioning of the data may involve breaking-up the incoming data so that the system can process it more efficiently. For instance, the dynamic re-partitioning may be based on one or any combination of: a query pattern, a size of data, query duration, and/or the expected time of occurrence. Moreover, the dynamic re-partitioning may analyze performance metrics of a query as represented in the performance information 426 and identify conditions where a previously "low cost" query (e.g., relatively higher allowed latency, relatively smaller processing resources needed, relatively small amounts of data) has become into a "high cost" query (e.g., relatively lower allowed latency, relatively larger processing resources needed, relatively larger amounts of data), and dynamically re-partition the data accordingly.

As an example, in some aspects, the persistence management component 406 determines historical query information (e.g., the query information 424 and/or the performance information 426) based upon historical execution of a query over the discoverable event stream 416. Further, the persistence management component 406 identifies a storage attribute of data associated with the historical execution of the query over the discoverable event stream 416. In some aspects, the storage attribute includes a cost associated with storage of the data, utilization value, overbooking value, a size of the data, or an assigned storage location of the data in a first storage location or a second storage location. Additionally, the persistence management component 406 determines that a query performance attribute is greater than a predefined threshold based on the historical query information and/or the storage attribute. For example, the persistence management component 406 may dynamically repartition a cluster resource (e.g., storage, memory, processing capacity) based at least in part on the query performance attribute being greater than the predefined threshold, the repartitioning modifying an assignment of a plurality of objects of the discoverable event stream to the cluster resource.

The view management component 410 is configured to create and/or manage views 428 over the discoverable event stream 416. In some aspects, a discoverable event stream 416 has one or more view definitions for the views 428 that each define small subsets of the discoverable event stream 416, which can be obtained by via executing a query over the discoverable event stream 416. In some aspects, a discoverable event stream view 428 is defined using a programming language, such as a domain specific language. In some instances, a view definition of a discoverable event stream view 428 includes the renaming and/or dropping of one or more fields of the over the discoverable event stream 416. In some other instances, a view definition includes one or more fields resulting from functions performed over fields of the discoverable event stream 416. Further, in some aspects, a discoverable event stream view 428 is consumable as a discoverable event stream 416.

As an example, in some aspects, the ingestion component 120 receives an event 420 of the discoverable event stream 416. Further, in some aspects, the event 420 includes a plurality of event data fields representing a first event. In addition, the view management component 410 identifies a discoverable event stream view 428 associated with an event data field of the plurality of event data fields. For instance, in some aspects, the view management component 410 utilizes a view definition to identify that a discoverable event stream view 428 is associated with one or more event data field of the plurality of event data fields of an event 418 of the discoverable event stream 416. Further, the view management component 410 generates an event 430 of the discoverable event stream view 428 by performing a query for an event data field via the query component 122 and applying modification to or computation on the event data field. For instance, in some aspects, the event 430 may include a field of the event 420 having an updated name, or the result of a function that receives the field and/or the value of the field of the event 420 as input.

In addition, in some aspects a view may be a potential view. In particular, a view can be defined but inactive until there is a demand for the view, thereby saving storage resources and processing resources on the system. In some aspects, the view management component 410 employs the metadata (e.g., symbolic links) to implement the potential view. Further, in some aspects, a potential view may become an active view (i.e., a discoverable event stream view 428) based on the query information 424, the performance information 426, and/or feedback information provided by users. In some aspects, each stream can be associated with an assumed level of consumption.

As an example, in some aspects, the view management component 410 generates a potential stream view of a discoverable event stream 416, the potential stream view defining a modification of an event data field of the discoverable event stream 416. For instance, in some aspects, the view management component 410 defines a potential view including over one or more event data fields of an event 420. In some aspects, a potential view is defined using a programming language and applies a modification or computation to the one or more event data fields of an event 420. Further, in some aspects, the view management component 410 activates a potential view to create a discoverable event stream view 428. In some aspects, the view management component 410 determines that a demand for the potential view is higher than predefined threshold, and activates the potential view. Additionally, in some aspects, the view management component 410 generates, based on the activating, during processing of the discoverable event stream 416, an event data field of the discoverable event stream view 428 by applying the modification to the event data field of the discoverable event stream. For instance, in some aspects, the view management component 410 generates an event 430 of the discoverable event stream view 428 by performing a query for an event data field via the query component 122 and applying modification to or computation on the event data field of the event 420. For instance, in some aspects, the event 430 may include a field of the event 420 having an updated name, or the result of a function that receives the field and/or the value of the field of the event 420 as input.

The retention management component 412 is configured to determine when potentially stale data should be removed from the discoverable event stream 416. In some aspects, the discoverable event stream 416 can define retention policies for retaining data in the discoverable event stream 416. For example, in some aspects, the retention management component 412 identifies data within the discoverable event stream 416 as potentially stale if the data is the oldest data in the discoverable event stream 416. However, in some aspects, the retention management component 412 retains potentially stale data based on current and historical query information (e.g., the query information 424 and/or the performance information 426). For example, the retention management component 412 may determine to retain potentially stale data based on the data being associated with a query that will be executed within a period of time less than a predefined amount. Additionally, in some aspects, the retention management component 412 determines a shortest retention period for data based on the query information 424 and the performance information 426 to allow for provide aggressive cache trimming/releasing to save storage resources and processing resources.

Referring to FIGS. 1 and 4-11, in operation, device 100 may perform one or any combination of methods 500, 600, 700, 800, 900, 1000, and 1100, such as via execution of ingestion component 120 by processor 102 and/or memory 104.

With regard to method 500 for management of event data storage in a multi-tiered system of a discoverable event stream, at block 502, the method 500 includes determining historical query information based upon historical execution of a query over an event stream. For example, in an aspect, computer device 100, processor 102, memory 104, ingestion component 120, and/or persistence management component 406 may be configured to or may comprise means for determining historical query information based upon historical execution of a query over an event stream. For instance, the determining at block 502 may be performed as described above and elsewhere herein.

At block 504, the method 500 includes identifying a storage attribute of data associated with the historical execution of the query over the event stream, the storage attribute indicating at least one of a size of the data or an assigned storage location of the data in a first storage location or a second storage location. For example, in an aspect, computer device 100, processor 102, memory 104, ingestion component 120, and/or persistence management component 406 may be configured to or may comprise means for identifying a storage attribute of data associated with the historical execution of the query over the event stream, the storage attribute indicating at least one of a size of the data or an assigned storage location of the data in a first storage location or a second storage location. For instance, the identifying at block 504 may be performed as described above and elsewhere herein.

At block 506, the method 500 includes identifying an execution attribute of a future execution the query over the event stream. For example, in an aspect, computer device 100, processor 102, memory 104, ingestion component 120, and/or persistence management component 406 may be configured to or may comprise means for identifying an execution attribute of a future execution the query over the event stream. For instance, the identifying at block 506 may be performed as described above and elsewhere herein.

At block 508, the method 500 includes modifying the assigned storage location of the data based on the historical query information, the storage attribute, and the execution attribute. For example, in an aspect, computer device 100, processor 102, memory 104, ingestion component 120, and/or persistence management component 406 may be configured to or may comprise means for modifying the assigned storage location of the data based on the historical query information, the storage attribute, and the execution attribute. For instance, the modifying at block 508 may be performed as described above and elsewhere herein.

Figure 6:
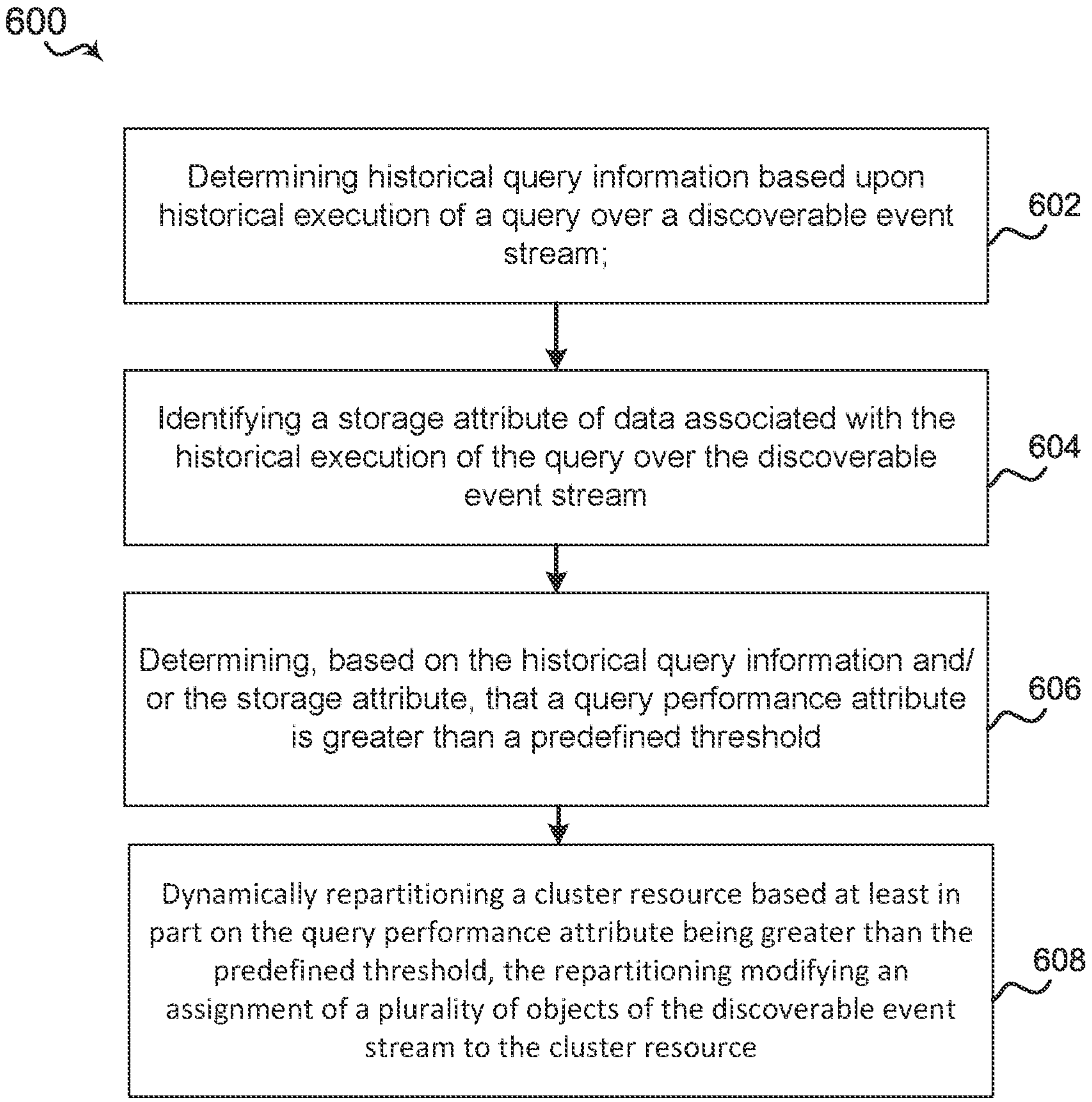
FIG. 6 is a flowchart of an example of a method for partitioning resources in a multi-tiered cluster system of a discoverable event stream, in accordance with aspects described herein.

Referring to FIG. 6, in operation of another aspect, device 100 may perform a method 600 for partitioning resources in a multi-tiered cluster system of a discoverable event stream, by such as via execution of ingestion component 120 by processor 102 and/or memory 104.

At block 602, the method 600 includes determining historical query information based upon historical execution of a query over a discoverable event stream. For example, in an aspect, computer device 100, processor 102, memory 104, ingestion component 120, and/or partition management component 408 may be configured to or may comprise means for determining historical query information based upon historical execution of a query over a discoverable event stream. For instance, the determining at block 602 may be performed as described above and elsewhere herein.

At block 604, the method 600 includes identifying a storage attribute of data associated with the historical execution of the query over the discoverable event stream. For example, in an aspect, computer device 100, processor 102, memory 104, ingestion component 120, and/or partition management component 408 may be configured to or may comprise means for identifying a storage attribute of data associated with the historical execution of the query over the discoverable event stream. For instance, the identifying at block 604 may be performed as described above and elsewhere herein.

At block 606, the method 600 includes determining, based on the historical query information and/or the storage attribute, that a query performance attribute is greater than a predefined threshold. For example, in an aspect, computer device 100, processor 102, memory 104, ingestion component 120, and/or partition management component 408 may be configured to or may comprise means for determining, based on the historical query information and/or the storage attribute, that a query performance attribute is greater than a predefined threshold. For instance, the determining at block 606 may be performed as described above and elsewhere herein.

At block 608, the method 600 includes dynamically repartitioning a cluster resource based at least in part on the query performance attribute being greater than the predefined threshold, the repartitioning modifying an assignment of a plurality of objects of the discoverable event stream to the cluster resource. For example, in an aspect, computer device 100, processor 102, memory 104, ingestion component 120, and/or partition management component 408 may be configured to or may comprise means for dynamically repartitioning a cluster resource based at least in part on the query performance attribute being greater than the predefined threshold, the repartitioning modifying an assignment of a plurality of objects of the discoverable event stream to the cluster resource. For instance, the dynamic repartitioning at block 608 may be performed as described above and elsewhere herein.

Figure 7:
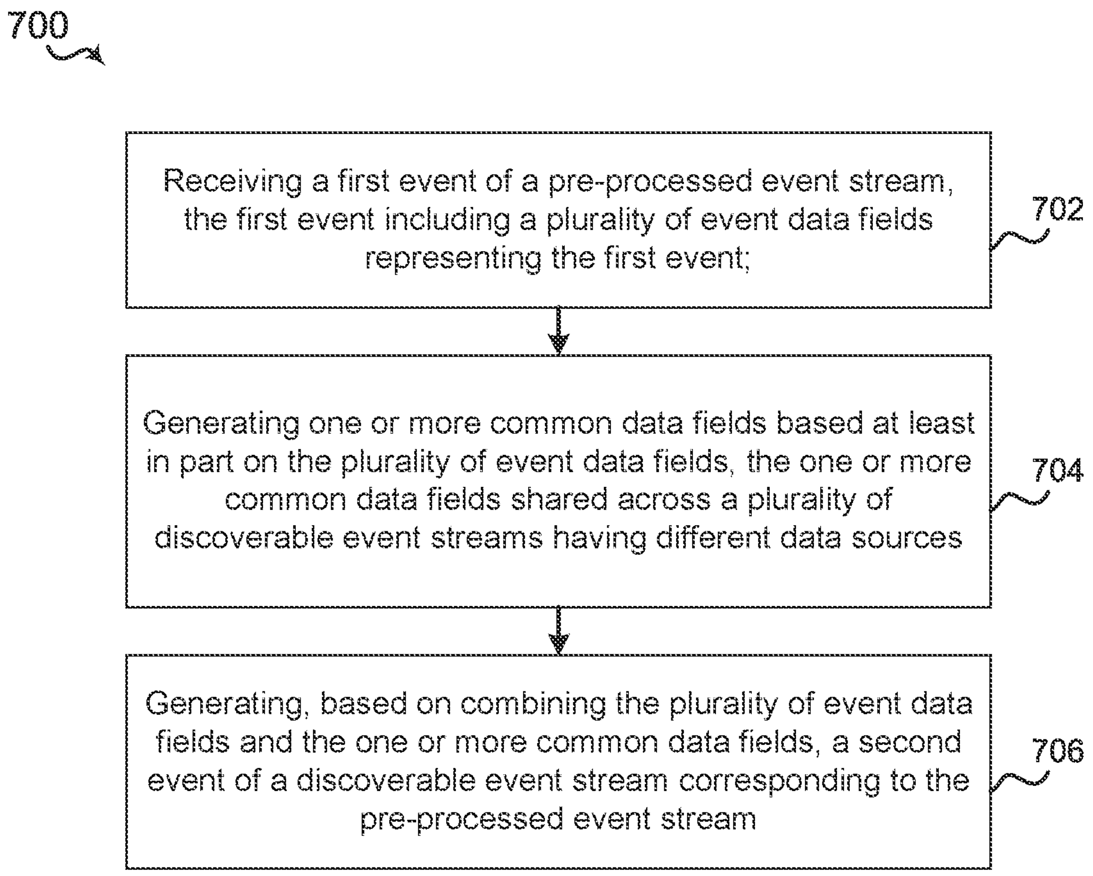
FIG. 7 is a flowchart of an example of a method for ingesting data into a discoverable event stream, in accordance with aspects described herein.

Referring to FIG. 7, in operation of another aspect, device 100 may perform a method 700 for ingesting data into a discoverable event stream, such as via execution of ingestion component 120 by processor 102 and/or memory 104.

At block 702, the method 700 includes receiving a first event of a pre-processed event stream, the first event including a plurality of event data fields representing the first event. For example, in an aspect, computer device 100, processor 102, memory 104, ingestion component 120, and/or formatting component 402 may be configured to or may comprise means for receiving a first event of a pre-processed event stream, the first event including a plurality of event data fields representing the first event. For instance, the receiving at block 702 may be performed as described above and elsewhere herein.

At block 704, the method 700 includes generating one or more common data fields based at least in part on the plurality of event data fields, the one or more common data fields shared across a plurality of discoverable event streams having different data sources. For example, in an aspect, computer device 100, processor 102, memory 104, ingestion component 120, and/or formatting component 402 may be configured to or may comprise means for generating one or more common data fields based at least in part on the plurality of event data fields, the one or more common data fields shared across a plurality of discoverable event streams having different data sources. For instance, the generating at block 704 may be performed as described above and elsewhere herein.

At block 706, the method 700 includes generating, based on combining the plurality of event data fields and the one or more common data fields, a second event of a discoverable event stream corresponding to the pre-processed event stream. For example, in an aspect, computer device 100, processor 102, memory 104, ingestion component 120, and/or formatting component 402 may be configured to or may comprise means for generating, based on combining the plurality of event data fields and the one or more common data fields, a second event of a discoverable event stream corresponding to the pre-processed event stream. For instance, the generating at block 706 may be performed as described above and elsewhere herein.

Figure 8:
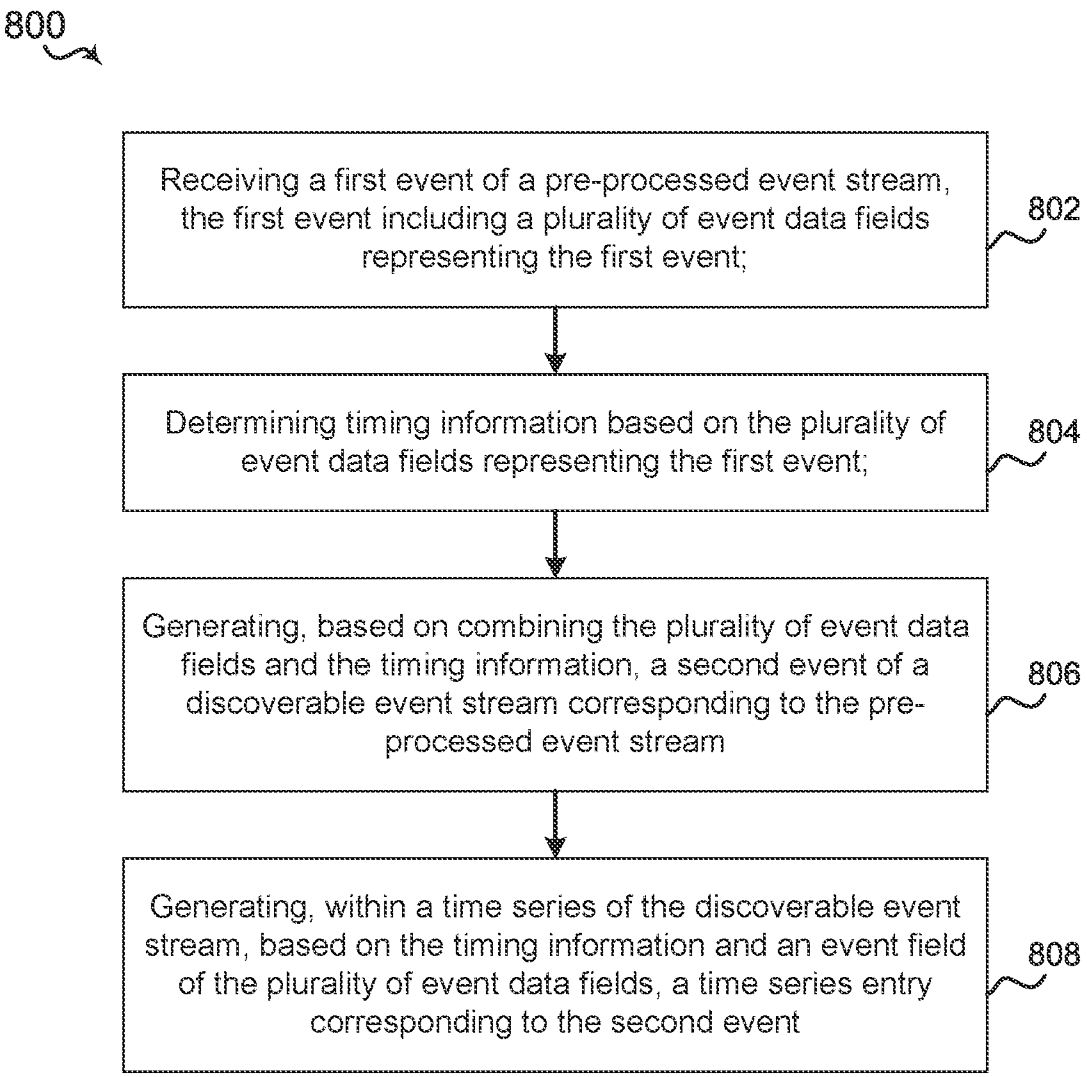
FIG. 8 is a flowchart of an example of a method for ingesting data into a discoverable event stream with timing information validation, in accordance with aspects described herein.

Referring to FIG. 8, in operation of another aspect, device 100 may perform a method 800 ingesting data into a discoverable event stream with timing information validation, such as via execution of ingestion component 120 by processor 102 and/or memory 104.

At block 802, the method 800 includes receiving a first event of a pre-processed event stream, the first event including a plurality of event data fields representing the first event. For example, in an aspect, computer device 100, processor 102, memory 104, ingestion component 120, and/or formatting component 402 may be configured to or may comprise means for receiving a first event of a pre-processed event stream, the first event including a plurality of event data fields representing the first event. For instance, the receiving at block 802 may be performed as described above and elsewhere herein.

At block 804, the method 800 includes determining timing information based on the plurality of event data fields representing the first event. For example, in an aspect, computer device 100, processor 102, memory 104, ingestion component 120, and/or timestamp management component 404 may be configured to or may comprise means for determining timing information based on the plurality of event data fields representing the first event. For instance, the determining at block 804 may be performed as described above and elsewhere herein.

At block 806, the method 800 includes generating, based on combining the plurality of event data fields and the timing information, a second event of a discoverable event stream corresponding to the pre-processed event stream. For example, in an aspect, computer device 100, processor 102, memory 104, ingestion component 120, and/or formatting component 402 may be configured to or may comprise means for generating, based on combining the plurality of event data fields and the timing information, a second event of a discoverable event stream corresponding to the pre-processed event stream. For instance, the generating at block 806 may be performed as described above and elsewhere herein.

At block 808, the method 800 includes generating, within a time series of the discoverable event stream, based on the timing information and an event field of the plurality of event data fields, a time series entry corresponding to the second event. For example, in an aspect, computer device 100, processor 102, memory 104, ingestion component 120, and/or ingestion component 120 may be configured to or may comprise means for generating, within a time series of the discoverable event stream, based on the timing information and an event field of the plurality of event data fields, a time series entry corresponding to the second event. For instance, the generating at block 808 may be performed as described above and elsewhere herein.

Figure 9:
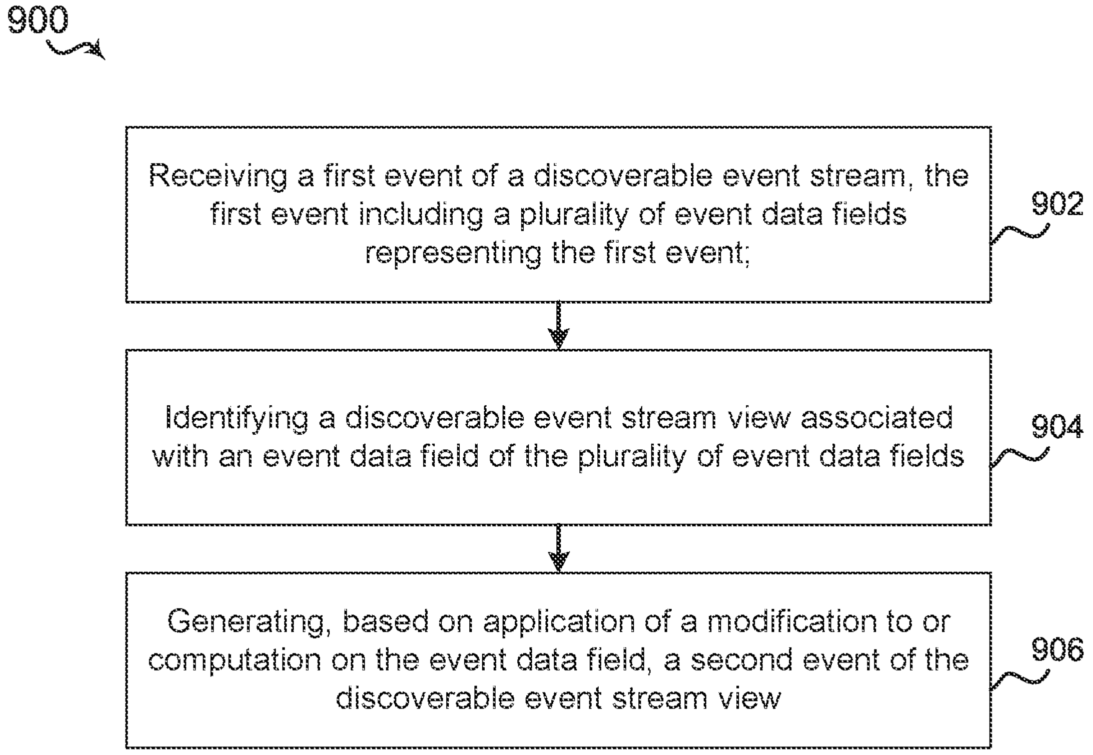
FIG. 9 is a flowchart of an example of a method for creating and employing a discoverable event stream view, in accordance with aspects described herein.

Referring to FIG. 9, in operation of another aspect, device 100 may perform a method 900 for creating and employing a discoverable event stream view, such as via execution of ingestion component 120 by processor 102 and/or memory 104.

At block 902, the method 900 includes receiving a first event of a discoverable event stream, the first event including a plurality of event data fields representing the first event. For example, in an aspect, computer device 100, processor 102, memory 104, ingestion component 120, and/or formatting component 402 may be configured to or may comprise means for receiving a first event of a discoverable event stream, the first event including a plurality of event data fields representing the first event. For instance, the receiving at block 902 may be performed as described above and elsewhere herein.

At block 904, the method 900 includes identifying a discoverable event stream view associated with an event data field of the plurality of event data fields. For example, in an aspect, computer device 100, processor 102, memory 104, ingestion component 120, and/or view management component 410 may be configured to or may comprise means for identifying a discoverable event stream view associated with an event data field of the plurality of event data fields. For instance, the identifying at block 904 may be performed as described above and elsewhere herein.

At block 906, the method 900 includes generating, based on application of a modification to or computation on the event data field, a second event of the discoverable event stream view. For example, in an aspect, computer device 100, processor 102, memory 104, ingestion component 120, and/or view management component 410 may be configured to or may comprise means for generating, based on application of a modification to or computation on the event data field, a second event of the discoverable event stream view. For instance, the generating at block 906 may be performed as described above and elsewhere herein.

Figure 10:
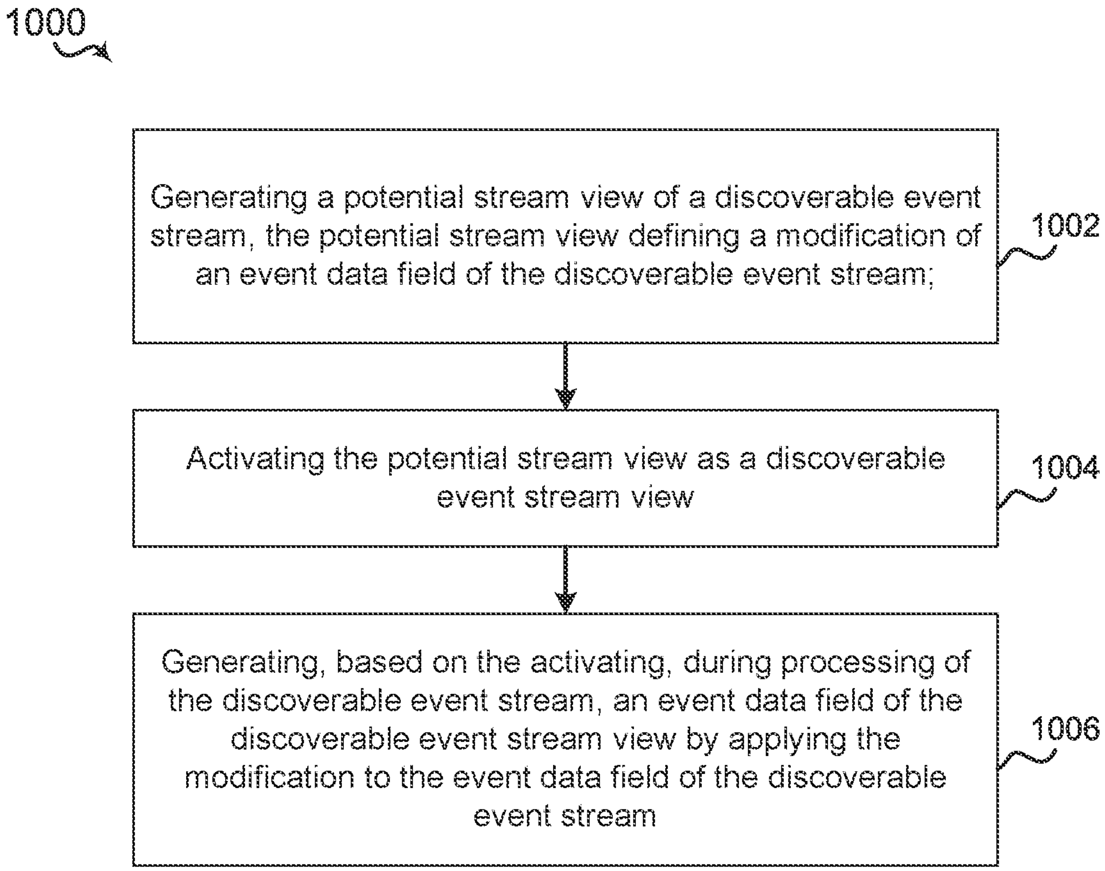
FIG. 10 is a flowchart of an example of a method for activating a discoverable event stream view, in accordance with aspects described herein.

Referring to FIG. 10, in operation of another aspect, device 100 may perform a method 1000 for activating a discoverable event stream view, such as via execution of ingestion component 120 by processor 102 and/or memory 104.

At block 1002, the method 1000 includes generating a potential stream view of a discoverable event stream, the potential stream view defining a modification of an event data field of the discoverable event stream. For example, in an aspect, computer device 100, processor 102, memory 104, ingestion component 120, and/or view management component 410 may be configured to or may comprise means for generating a potential stream view of a discoverable event stream, the potential stream view defining a modification of an event data field of the discoverable event stream. For instance, the generating at block 1002 may be performed as described above and elsewhere herein.

At block 1004, the method 1000 includes activating the potential stream view as a discoverable event stream view. For example, in an aspect, computer device 100, processor 102, memory 104, ingestion component 120, and/or view management component 410 may be configured to or may comprise means for activating the potential stream view as a discoverable event stream view. For instance, the activating at block 1004 may be performed as described above and elsewhere herein.

At block 1006, the method 1000 includes generating, based on the activating, during processing of the discoverable event stream, an event data field of the discoverable event stream view by applying the modification to the event data field of the discoverable event stream. For example, in an aspect, computer device 100, processor 102, memory 104, ingestion component 120, and/or view management component 410 may be configured to or may comprise means for generating, based on the activating, during processing of the discoverable event stream, an event data field of the discoverable event stream view by applying the modification to the event data field of the discoverable event stream. For instance, the generating at block 1006 may be performed as described above and elsewhere herein.

Figure 11:
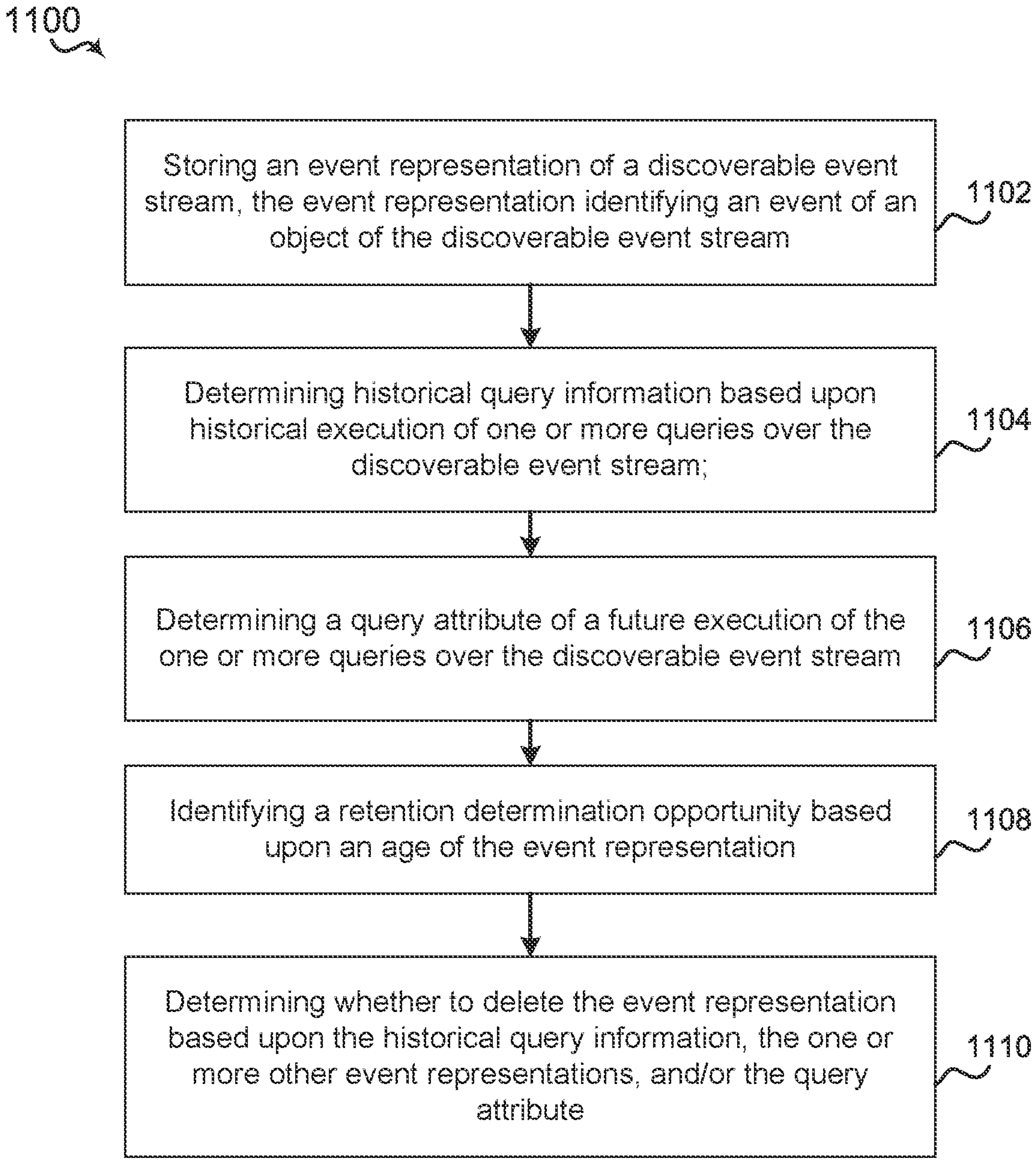
FIG. 11 is a flowchart of an example of a method for managing retention of event data of a discoverable event stream, in accordance with aspects described herein.

Referring to FIG. 11, in operation of another aspect, device 100 may perform a method 1100 for managing retention of event data of a discoverable event stream, such as via execution of ingestion component 120 by processor 102 and/or memory 104.

At block 1102, the method 1100 includes storing an event representation of a discoverable event stream, the event representation identifying an event of an object of the discoverable event stream. For example, in an aspect, computer device 100, processor 102, memory 104, ingestion component 120, and/or formatting component 402 may be configured to or may comprise means for storing an event representation of a discoverable event stream, the event representation identifying an event of an object of the discoverable event stream. For instance, the storing at block 1102 may be performed as described above and elsewhere herein.

At block 1104, the method 1100 includes determining historical query information based upon historical execution of one or more queries over the discoverable event stream. For example, in an aspect, computer device 100, processor 102, memory 104, ingestion component 120, and/or retention management component 412 may be configured to or may comprise means for determining historical query information based upon historical execution of one or more queries over the discoverable event stream. For instance, the determining at block 1104 may be performed as described above and elsewhere herein.

At block 1106, the method 1100 includes determining a query attribute of a future execution of the one or more queries over the discoverable event stream. For example, in an aspect, computer device 100, processor 102, memory 104, ingestion component 120, and/or retention management component 412 may be configured to or may comprise means for determining a query attribute of a future execution of the one or more queries over the discoverable event stream. For instance, the determining at block 1106 may be performed as described above and elsewhere herein.

At block 1108, the method 1100 includes identifying a retention determination opportunity based upon an age of the event representation. For example, in an aspect, computer device 100, processor 102, memory 104, ingestion component 120, and/or retention management component 412 may be configured to or may comprise means for identifying a retention determination opportunity based upon an age of the event representation. For instance, the identifying at block 1108 may be performed as described above and elsewhere herein.

At block 1110, the method 1100 includes determining whether to delete the event representation based upon the historical query information, the one or more other event representations, and/or the query attribute. For example, in an aspect, computer device 100, processor 102, memory 104, ingestion component 120, and/or retention management component 412 may be configured to or may comprise means for determining whether to delete the event representation based upon the historical query information, the one or more other event representations, and/or the query attribute. For instance, the determining at block 1110 may be performed as described above and elsewhere herein.

Query Component Examples

Figure 12:
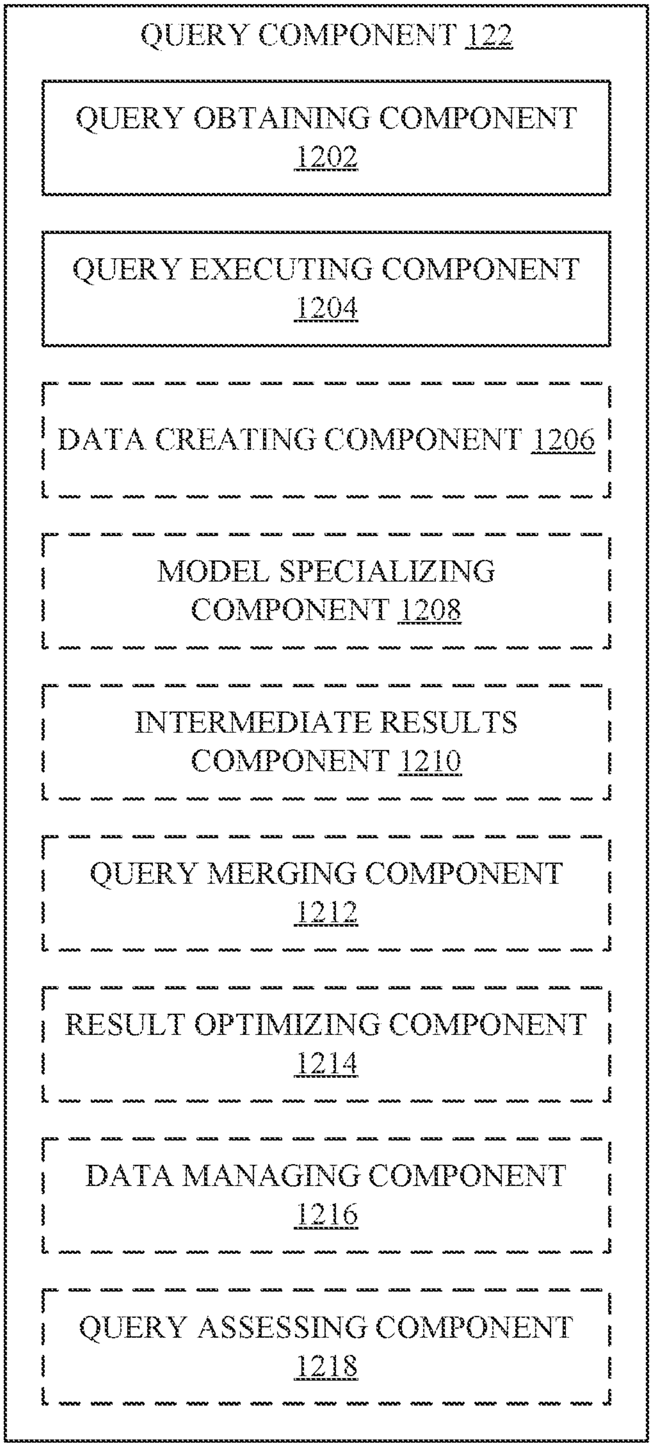
FIG. 12 illustrates an example of a query component in accordance with aspects described herein.

FIG. 12 illustrates an example of a query component 122 in accordance with aspects described herein. For example, the query component 122 can include a query obtaining component 1202 for obtaining one or more queries for executing on a discoverable event stream, a query executing component 1204 for executing the one or more queries over the discoverable event stream, and/or a data creating component 1206 for creating data to add to the discoverable event stream in accordance with executing the one or more queries. Query component 122 may optionally include other components to optimize query performance, resource utilization and/or the like. For example, query component 122 may optionally include a model specializing component 1208 for enforcing constraints on one or more models that include the one or more queries to provide specialized query results. For example, query component 122 may optionally include an intermediate results component 1210 for obtaining and processing intermediate results of a query to distribute query execution resources over a period of time or using parallel architectures to simultaneously process queries. For example, query component 122 can include a query merging component 1212 for merging two or more queries based on a common property of the two queries by executing a single query based on the common property and obtaining the results for each of the two or more queries based on the single query. For example, query component 122 may optionally include a result optimizing component 1214 for executing a query over a smaller sample of data to provide some efficient results, and/or continuing to execute the query over incrementally larger samples of data after providing the efficient results to update the query results to be more accurate. For example, query component 122 may optionally include a data managing component 1216 for managing data stored for querying, such as by instituting data retention policies, which may be based on the one or more queries. For example, query component 122 may optionally include a query assessing component 1218 for assessing a health of one or more queries.

In an example, query component 122 can obtain the one or more queries from a model store 130, as described, and may do so periodically, or may subscribe to the model store 130 to receive updated or additional queries based on storage of the updated or additional queries in the model store 130. The model store 130 can include one or more models, where each model can correspond to one or more object types and can include one or more queries to execute over the discoverable event stream to obtain query results for the model. Based on the query results, for example, the model can indicate additional language or queries to insert data back into the discoverable event stream, as described. In an example, query component 122 can obtain the one or more queries defined for executing over the discoverable event stream, and can perform not only the queries but also other operations based on the content of the one or more queries, the data being indicated as requested in the one or more queries, an actual or predicted number of results for the one or more queries, or other operations, as described herein.

In an example, query executing component 1204 can execute the query over the discoverable event stream to obtain a list of events that satisfy criteria indicated in the query. For example, the query can indicate to obtain a list of events or count of events from the discoverable event stream that meet a certain criteria, such as having a property with a value that meets a threshold. Based on the list or count of events, for example, the query can indicate to add data to the discoverable event stream. In this example, data creating component 1206 can create an event or other data for entering into the discoverable event stream. For example, the query can indicate to add an activation trigger event to the discoverable event stream, which can cause an external action to be performed, as described herein. In another example, the query can indicate to add other event data to the discoverable event stream, such as intermediate query results, an event that is based on the discovered query results, such as a running total of event data having a property with a value that meets a threshold, etc.

In an example, data creating component 1206 can create the additional data for adding to the discoverable event stream and can add the data to the discoverable event stream. For example, data creating component 1206 can format the additional data in a format, or according to a schema, for entry into the discoverable event stream. The additional data can be later used by the query component 122 as part of another query, can be used by an activation component 124 for obtaining an activation trigger event for triggering an action by an external system, etc.

For example, the query component 122, via query executing component 1204, can query event data in the discoverable event stream based on an object and properties model of the event data. For example, the event data can be ingested into the discoverable event stream, and may be defined by an object identifier and may have one or more properties, which can include values of parameters or values resulting from functions of parameters, that are derived from one or more sources of the event data. Based on querying the event data, data creating component 1206 can generate additional data, which may include higher order events, which may include activation trigger events, additional properties or property values, such as functions of property values, intermediate result event data, etc., as described. In an example, data creating component 1206 can append the higher order events to the discoverable event stream.

In addition, for example, the query component 122 can manage a lifecycle for the one or more queries or models that define the queries. For example, a model can include versioning information such that multiple versions of a given model can be created and stored in the model store. In this example, query component 122 can continue to execute a previous version of a model or associated query as a standing query, and may not commission the new model(s) or associated queries until an author of the model or query has released the new version.

In another example, model specializing component 1208 can provide model specialization for the one or more models, which can include providing or enforcing certain constraints to the corresponding queries so the model is specific for a region, a division of a company, an author of the model, etc. In one example, the one or more models can be generated (e.g., by an author) to indicate the associated constraints. In another example, the model specializing component 1208 can create the constraints based on rules or known regulations, a geographical region associated with the author of the model or with an object itself (e.g., a country, state, city, etc.), and/or the like. For example, the model specialization can allow for specifying parameterized triggers for event data along with population-level customization—e.g., the model specialization can apply a particular trigger only to objects in a particular country or can use different thresholds for the trigger in different countries, where the trigger can trigger an action to be performed as part of the query, as described above (e.g., performing an external action or inserting some other event data onto the discoverable event stream).

In some examples, the discoverable event stream stores data according to time series, as described, and the query component 122 can use time series algebra in executing queries, determining query results, performing operations over or based on query results, etc. For example, queries can be defined at the instance level for querying the discoverable event stream for instances, where each instance can correspond to an event related to an object. In an example, a query executed by query executing component 1204 may query for certain events, and may include a change function to output an event to the discoverable event stream where a value of a property for an object has changed, or has changed beyond a threshold value or threshold difference from a previous value, etc. When this occurs, for example, data creating component 1206 can create and add an associated event to the discoverable event stream. Other queries can query for such change values without having to analyze each periodically measured and reported value of a property of an object in the entire discoverable event stream. This can improve query execution time for a query monitoring change in value of the property.

As described above and further herein, the UI component 126 can provide a UI that enables specifying how to format data from a data source connection for adding to a discoverable event stream. In an example, the UI component 126 can translate UI elements to a script or collection of queries that can be interpreted or executed by the query component 122, or one or more components thereof (e.g., query executing component 1204) to enable adding data events to the discoverable event stream, as described herein. For example, UI component 126 can display a depiction of a time series of data events ingested from a data source connection, and can allow for specifying inputs for shaping the data. Based on the inputs, for example, UI component 126 can generate one or more queries (or one or more models having one or more queries) to add data events represented by the UI input to the discoverable object stream. In this example, UI component 126 can generate the one or more queries that can be executed by query executing component 1204 to query over event data in the discoverable event stream and add desired event data to the discoverable event stream (e.g., when certain properties of certain objects in the queried event data achieve threshold values), such to shape the raw data coming into the discoverable event stream.

In one example, when executing queries for event data in the discoverable event stream, query executing component 1204 can determine a value of one or more properties indicated in the one or more queries as an implicit last value for the property. For example, when querying over event data for an object in a discoverable event stream, the object may have multiple events for a given property that are stored in the discoverable event stream, as the discoverable event stream may include periodically reported values for the property, other values resulting from functions on the property, such as when the value changes, etc. When a query indicates the property for use in the query (e.g., in a comparison to a threshold, etc.), at least without an associated time range indicated for the property or the query, query executing component 1204 can assume a last value for the property is desired and can obtain the last value for use in the query. The last value can be the value for the property having the most recent timestamp (e.g., a timestamp closest in value to a current time) in the discoverable event stream. As the event data ingested into the discoverable event stream that is relevant to the query may not be periodic, the time location of the instance of the event data for the last value may not be known. In an example, the ability to locate a last value may be impacted by data retention policies for the discoverable event stream. In an example, the last value functionality can be able to query further back in time into the discoverable event stream than the actual query. In addition, the last value functionality may be time bound by the data retention policy for the discoverable event stream, such that a last value may not be located if it has a timestamp that is beyond a data retention time window for the discoverable event stream.

In one example, query executing component 1204 can allow for a delay tolerance in the time window for executing the query. For example, for a given query over a specified time window, query executing component 1204 can adjust or modify the time window based on a delay tolerance to instead use a delay tolerance window for determining the time series data in the discoverable event stream for the query. The delay tolerance can be specific per query and/or may be specified as part of the query. In an example, the delay tolerance can allow for receiving late data, and as such, query executing component 1204 can execute the query over the time window and data that may have been received up to the delay tolerance after the end of the query time window. For example, for a query over a specific day, the delay tolerance can be set to one hour to allow for querying event data that may be received in the day and up to one hour after the day in the discoverable event stream. The deterministic property of the time series event data in the discoverable event stream can result in the queries having similar semantics to allow switching between implementation strategies for the models. As described herein, query executing component 1204 has the ability to receive data out of order and still be streaming by using delay tolerance. Each query may have its own delay tolerance, which can allow, for example, for a more accurate historical query with large delay tolerance as well as a quick issue recognition query that has small delay tolerance, both of which operate on the same event data without modifying the event data in the discoverable event stream.

In an example, query executing component 1204 can be configured to execute queries over different types of time windows for the time series event data in the discoverable event stream. In one example, query executing component 1204 can execute a query in a progressive time window where values release at certain times or according to a certain cadence before the end of the window that may trigger activation of the query. For example, where the query indicates to provide or analyze values from the discoverable event stream every day, a progressive time window can allow for providing or analyzing values every hour or as they come into the discoverable event stream for executing the query on the value, or to provide the values in a function (e.g., a rolling average), rather than waiting until the end of the day. In this regard, the progressive time window can allow for obtaining values of the property for a duration of the time window starting at a time before an end of a previous time window. In another example, query executing component 1204 can execute a query in a trailing window where a specified number of (last) values for the property can be retrieved from the discoverable event stream regardless of a time window for the values. In these or other examples, the query can indicate the associated time window type to have the event data retrieved or provided using the time window type for the query, and the query executing component 1204 can execute the query based on the time window type indicated in the query.

As described, in some examples, query component 122 can include one or more components for providing optimizations to the queries being executed, results provided by the queries, etc. For example, query component 122 can find a way of sequentially and in a single pass executing a complex query expression, which may be enabled by one or more of the optimizations described herein. For example, intermediate results component 1210 can execute multiple queries over different portions of a time window to obtain intermedia results, which can be stored and subsequently used to improve query efficiency. In one example, intermediate results component 1210 can gather results over intermediate time periods as the result occur. For example, for a query defined in a model that executes over a large time window, intermediate results component 1210 can query for results over smaller portions of the time window, which can include querying for results over the smaller portions of the time window as the smaller portions of the time window occur, or at query time querying over the smaller portions of the time window in parallel. In the former example, for a standing query that executes over one week, for example, intermediate results component 1210 can query for results at the end of each day, and can store the results in the discoverable event stream or otherwise. Where intermediate results component 1210 stores the intermediate results in the discoverable event stream, for example, intermediate results component 1210 can then query for each of the intermediate results when executing the standing query. This can spread the resources used for processing the query over time, which can improve query performance when the standing query is executed. In addition, in one example, intermediate results component 1210 can use the intermediate results concepts for automated query fairness such to execute the intermediate results queries spread over time to ensure controlled resource impact to may affect other queries.

In another example, query merging component 1212 can merge multiple queries that have a common property, so that query executing component 1204 can execute one actual query over the discoverable event stream, and then query merging component 1212 can use the results from the one actual query to select results for each of the multiple queries. For example, where two queries stored in one or more models query for the same property of the same object(s) over different time periods, query merging component 1212 can specify, to query executing component 1204, a superset query that would return all of the results for both of the queries. For example, this superset query may be indicated for a time period that includes the different time periods of both queries (which may or may not overlap). Based on the query results obtained from the query execution engine, query merging component 1212 can separate out (or select the relevant) results for each of the original queries in providing the associated results for the corresponding model. In another example, multiple queries can indicate some common properties to be evaluated, though the evaluation may be different, but in any case the same set of properties are to be received and values differently analyzed. In this example, query merging component 1212 can use the results of a first query for a second query without query executing component 1204 executing the second query.

In another example, result optimizing component 1214 can allow for efficient execution of a query by executing the query in one or more incremental parts. For example, result optimizing component 1214 can execute the query and provide a portion of results, or values generated based on a portion of results, using population estimation to estimate values based on a selected population of the total query results, without providing the all of the values or executing the query over all of the values to provide a function of values. For example, result optimizing component 1214 can obtain values of properties for an object, as indicated in a query, from the event data in the discoverable event stream by select certain query results, executing the query over smaller time windows than a time window specified in the query, etc. In an example, query executing component 1204 can continue the query for the model, or other model actions, based on the limited query results obtained. In one example, result optimizing component 1214 can, after providing initial query results, continue to execute the query over additional parts of the discoverable event stream to provide another incremental set of results or values, if desired, and/or may do so until all relevant event data in the discoverable event stream has been queried, or until result optimizing component 1214 detects that values collected from a portion of the event data are within a threshold variance of one another (which may indicate a probability of accuracy of the incremental results compared to all results in the discoverable event stream).

In another example, query executing component 1204 can decide whether to execute a query using a streaming or micro-batching (or associated applications or functions for executing the queries) based on time window considerations. For example, query executing component 1204 can execute a query using streaming such to execute the query on values for the properties as the event data arrives into the discoverable event stream. In another example, query executing component 1204 can execute a query using micro-batching to query over multiple time batches (e.g., in parallel or otherwise). In an example, micro-batching can relate to looking at data from a latest and earliest portion of the time window, then a next latest and next earliest portion of the time window, etc., until all portions of the time window in the discoverable event stream are queried. Both types of querying may offer different benefits. For example, using streaming can enable for the most current queries, but may use more resources to constantly execute the queries and buffer results. Using micro-batching can use less resources, but may not have the most recent results. In an example, query executing component 1204 can decide on streaming or micro-batching for a certain query based on one or more execution efficiency metrics corresponding to a type of the query, operators used by the query, etc. For example, where the query is based on historical data (e.g., dynamic statistics, such as an average), query executing component 1204 may determine to use micro-batching, otherwise the buffering of the query may become resource intensive if streaming were used. Where the query triggers an activation trigger event, streaming may be used to minimize the time to trigger the external action.

In an example, data managing component 1216 can provide one or more policies for managing the event data in the discoverable event stream, such as a data retention policy. Data managing component 1216 can define or adjust the one or more policies based on aspects of the queries stored in the model store 130 and/or otherwise to be executed by query executing component 1204. For example, based on logic or aspects of the query, such as time windows indicated in the queries for each model, data managing component 1216 may know a maximum time window for the queries, and may adjust a data retention policy based on this information. For example, data managing component 1216 can adjust the data retention policy to delete data after the maximum time window time, and/or after an additional time after the maximum time window time to allow for early implicit last values. In another example, data managing component 1216 may provide an alert (e.g., via UI component 126) related to adjusting the data retention policy, to allow a system administrator to make the decision on whether to adjust the data retention policy. The alert can relate to shortening the data retention where event data is kept longer than needed for the queries, or to lengthen the data retention where event data is not kept long enough for one or more queries.

In another example, query assessing component 1218 can assess one or more queries for one or more models to ensure the queries are functioning and/or are receiving meaningful query results. For example, query assessing component 1218 can detect one or more queries not receiving results, or receiving small numbers of results, not triggering associated activation trigger events, etc., and can notify of the queries as having potential issues. For example, query assessing component 1218 can provide such notifications via UI component 126.

FIG. 13 is a flowchart of an example of a method 1300 for adding event data to a discoverable event stream, in accordance with aspects described herein. For example, method 1300 can be performed by a query component 122 and/or one or more components thereof to facilitate adding event data to a discoverable event stream.

In method 1300, optionally at action 1302, an indication of a query to be executed over a time window in a discoverable event stream can be obtained. In an example, query obtaining component 1202, e.g., in conjunction with processor 102, memory 104, operating system 106, query component 122, etc., can obtain the indication of the query to be executed over the time window in the discoverable event stream. In one example, query obtaining component 1202 can obtain the query from the model store 130, which can store one or more models, where each model can include a collection of one or more queries for triggering certain actions for the discoverable event stream. For example, the one or more models can be generating using UI component 126, as described further herein, and can include scripts or other interpretable language that query executing component 1204 can parse and generating corresponding queries for executing over the discoverable event stream 114. For example, the queries can indicate event data to obtain from the discoverable event stream 114, such as event data having certain values for a property for an object, and the queries or model can take an action based on the returned event data or parameters or functions performed with the returned event data.

For example, a model may indicate to perform an action where a value of a property for an object in the discoverable event stream 114 exceeds a threshold value a certain number of times over a time window. In this example, query obtaining component 1202 can obtain the query for the value of the property of the object over the time window. Query obtaining component 1202 can be configured to obtain all queries, and/or related parameters of the query or other information, from the models in model store 130 for various purposes as well, such as to determine a maximum time window of the queries, determine common properties of two or more queries, etc.

In method 1300, at action 1304, a query can be executed over a time window of event data in a discoverable event stream to identify instances of the event data related to an object and based on a value of a property corresponding to the object that is indicated in the instances of the event data. In an example, query executing component 1204, e.g., in conjunction with processor 102, memory 104, operating system 106, query component 122, etc., can execute the query over the time window of event data in the discoverable event stream 114 to identify instances of the event data related to an object and based on a value of a property corresponding to the object that is indicated in the instances of the event data. For example, query executing component 1204 can execute the query as part of the model to obtain query results for one or more purposes of the model, such as to obtain a value of a property for the object in one or more time instances within the time window. For example, query executing component 1204 can execute the query to gather the relevant event data (e.g., the event data having the value of the property for the object) within the time window and/or considering a delay tolerance, as described further herein.

In method 1300, at action 1306, a new event for adding to the discoverable event stream can be created based on the instances of event data identified from the discoverable event stream. In an example, data creating component 1206, e.g., in conjunction with processor 102, memory 104, operating system 106, query component 122, etc., can create based on the instances of event data identified from the discoverable event stream, the new event for adding to the discoverable event stream. For example, data creating component 1206 can create the event as new data, which may include an activation triggering event, a new event data entry that is a function of the instances of event data retrieved from the discoverable event stream, etc. In the latter example, the new event data entry may include a value for the property that is computed as a function of values for the property for the object in the instances of event data as retrieved.

In method 1300, at action 1308, the new event can be added to the discoverable event stream including applying a timestamp to the new event in the discoverable event stream. In an example, data creating component 1206, e.g., in conjunction with processor 102, memory 104, operating system 106, query component 122, etc., can add the new event to the discoverable event stream including applying the timestamp to the new event in the discoverable event stream. In this regard, for example, the discoverable event stream 114 can also be queried as part of one or more queries in the same or different model for performing one or more functions associated therewith. In another example, discoverable event stream 114 can be queried for the added new event data (e.g., activation trigger events) by the activation component 124 for performing one or more functions associated therewith. In one example, the new event can correspond to a change function that can detect when a value of the property has changed (e.g., which may be part of a query generated for the model, as described in various examples herein). The change function may cause detecting or entry of a new event into the discoverable event stream 114 indicating the change in value, which may trigger an activation trigger event, in some examples. In one example, data creating component 1206 can identify a namespace associated with an activation trigger, identify instances of event data for objects in the discoverable event stream 114 that are associated with the namespace, determine that an activation rule is met over the instances of event data, and insert the activation trigger event into the discoverable event stream 114 or otherwise transmit the event or other trigger to the activation component 124, the activation trigger event including a generic activation identifier identifying an action to perform, and/or an actor identifier identifying an actor to perform the action.

In one example, in executing the query at action 1304, optionally at action 1310, a last occurring instance of the instances of the event data to use in performing the function can be obtained from the event data and based on the query including a function to perform an operation using the value of the property. In an example, query executing component 1204, e.g., in conjunction with processor 102, memory 104, operating system 106, query component 122, etc., can obtain, from the event data and based on the query including the function to perform the operation using the value of the property, the last occurring instance of the instances of the event data to use in performing the function. For example, the query may not indicate a time window for the property, and as such, query executing component 1204 can obtain the last value for the property of the object (e.g., a value from a corresponding instance of the event data having a latest timestamp among all instances of the event data obtained for the property of the object) for use in the query or corresponding functions of the model.

In an example, in executing the query at action 1304, optionally at action 1312, the query can be executed over a subset of event data to provide a representative sample of instances of the event data. In an example, query executing component 1204, e.g., in conjunction with processor 102, memory 104, operating system 106, query component 122, etc., can execute the query over the subset of event data to provide the representative sample of the instances of the event data. For example, query executing component 1204 can execute the query over the subset of event data, such as over subsets of the time window, to obtain the representative sample of the data, which can conserve query execution resources by not executing the full query. For example, query executing component 1204 can perform this partial query in various contexts, such as to provide the representative sample of data to the UI component 126 for visually indicating the representative sample of the data to allow a user to specify further modeling parameters to model the data based on the representative sample.

In method 1300, optionally at action 1314, a management policy for the event data can be executed based on one or more parameters of the query. In an example, data managing component 1216, e.g., in conjunction with processor 102, memory 104, operating system 106, query component 122, etc., can execute the management policy for the event data based on one or more parameters of the query. For example, data managing component 1216 can execute a data retention policy for the discoverable event stream 114, or monitor one or more parameters thereof, or recommend modification of one or more parameters thereof, based on one or more parameters of the query, such as a maximum time window indicated for all queries of one or more models, as described. In an example, the policy can be specific for data of certain objects or parameters, and data managing component 1216 can separately manage the data retention of event data for the objects, or for events having the corresponding parameters, so that the discoverable event stream 114 retains data relevant for the queries for the appropriate period of time, as described.

Figure 14:
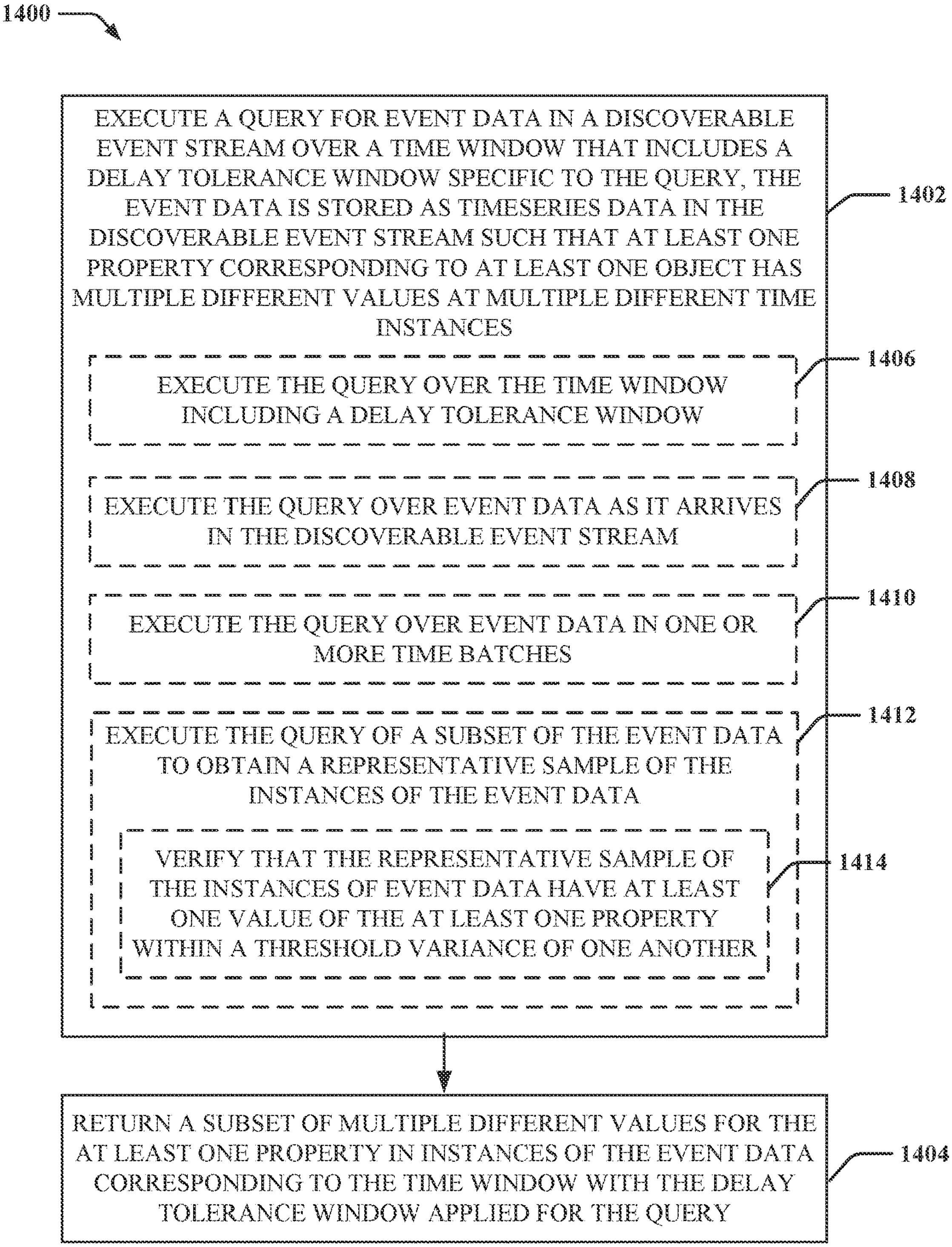
FIG. 14 is a flowchart of an example of a method for adding event data to a discoverable event stream with one or more query optimizations, in accordance with aspects described herein.

FIG. 14 is a flowchart of an example of a method 1400 for adding event data to a discoverable event stream with one or more query optimizations, in accordance with aspects described herein. For example, method 1400 can be performed by a query component 122 and/or one or more components thereof to facilitate adding event data to a discoverable event stream based on performing one or more query optimizations.

For example, method 1400 can include actions as described in method 1300 with optional query optimizations. For example, in method 1400, at action 1304, a query can be executed over a time window of event data in a discoverable event stream to identify instances of the event data related to an object and based on a value of a property corresponding to the object that is indicated in the instances of the event data. In an example, query executing component 1204, e.g., in conjunction with processor 102, memory 104, operating system 106, query component 122, etc., can execute the query over the time window of event data in the discoverable event stream 114 to identify instances of the event data related to an object and based on a value of a property corresponding to the object that is indicated in the instances of the event data, as described in method 1300.

In method 1400, at action 1306, a new event for adding to the discoverable event stream can be created based on the instances of event data identified from the discoverable event stream. In an example, data creating component 1206, e.g., in conjunction with processor 102, memory 104, operating system 106, query component 122, etc., can create based on the instances of event data identified from the discoverable event stream, the new event for adding to the discoverable event stream, as described in method 1300.

In method 1400, at action 1308, the new event can be added to the discoverable event stream including applying a timestamp to the new event in the discoverable event stream. In an example, data creating component 1206, e.g., in conjunction with processor 102, memory 104, operating system 106, query component 122, etc., can add the new event to the discoverable event stream including applying the timestamp to the new event in the discoverable event stream, as described in method 1300.

In one example, in executing the query at action 1304, optionally at action 1402, each of multiple subqueries can be separately executed, and results of corresponding intermediate states can be stored. In an example, query executing component 1204 and/or intermediate results component 1210, e.g., in conjunction with processor 102, memory 104, operating system 106, query component 122, query executing component 1204, etc., can separately execute the multiple subqueries and can store the results of corresponding intermediate states, as described. For example, the subqueries can correspond to executing the query as multiple subqueries, where each subquery can include a portion of the results for the query. For example, intermediate results component 1210 can divide the query into subqueries based on the time component, such that each subquery can correspond to query results collected for the query in a time period that is a portion of a total time window for the query. As described, in one example, intermediate results component 1210 can execute the query at each of multiple time periods as the time periods are occurring, and can store the intermediate results at each step, so when the query is executed at the appropriate time, it can execute to collect the intermediate results instead of querying over all of the data in the time window.

In one example, in executing the query at action 1304, optionally at action 1404, a common subquery of the multiple queries can be executed. In an example, query executing component 1204 and/or intermediate results component 1210, e.g., in conjunction with processor 102, memory 104, operating system 106, query component 122, query executing component 1204, etc., can determine and/or execute the common subquery of the multiple queries. For example, query executing component 1204 can analyze the queries to determine the common subquery as a superset query that would return all of the results for both of the queries. For example, this superset query may be indicated for a time period that includes the different time periods of both queries (which may or may not overlap). Based on the query results obtained from the query execution engine, query merging component 1212 can separate out (or select the relevant) results for each of the original queries in providing the associated results for the corresponding model, as described above. In another example, multiple queries can indicate some common properties to be evaluated, though the evaluation may be different, but in any case the same set of properties are to be received and values differently analyzed. In this example, query merging component 1212 can use the results of a first query for a second query without query executing component 1204 executing the second query.

In one example, in executing the query at action 1304, optionally at action 1406, the query can be executed over the time window include a delay tolerance window. In an example, query executing component 1204, e.g., in conjunction with processor 102, memory 104, operating system 106, query component 122, etc., can execute the query over the time window including the delay tolerance window. For example, as described, query executing component 1204 can obtain a delay tolerance value, which can be specific to the query or model and/or may be indicated as a parameter in the query or model. In another example, the delay tolerance value may be specific to values or parameters used in the query, a type of object in the query, etc. In an example, query executing component 1204 can add the delay tolerance to the time window used to perform the query for the event data in the discoverable event stream 114. Query executing component 1204 can add the delay tolerance to the latest (more recent) an end of the of the time window to consider the time window plus the delay tolerance to allow for late event data to be considered from the discoverable event stream 114, in some examples.

In one example, in executing the query at action 1304, optionally at action 1408, the query can be executed over event data as it arrives in the discoverable event stream. In an example, query executing component 1204, e.g., in conjunction with processor 102, memory 104, operating system 106, query component 122, etc., can execute the query over event data as it arrives in the discoverable event stream 114. In this regard, as described, query executing component 1204 can execute the query as a streaming query, such as by executing the query each time (or after a configured number of times) data arrives in the discoverable event stream and/or each time (or after a configured number of times) data for the object arrives in the discoverable event stream, etc.

In another example, in executing the query at action 1304, optionally at action 1410, the query can be executed over event data in one or more time batches. In an example, query executing component 1204, e.g., in conjunction with processor 102, memory 104, operating system 106, query component 122, etc., can execute the query over event data in one or more time batches. In this regard, as described, query executing component 1204 can execute the query over certain time windows corresponding to the time batches to collect results over time. This can conserve or spread out resources used in executing the query, for example. As described above, query executing component 1204 can decide whether to use streaming or micro-batching, in this regard, based on one or more properties of the query, a type of query, a type of properties or objects being queried, etc.

Activation Component Examples

Figure 15:
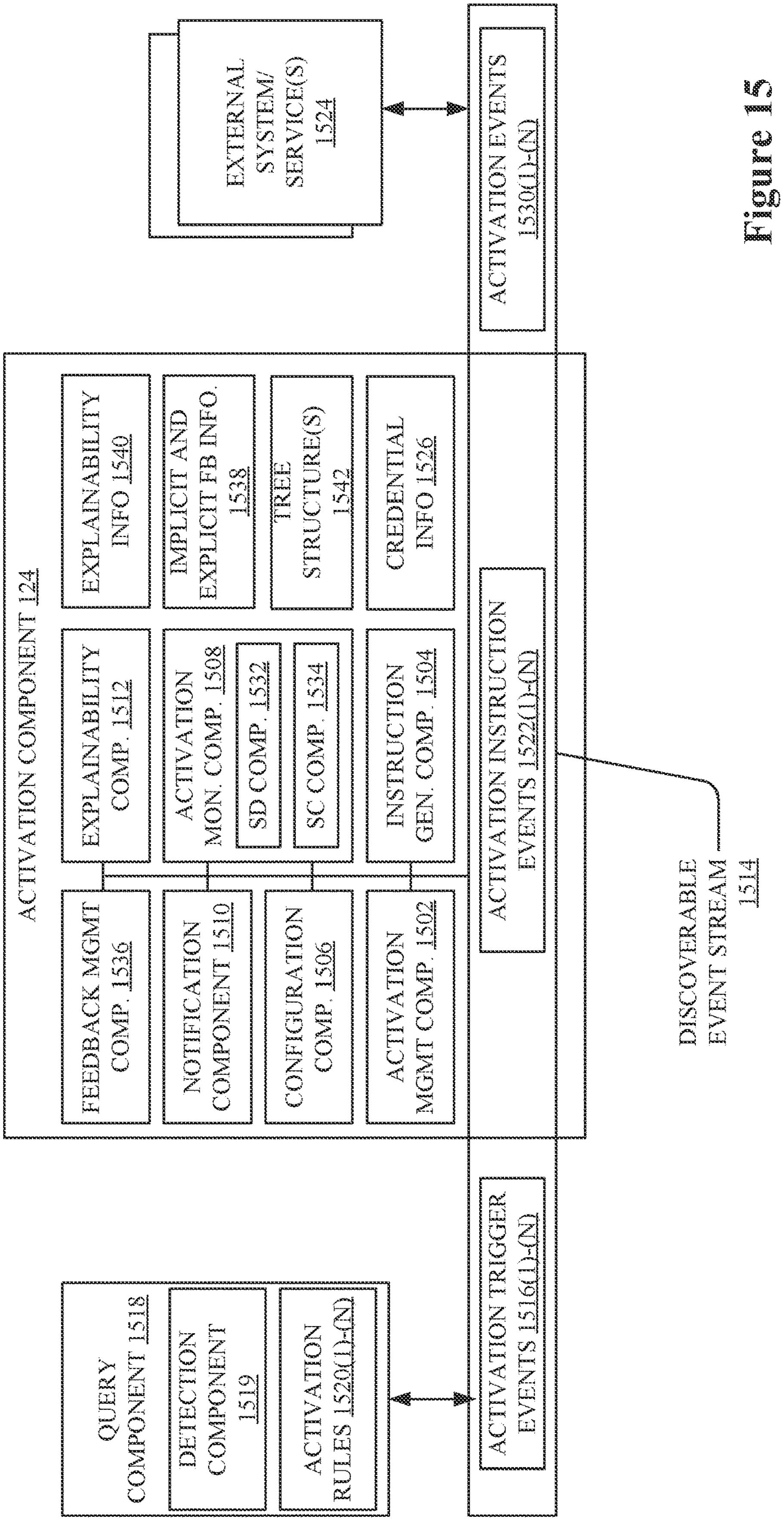
FIG. 15 illustrates an example of an activation component in accordance with aspects described herein.

As illustrated in FIG. 15, an activation component 124 (e.g., the activation component 124) includes an activation management component 1502, an instruction generation component 1504, a configuration component 1506, an activation monitoring component 1508, a notification component 1510, and an explainability component 1512. In some aspects, the activation component 124 is configured to initiate actions based on results of one or more queries over the discoverable event stream 1514 (e.g., the discoverable event stream 114). For example, the activation management component 1502 receives activation trigger events 1516(1)-(*n*) from a query component 1518 (e.g., the query component 122) via the discoverable event stream 1514. In some aspects, the query component 1518 transmits an activation trigger event 1516(1) to the activation component 124 in response to a detection component 1519 of the query component 1518 detecting triggering of an activation rule 1520 based on monitoring of the discoverable event stream 1514. Upon receipt of an activation trigger event 1516 (e.g., receipt of the activation trigger event 1516 via at least the publishing of the activation trigger event 1516 to the discoverable event stream 1514), the activation management component 1502 identifies the event as an activation trigger event 1516 requiring generation and transmission of an activation instruction event 1522. In some aspects, the activation management component 1502 identifies an event as an activation trigger event 1516 requiring generation and transmission of an activation instruction event 1522 based at least in part on the activation trigger event 1516 including a generic activation identifier identifying an action programmable by the instruction generation component and a target identifier identifying an actor for performing the action or being an object of the action. As used herein, in some aspects, an actor may refer to a device or system for performing an action in accordance with an activation rule. In some aspects, a generic activation identifier may represent a request to send a notification (e.g., an email notification or email reminder), modify a state of an external device or system, invoke a process at an external device or system, invoke a data process at the query platform, invoke a data analytics process using one or more time-series events associated with the generation of the activation trigger event 1516. In some aspects, the target identifier may identify a component of the event data managing component 110, one or more external systems, one or more external devices, one or more external processes, and/or one or more users (e.g., notification recipients). Further, in some aspects, the target identifier and/or fields of the activation trigger event 1516 may be parameterized variables that are dynamically resolvable by the activation component 124 (e.g., the configuration component 1506). Some examples of a parameterized variable include a role or role group that resolves to one or more users, and/or communication addresses (e.g. email addresses) for one or more users.

In response to determining that an event is an activation trigger event 1516, the activation management component 1502 transmits the generic activation identifier and the target identifier to the instruction generation component 1504. Upon receipt of the generic activation identifier and the target identifier, the instruction generation component 1504 translates the generic activation identifier into a specific action of a target associated with the target identifier. For instance, in some aspects, the instruction generation component 1504 determines the plurality of instructions corresponding to a target identified by the target identifier, e.g., an application programming interface or library/collection of commands executable by the target or on the target. Further, the instruction generation component 1504 identifies the specific instruction of the plurality of instructions corresponding to the generic activation identifier. Further, the instruction generation component 1504 generates an activation instruction event 1522 using the specific instruction of the plurality of instructions corresponding to the generic activation identifier. For instance, in some aspects, the instruction generation component 1504 sets the value of a field of the activation instruction event 1522 to the specific instruction.

Further, in some aspects, the configuration component 1506 configures the activation instruction event 1522 created by the instruction generation component 1504, and the activation management component 1502 transmits the activation instruction event 1522 to an actor (e.g., a notification component 1510 or an external system/service 1524) configured to perform the action of the activation instruction event 1522. For instance, the configuration component 1506 identifies one or more parameters for the instruction of the activation instruction event 1522 within the activation trigger event 1516, and adds field-value mappings corresponding to the one or more parameters. For example, the activation trigger event 1516 may include a field-value mapping wherein the values are parameters associated with the generic parameter. In some aspects, if the configuration component 1506 determines that a parameter identified within the activation trigger event 1516 is a dynamic or variable value (e.g., a DSL statement), the configuration component 1506 also determines (i.e., resolves) a static value corresponding to the dynamic or variable value. Further, in some aspects, the configuration component 1506 executes one or more functions related to the generic activation identifier, the specific instruction, an identified parameter, and/or the target to determine the static value. Additionally, or alternatively, in some aspects, the configuration component 1506 may query one or more internal or external sources to determine the static value.

In some aspects, the configuration component 1506 also adds authentication information and/or authorization information to the activation instruction event 1522. For example, in some aspects, the configuration component 1506 identifies credential information 1526 (e.g., a token, password, credential) associated with the activation trigger event (e.g., an author of the activation rule that triggered the activation trigger event) and/or the target (e.g., a credential generated using a certificate provided by the target), and adds the credential information 1526 to the activation instruction event 1522. Additionally, in some aspects, the actor utilizes the credential information 1526 to determine whether to perform the action. Once the configuration component 1506 completes configuration of the activation instruction event 1522, the activation management component 1502 transmits the activation instruction event 1522 to the actor in order to trigger performance of the action corresponding to the instruction of the activation instruction event 1522, e.g., transmission of the activation instruction event 1522 at least via activation instruction event 1522 publishing of the discoverable event stream 1514.

For example, in some aspects, the generic activation identifier is "send email," and the target identifier identifies a particular email application. In response, the instruction generation component 1504 identifies a specific instruction for causing the notification component 1510 to transmit a notification email via the email application, and generates an activation instruction event 1522 including the instruction. Additionally, the configuration component 1506 identifies the sender, recipient, subject, body content, attachment, and/or URL to email template within one or more fields of the activation trigger event 1516, and updates the activation instruction event 1522 to include the identified sender, recipient, subject, body content, attachment, and/or URL to email template. In some aspects, the configuration component 1506 generates a representation of a composed e-mail object within the activation instruction event 1522. In some other aspects, the configuration component 1506 adds individual field value mappings for the identified sender, recipient, subject, body content, attachment, and/or URL to email template. Further, the activation management component 1502 transmits the activation instruction event 1522 to the notification component 1510, which will employ the e-mail application to transmit an e-mail based upon the activation instruction event 1522.

As another example, the generic activation identifier of an activation trigger event 1516 may include "update device state" and the target identifier of the activation trigger event 1516 may identify a management device that administers a plurality of IoT devices. In response, the instruction generation component 1504 identifies an API call of the management device for updating the state of the IoT devices via the management device, and generates an activation instruction event 1522 including the instruction for updating the state of the IoT devices via the management device. Further, the activation trigger event 1516 identifies that the update device state action is a transition to a sleep state, and includes a parameterized value indicating that the action should be performed on a subset of the managed IoT devices within a geographic location having an outdated firmware version. As such, the configuration component 1506 requests device information from the management device that includes the geographic location and firmware version of the IoT devices managed by the management device. Further, the configuration component 1506 employs the device information to identify the IoT devices within the geographic location having an outdated firmware version, and updates the activation instruction event 1522 to provide the identified managed IoT devices as parameter to the API call. In addition, the configuration component 1506 adds credential information 1526 as a parameter to the API call within the activation instruction event 1522. In some aspects, the credential information 1526 indicates that the activation component 124 is authorized to update the state of the manage IoT devices. Lastly, the activation management component 1502 transmits the activation instruction event 1522 to the management device, which will execute the API call to put the managed IoT devices in need of an upgrade to sleep within the geographic location.

In some aspects, the activation management component 1502 detects conflicts between activation trigger events 1516. Some examples of a conflict include a first action undoing or overriding a second action, or a first action repeating a second action. Additionally, in some aspects, the activation management component 1502 prevents performance of an action associated with an activation trigger event 1516 based on a conflict with another activation trigger event 1516. Accordingly, the activation management component 1502 can prevent transmittal of superfluous and/or unwanted activation instruction event 1522 that inefficiently consumes system resources and/or creates unnecessary noise. In some examples, the activation management component 1502 detects conflicts between activation trigger events 1516 based on comparing the activation trigger events 1516. In some other examples, the activation management component 1502 detects conflicts between activation trigger events 1516 based on comparing the activation instruction events 1522 corresponding to the activation trigger events 1516. Additionally, in some aspects, the activation management component 1502 employs role information and/or event metadata to determine whether to transmit an activation instruction event 1522 that conflicts with another activation instruction event 1522. For example, the activation management component 1502 may determine that a first activation instruction event 1522 results from an activation rule authored by non-administrator while the second activation instruction event 1522 results from an activation rule that was authored by an administrator. As a result, the activation management component 1502 transmits the second activation instruction event 1522 even though it overrides the first activation instruction event 1522. In some aspects, the activation management component 1502 employs one or more machine learning and/or pattern recognition techniques to determine whether two or more activation trigger events 1516 conflict and/or which activation trigger event 1516 should take precedent.

In some aspects, the activation monitoring component 1508 is configured to provide debugging and performance information for the activation component 124 by monitoring performance of actions in response to the activation instruction events 1522. Although FIG. 15 illustrates that activation monitoring component 1508 is a part of the activation component 124, in some aspects, one or more components of the activation monitoring component 1508 may belong to the query component 1518.

In some aspects, the activation monitoring component 1508 identifies the one or more time-series events within the discoverable event stream 1514 that triggered an activation event 1530 (i.e., an event resulting from performance of the action of an activation instruction event 1522). For example, the activation monitoring component 1508 identifies an activation event 1530 performed by an actor in response to an activation instruction event 1522 received at an actor (e.g., a notification component 1510 or an external system/service 1524) from the activation component 124. In some aspects, identification of an activation event 1530 includes a user selection of the activation event 1530 via a GUI (e.g., the UI component 126). In some other aspects, identification of an activation event 1530 includes a selection by a process of the query component 1518 and/or the activation component 124 performing an analytical function.

Further, the activation monitoring component 1508 identifies an activation trigger event 1516 that caused the activation management component 1502 to transmit the activation instruction event 1522 to the actor. In some aspects, the activation monitoring component 1508 identifies the activation trigger event 1516 that caused the activation management component 1502 to transmit the activation instruction event 1522 to the actor based upon the presence of an identifier of the activation instruction event 1522 within the activation event 1530. Additionally, or alternatively, the activation monitoring component 1508 identifies the activation trigger event 1516 that caused the activation management component 1502 to transmit the activation instruction event 1522 to the actor based upon the presence of an identifier of the activation component 124 within the activation event 1530. Once the activation component 124 is identified as the requestor of the target action, the event history of the activation component 124 within the discoverable event stream 1514 can be analyzed to identify the activation trigger event 1516 that caused the activation management component 1502 to transmit the activation instruction event 1522 to the target actor. Additionally, or alternatively, in some aspects, the discoverable event stream 1514 includes events mapping an activation trigger event 1516 to one or more activation instruction events 1522 generated in response to the activation trigger event 1516.

In addition, the activation monitoring component 1508 identifies one or more time-series events of the discoverable event stream 1514 that met the activation rule 1520 corresponding to the activation trigger event 1516. In some aspects, the activation monitoring component 1508 identifies one or more time-series events of the discoverable event stream 1514 that met an activation rule 1520 corresponding to the activation trigger event 1516 based on the activation trigger event 1516. For example, in some aspects, the discoverable event stream 1514 includes events mapping an activation trigger event 1516 to the one or more time-series events that met the activation rule 1520 that triggered the activation trigger event 1516. Further, in some aspects, the activation monitoring component 1508 presents, via the GUI, the activation rule 1520 and the one or more time-series events of the discoverable event stream 1514 that met the activation rule 1520 that triggered the activation trigger event 1516

Further, as illustrated in FIG. 15, in some aspects, the activation monitoring component 1508 includes a status detection component 1532 and a status comparison component 1534. The status detection component 1532 determines a current state based on the discoverable event stream 1514. The status comparison component 1534 compares the current state to an intended state meant to be achieved by an activation instruction event 1522. If the current state and the intended state do not match, the activation management component 1502 may reattempt to achieve the intended state and/or notify an interested party of the failure to achieve the intended state. For example, the activation management component 1502 may send another activation instruction event 1522 to another actor to perform an action to achieve the intended state (e.g., a predefined backup entity, an entity having higher or different privileges, etc.), re-send the activation instruction event 1522 to the actor to perform the action to achieve the intended state, and/or transmit a notification to an interested party indicating that the activation instruction event 1522 was unsuccessful. If the current state and the intended state match, the activation management component 1502 may notify an interested party of the success in achieving the intended state. For example, in some aspects, the activation management component 1502 transmits a notification to an interested party indicating that activation instruction event 1522 was successful via the notification component 1510.

In some examples, the status detection component 1532 determines the current state based upon monitoring the discoverable event stream 1514 for one or more actor status events. Some examples of actor status events include activation events 1530 and time-series events indicating status information. For example, in some aspects, in response to an activation instruction event 1522, a target actor performs the instruction of the activation instruction event 1522, and generates an activation event 1530 within the discoverable event stream 1514. As such, in some aspects, the status detection component 1532 monitors the discoverable event stream 1514 for the presence of an activation event 1530 indicating performance of the action by the target actor. Additionally, in some examples, the status detection component 1532 monitors the discoverable event stream 1514 for the presence of time-series events indicating the status of one or more devices associated with the activation instruction event 1522. For example, in some aspects, if an IoT device receives an activation instruction event 1522 requesting that the IoT device reboot within a predefined period, the status detection component 1532 monitors for time-series events indicating that the IoT device has or has not rebooted within the predefined period. Accordingly, the feedback of activation events generates new streams of event data for the discoverable event stream 1514, and the possibility of additional activation rules 1520 configured to monitor these feedback streams to identify issues and/or define an audit trail associated with an issue. As such, the present invention creates a unified and integral feedback loop where activation systems and feedback systems interact.

As illustrated in FIG. 15, in some aspects, the activation component 124 further includes a feedback management component 1536 that monitors for implicit and explicit feedback information 1538 provided in response to notifications sent by the notification component 1510. Further, in some aspects, the feedback management component 1536 recommends modifications to or modifies activation rules 1520 based on the feedback information 1538. For example, in some aspects, the feedback management component 1536 recommends changing the method of communication for a recipient of a notification based on an activation rule based on explicit feedback from the recipient expressing dissatisfaction with a communication received from the notification component and/or implicit feedback indicating that one or more notifications transmitted to the recipient were not read. In some aspects, the feedback management component 1536 employs one or more machine learning and/or pattern recognition techniques to generate recommendations and/or modifications for updating an activation rule 1520.

In some aspects, the notification component 1510 adds feedback logic to notifications generated by the notification component 1510. For example, in some aspects, an email generated by the notification component includes feedback logic generating feedback information (e.g., ratings, votes, customer satisfaction scores, user reviews, etc.) within the discoverable event stream 1514 to be analyzed by the query component 1518 and/or the activation component 124. Further, as described above herein, in some aspects, the notification component 1510 receives activation instruction events 1522 from the activation management component 1502 and transmits notifications to external systems/services 1524. For example, in some aspects, the notification component transmits e-mail messages to e-mail addresses contained in an activation instruction event 1522.

In some aspects, the explainability component 1512 provides explainability information 1540 identifying the behavior of one or more sources of the discoverable event stream 1514 as indicated by the activation trigger events 1516. In some aspects, the explainability component 1512 determines importance values for the one or more time-series events of the discoverable event stream 1514 that caused an activation trigger event 1516. In some aspects, the explainability component 1512 groups distinct types of time-series events of the one or more time-series events that caused an activation trigger event 1516 and determines the explainability information 1540 based on the aggregate importance value of each group. Additionally, or alternatively, in some aspects, the query component 1518 manages a tree structure 1542 representing the activation rules 1520. In some aspects, the tree structure 1542 indicates compositional relationships between the different activation rules 1520. Further, in some aspects, the explainability component 1512 employs the tree structure 1542 to determine how distinct aspects (e.g., predicates) of an activation rule 1520 contribute to whether it is triggered. For example, a tree structure 1542 may include a first rule for sending an email when an operating system of IoT device within a geographic location is out of date and a second rule for transmitting an email when an operating system of IoT device is out of date. Further, in some aspects, the explainability component 1512 employs the tree structure 1542 to provide explainability information 1540 representing how geographic location contributes to whether an operating system of an IoT device is out of date.

Figure 16A:
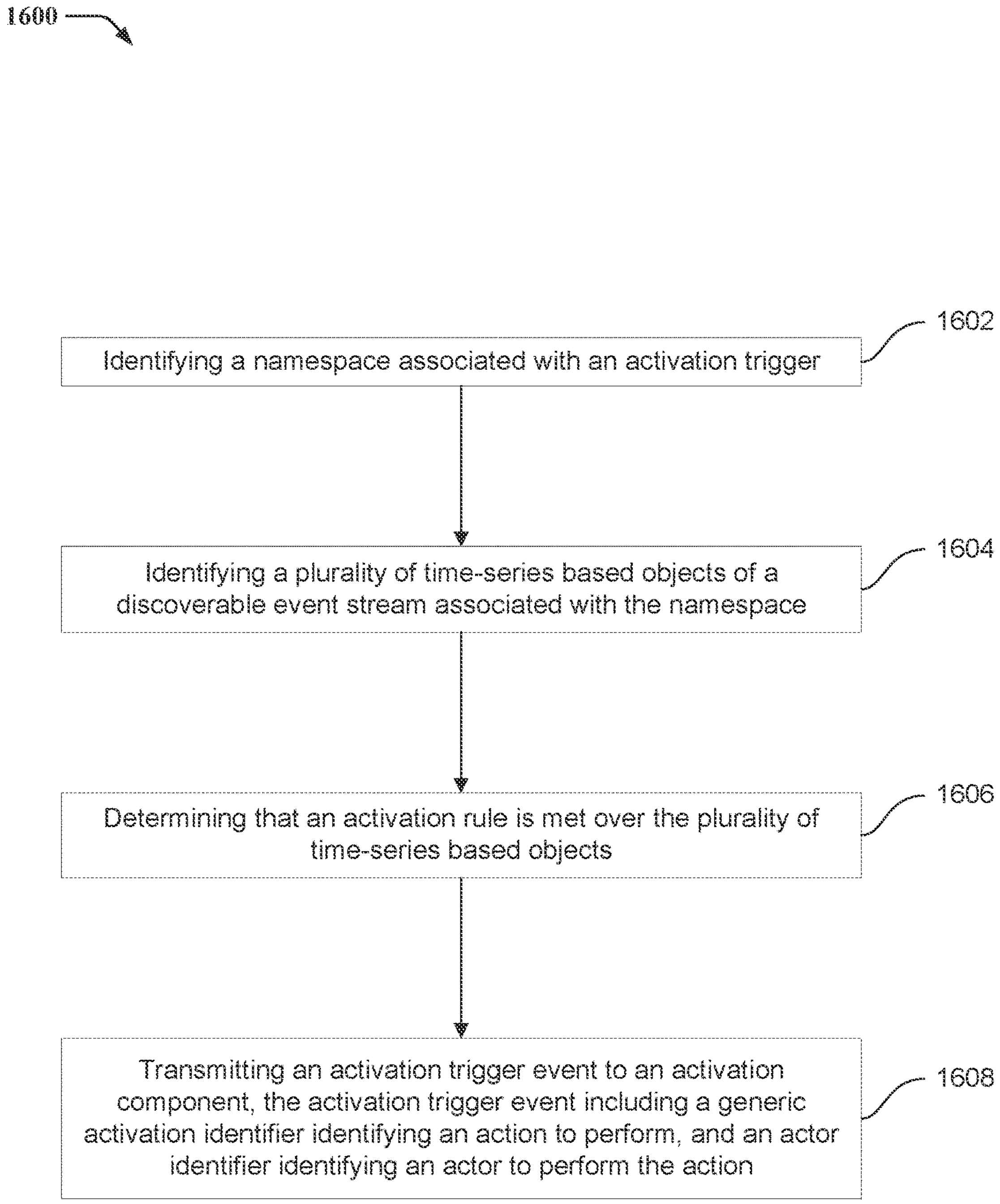
FIG. 16A is a flowchart of an example of a method for generating an activation trigger event based on an activation rule scoped to a namespace within a discoverable event stream, in accordance with aspects described herein.

Referring to FIG. 16A, in operation, the event data managing component 110, the query component 122, the activation component 124, the device 100, and/or the processor 102, may perform an example method 1600 for generating an activation trigger event based on an activation rule scoped to a namespace within a discoverable event stream. The method 1600 may be performed by one or more components of the event data managing component 110, the activation component 124, the device 100, or any device/component described herein according to the techniques described with reference to FIG. 1 or 4.

At block 1602, the method 1600 includes identifying a namespace associated with an activation trigger. For example, in some aspects, an activation component identifies a namespace associated with an activation trigger. In some examples, the definition of the activation trigger includes the particular namespace. Accordingly, the event data managing component 110, the query component 122, the activation component 124, the device 100, and/or the processor 102, executing the detection component 1519 may provide means for identifying a namespace associated with an activation trigger.

At block 1604, the method 1600 includes identifying a plurality of time-series based objects of a discoverable event stream associated with the namespace. For example, the query component 122 monitors the discoverable event stream 114 for one or more time-series based events associated with the namespace. Accordingly, the event data managing component 110, the activation component 124, the device 100, and/or the processor 102, executing the detection component 1519 may provide means for identifying a plurality of time-series based objects of a discoverable event stream associated with the namespace.

At block 1606, the method 1600 includes determining that an activation rule is met over the plurality of time-series based objects. For example, the detection component 1519 detects triggering of an activation rule 1520 based on the one or more time-series based events associated with the namespace within the discoverable event stream 1514. Accordingly, the event data managing component 110, the activation component 124, the device 100, and/or the processor 102, executing the detection component 1519 may provide means for determining that an activation rule is met over the plurality of time-series based objects.

At block 1608, the method 1600 includes transmitting an activation trigger event to an activation component, the activation trigger event including a generic activation identifier identifying an action to perform, and an actor identifier identifying an actor to perform the action. For example, the query component 1518 transmits an activation trigger event 416(1) to the activation component 124 in response to the detection component 1519 detecting triggering of an activation rule 1520 based on monitoring of the discoverable event stream 1514. Accordingly, the event data managing component 110, the activation component 124, the device 100, and/or the processor 102, executing the activation management component 1502 may provide means for transmitting an activation trigger event to an activation component, the activation trigger event including a generic activation identifier identifying an action to perform, and an actor identifier identifying an actor to perform the action.

In some aspects, the method 1600 further includes receiving an activation trigger event via a discoverable event stream, the activation trigger event including a generic activation identifier and an actor identifier; generating, based on the generic activation identifier and the actor identifier, an activation instruction event for causing an action associated with the generic activation identifier at an actor corresponding to the actor identifier; configuring, based on the activation trigger event, the activation instruction event to trigger the action at the actor; and transmitting the activation instruction event to the actor based on the actor identifier. Accordingly, the event data managing component 110, the activation component 124, the device 100, and/or the processor 102, executing the activation management component 1502 and/or the instruction generation component 1504 may provide means for receiving an activation trigger event via a discoverable event stream, the activation trigger event including a generic activation identifier and an actor identifier; generating, based on the generic activation identifier and the actor identifier, an activation instruction event for causing an action associated with the generic activation identifier at an actor corresponding to the actor identifier; configuring, based on the activation trigger event, the activation instruction event to trigger the action at the actor; and transmitting the activation instruction event to the actor based on the actor identifier.

In some aspects, the method 1600 further includes wherein the generic activation identifier identifies at least one of sending a notification, sending a state change instruction to an external device, sending a state change instruction to an external system, sending an invocation instruction to an external system, sending an invocation instruction to a data processing system, or sending an analysis instruction to a data processing system. In some aspects, the method 1600 further includes wherein generating the activation instruction event for causing the action includes: identifying a collection of commands associated with the actor; and selecting, from the collection of commands, a command for the activation instruction event. In some aspects, the method 1600 further includes wherein configuring the activation instruction event includes: detecting a presence of a parameterized value within the activation trigger event; identifying a field of the activation instruction event that corresponds to the parameterized value; determining a static value for the field based on the parameterized value; and mapping the field to the static value within the activation instruction event. In some aspects, the method 1600 further includes wherein the parameterized value is a role and/or role group, and the static value is one or more communication addresses. In some aspects, the method 1600 further includes wherein configuring the activation instruction event includes: detecting a presence of a configuration value within the activation trigger event; identifying a field of the activation instruction event that corresponds to the configuration value; and mapping the field to the configuration value within the activation instruction event. In some aspects, the method 1600 further includes wherein the activation instruction event causes the actor to perform the action, and generate an activation event corresponding to the action within the discoverable event stream.

In some aspects, the method 1600 further includes wherein activation instruction event is a first activation instruction event, the action is a first action, and further including: generating a second activation instruction event for causing a second action associated with the actor; identifying a conflict between the first action and the second action; and determining, based on the conflict, not to send the second activation instruction event to the actor. Accordingly, the event data managing component 110, the activation component 124, the device 100, and/or the processor 102, executing the activation management component 1502 may provide means for generating a second activation instruction event for causing a second action associated with the actor; identifying a conflict between the first action and the second action; and determining, based on the conflict, not to send the second activation instruction event to the actor.

In some aspects, the method 1600 further includes wherein the activation trigger event is a first activation trigger event, activation instruction event is a first activation instruction event, and further including: receiving a second activation trigger event via the discoverable event stream; identifying a conflict between the first activation trigger event and the second activation trigger event; and determining, based on the conflict, not to generate a second activation instruction event corresponding to the second activation trigger event. Accordingly, the event data managing component 110, the activation component 124, the device 100, and/or the processor 102, executing the activation management component 1502 may provide means for: receiving a second activation trigger event via the discoverable event stream; identifying a conflict between the first activation trigger event and the second activation trigger event; and determining, based on the conflict, not to generate a second activation instruction event corresponding to the second activation trigger event.

In some aspects the method 1600 further includes identifying the plurality of time-series based objects of the discoverable event stream that triggered the activation rule; determining explainability information based on the plurality of time-series based objects, the explainability information identifying an importance value of the plurality of time-series based objects; and presenting the explainability information via a graphical user interface. Accordingly, the event data managing component 110, the activation component 124, the device 100, and/or the processor 102, executing the activation monitoring component 1508 and/or explainability component 1512 may provide means for identifying the plurality of time-series based objects of the discoverable event stream that triggered the activation rule; determining explainability information based on the plurality of time-series based objects, the explainability information identifying an importance value of the plurality of time-series based objects; and presenting the explainability information via a graphical user interface.

In some aspects, the method 1600 further includes generating a tree structure representing one or more activation rules including the activation, and wherein determining the explainability information includes determining the explainability based on a relationship between the activation rule and other activation rules within the tree structure. Accordingly, the event data managing component 110, the activation component 124, the device 100, and/or the processor 102, executing the explainability component 1512 may provide means for transmitting an activation trigger event to an activation component, the activation trigger event including a generic activation identifier identifying an action to perform, and an actor identifier identifying an actor to perform the action.

Figure 16B:
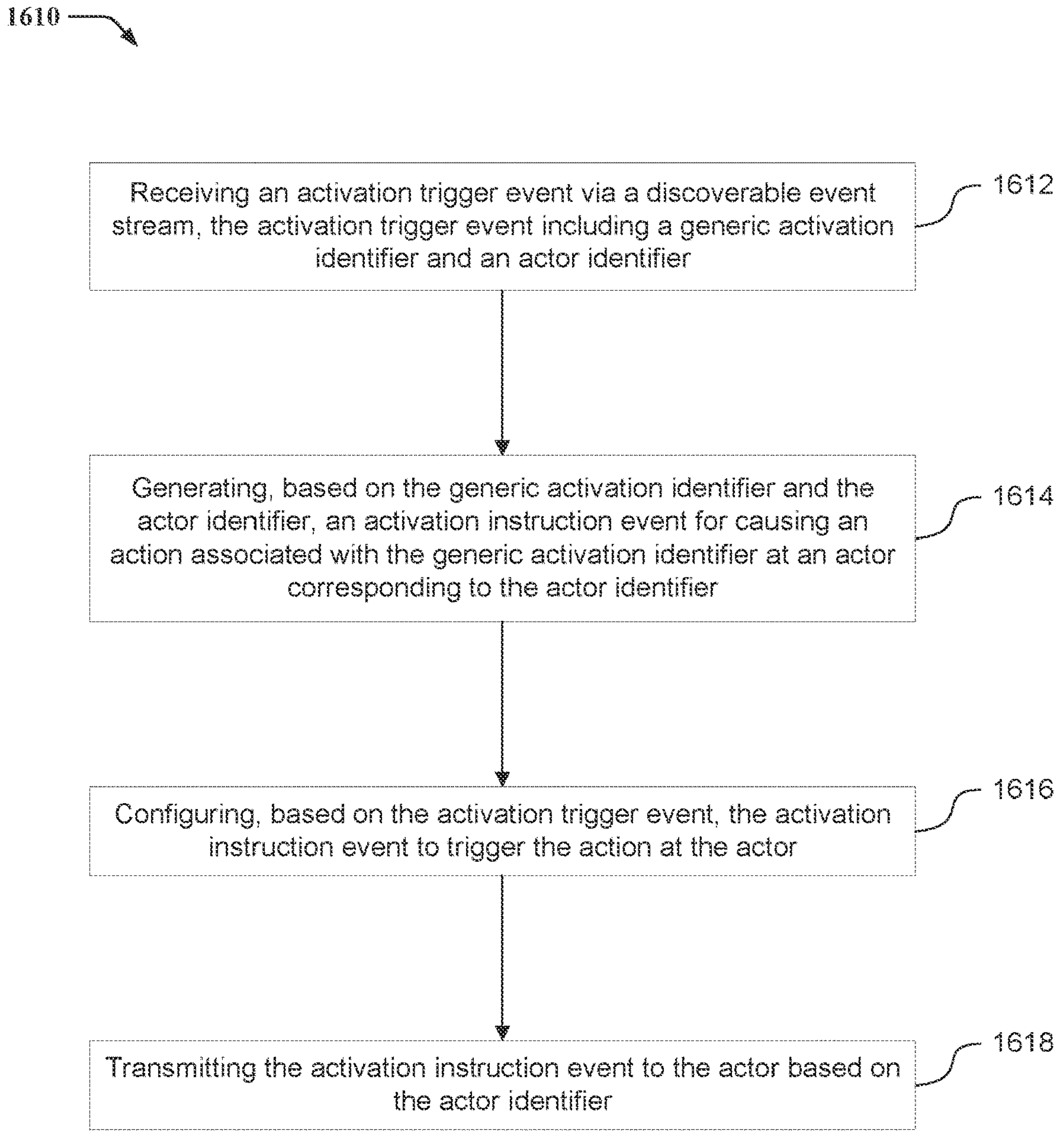
FIG. 16B is a flowchart of an example of a method for activating performance of an action in response to an activation trigger event, in accordance with aspects described herein.

Referring to FIG. 16B, in operation, the event data managing component 110, the activation component 124, the device 100, the processor 102, may perform an example method 1610 for activating performance of an action in response to an activation trigger event. The method 1600 may be performed by one or more components of the event data managing component 110, the activation component 124, the device 100, or any device/component described herein according to the techniques described with reference to FIG. 1 or 15.

At block 1612, the method 1600 includes receiving an activation trigger event via a discoverable event stream, the activation trigger event including a generic activation identifier and an actor identifier. For example, the activation management component 1502 receives an activation trigger event 1516 in response to the triggering of an activation rule 1520 corresponding to monitoring whether the current temperature of a data server room has risen above a predefined temperature and sending a notification to management personnel to check the temperature of the room. Accordingly, the event data managing component 110, the activation component 124, the device 100, and/or the processor 102, executing the activation management component 1502 may provide means receiving an activation trigger event via a discoverable event stream, the activation trigger event including a generic activation identifier and an actor identifier.

At block 1614, the method 1600 includes generating, based on the generic activation identifier and the actor identifier, an activation instruction event for causing an action associated with the generic activation identifier at an actor corresponding to the actor identifier. For example, the instruction generation component 1504 generates an activation instruction event 1522 based upon receipt of the activation trigger event 1516. In particular, in some aspects, the instruction generation component 1504 generates an activation instruction event 1522 including an instruction for the notification component 1510 to transmit a notification email using a particular email application based upon a generic activation identifier corresponding to "send email" within the activation trigger event 1516 and an actor identifier corresponding to the email application of the notification component 1510. Accordingly, the event data managing component 110, the activation component 124, the device 100, and/or the processor 102, executing the instruction generation component 1504 may provide means for generating, based on the generic activation identifier and the actor identifier, an activation instruction event for causing an action associated with the generic activation identifier at an actor corresponding to the actor identifier.

At block 1616, the method 1600 includes configuring, based on the activation trigger event, the activation instruction event to trigger the action at the actor. For example, the configuration component 1506 updates the activation instruction event 1522 to indicate to the notification component 1510 that the notification email should be sent to management personnel associated with the data server room. In some aspects, the configuration component 1506 obtains the email addresses of the management personnel associated with the data server room from a database associated with the data server room in response to a parameterizable value identifying the management personnel of the data server room within the activation trigger event 1516. In addition, the configuration component 1506 configures the body of the notification to indicate that the temperature of the particular data server room is currently above the predefined temperature. Accordingly, the event data managing component 110, the activation component 124, the device 100, and/or the processor 102, executing the configuration component 406 may provide means for configuring, based on the activation trigger event, the activation instruction event to trigger the action at the actor.

At block 1618, the method 1600 includes transmitting the activation instruction event to the actor based on the actor identifier. For example, the activation management component 1502 transmits the activation instruction event 1522 to the notification component 1510 based on the target identifier identifying the notification component 1510. In response to receipt of the activation instruction event 1522, the notification component 1510 transmits the notification email to the identified management personnel. Accordingly, the event data managing component 110, the activation component 124, the device 100, and/or the processor 102, executing the activation management component 1502 may provide means for transmitting the activation instruction event to the actor based on the actor identifier.

Figure 17:
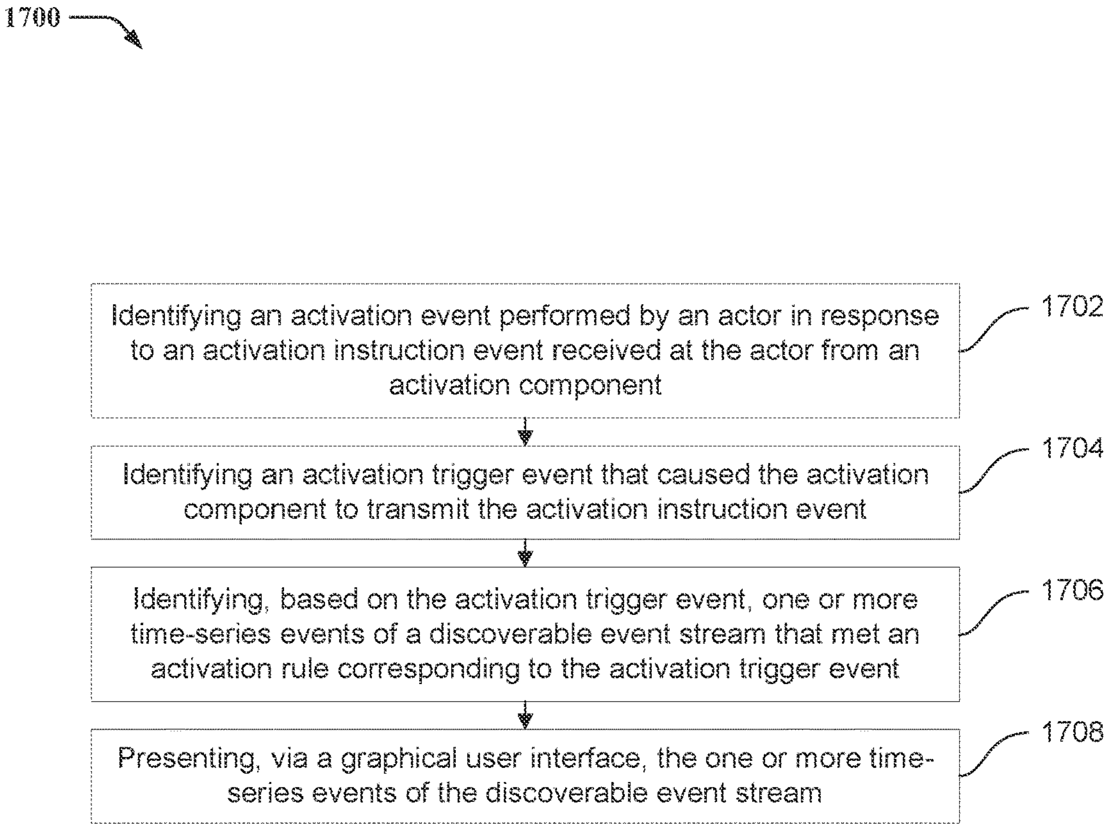
FIG. 17 is a flowchart of an example of a method for tracing back an activation event to the one or more events that caused performance of the activation event, in accordance with aspects described herein.

Referring to FIG. 17, in operation, the event data managing component 110, the activation component 124, the device 100, the processor 102, may perform an example method 1700 for tracing back an activation event to the one or more events that caused performance of the activation event. The method 1700 may be performed by one or more components of the event data managing component 110, the activation component 124, the device 100, or any device/component described herein according to the techniques described with reference to FIGS. 1-20.

At block 1702, the method 1700 includes identifying an activation event performed by an actor in response to an activation instruction event received at the actor from an activation component. For example, a user selects a GUI representation of an activation event corresponding to the setting of a temperature of an HVAC device of a data server room. As described herein, in some aspects, the activation event 1530 is generated in response to the HVAC device receiving an activation instruction event 1522 from the activation component and increasing the temperature of the HVAC device in response to the activation instruction event 1522. Accordingly, the event data managing component 110, the activation component 124, the device 100, the processor 102, executing the activation monitoring component 1508 may provide means for identifying an activation event performed by an actor in response to an activation instruction event received at the actor from an activation component.

At block 1704, the method 1700 includes identifying an activation trigger event that caused the activation component to transmit the activation instruction event. For example, the activation monitoring component 1508 determines that the activation component 15 oh transmitted the activation instruction event 1522 in response to the activation trigger event 1516 transmitted by the query component 1518. In some aspects, the activation monitoring component 1508 identifies the activation trigger event 1516 based upon identifying an event within the discoverable event stream 1514 that maps the activation trigger event 1516 to the activation instruction event 1522. In some other aspects, the activation monitoring component 1508 identifies the activation trigger event 1516 based upon a field of the activation instruction event 1522 identifying the identifies the activation trigger event 1516. Accordingly, the event data managing component 110, the activation component 124, the device 100, the processor 102, executing the activation monitoring component 1508 may provide means for identifying an activation trigger event that caused the activation component to transmit the activation instruction event.

At block 1706, the method 1700 includes identifying, based on the activation trigger event, one or more time-series events of a discoverable event stream that met an activation rule corresponding to the activation trigger event. For example, the activation monitoring component 1508 identifies that one or more particular time-series events met by indicating indicated that the temperature of the HVAC device was below a predefined amount, and caused the query component 1518 to transmit the activation trigger event 1516. In some aspects, the activation monitoring component 1508 identifies the one or more time-series events based upon a mapping of the activation trigger event 1516 to the one or more time-series events. In some other aspects, the activation monitoring component 1508 identifies the one or more time series events based upon a field of the activation trigger event 1516 including the one or more time-series events. Accordingly, the event data managing component 110, the activation component 124, the device 100, the processor 102, executing the activation monitoring component 1508 may provide means for identifying, based on the activation trigger event, one or more time-series events of a discoverable event stream that met an activation rule corresponding to the activation trigger event.

At block 1708, the method 1700 includes presenting, via a graphical user interface, the one or more time-series events of the discoverable event stream. For example, the activation component 124 employs the UI component 126 to present the activation rule 1520 corresponding to raising the temperature of the HVAC device when detected temperature in the data server room detected below a predefined temperature for a predefined period of time and the one or more time events corresponding to when the temperature was detected below the predefined temperature within the predefined period of time via a GUI. Accordingly, the event data managing component 110, the activation component 124, the device 100, the processor 102, executing the UI component 126 may provide means for presenting, via a graphical user interface, the one or more time-series events of the discoverable event stream.

Figure 18:
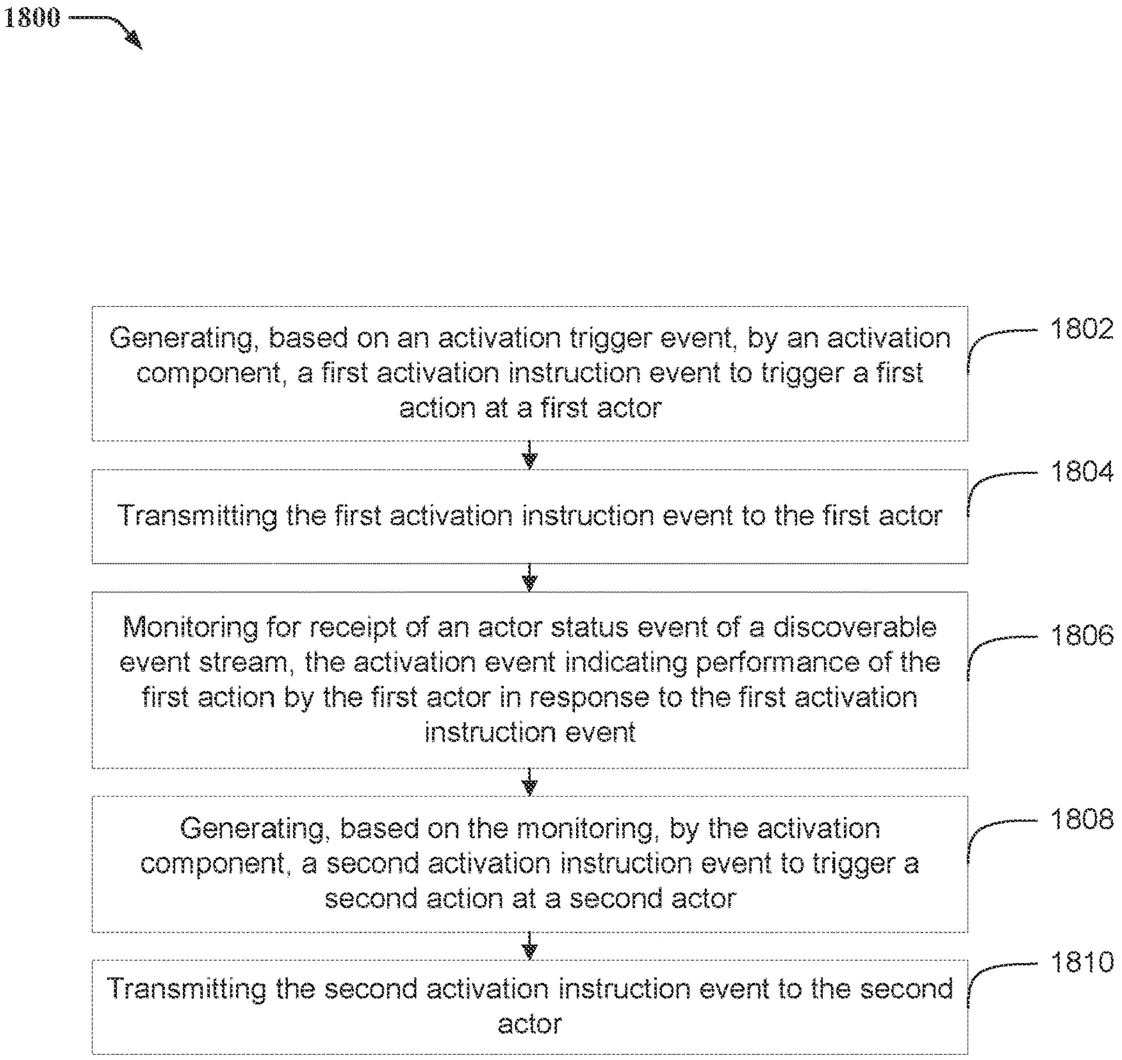
FIG. 18 is a flowchart of an example of a method for monitoring performance of an action in response to an activation trigger event, in accordance with aspects described herein.

Referring to FIG. 18, in operation, the event data managing component 110, the activation component 124, the device 100, the processor 102, may perform an example method 1800 for monitoring performance of an action in response to an activation trigger event. The method 1800 may be performed by one or more components of the event data managing component 110, the activation component 124, the device 100, or any device/component described herein according to the techniques described with reference to FIGS. 1-20.

At block 1802, the method 1800 includes generating, based on an activation trigger event, by an activation component, a first activation instruction event to trigger a first action at a first actor. For example, the instruction generation component 1504 generates an activation instruction event 1522 corresponding to raising the temperature of an HVAC device based upon the activation trigger event 1516. Accordingly, the event data managing component 110, the activation component 124, the device 100, the processor 102, executing the instruction generation component 1504 may provide means for generating, based on an activation trigger event, by an activation component, a first activation instruction event to trigger a first action at a first actor.

At block 1804, the method 1800 includes transmitting the first activation instruction event to the first actor. For example, the activation management component 1502 transmits the activation instruction event 1522 to the HVAC device or a management device of the HVAC device. Further, the activation management component 1502 publishes the activation instruction event 1522 to the discoverable event stream 1514. In some aspects, the activation management component 1502 transmits the activation instruction event 1522 to the HVAC device or a management device of the HVAC device by publishing the activation instruction event 1522 to the discoverable event stream 1514. Accordingly, the event data managing component 110, the activation component 124, the device 100, the processor 102, executing the activation management component 1502 may provide means for generating, based on the generic activation identifier and the actor identifier, an activation instruction event for transmitting the first activation instruction event to the first actor.

At block 1806, the method 1800 includes monitoring for receipt of an actor status event of a discoverable event stream, the activation event indicating performance of the first action by the first actor in response to the first activation instruction event. For example, the status detection component 1532 monitors the discoverable event stream to determine a current state (i.e., the current temperature of the data server room). In some aspects, the status detection component 1532 identifies a time-series event indicating that the current temperature is below the requested temperature of the activation instruction event 1522. Additionally, or alternatively, in some aspects, the status detection component 1532 identifies that an activation event 1530 corresponding to the activation instruction event 1522 has not been published to the discoverable event stream 1514 by the HVAC device or the management device of the HVAC device. Accordingly, the event data managing component 110, the activation component 124, the device 100, the processor 102, executing the activation monitoring component 1508 may provide means for monitoring for receipt of an actor status event of a discoverable event stream, the activation event indicating performance of the first action by the first actor in response to the first activation instruction event.

At block 1808, the method 1800 includes generating, based on the second activation trigger event, by the activation component, a second activation instruction event to trigger a second action at a second actor. For example, in some aspects, the activation monitoring component publishes an event to discoverable event stream 1514 indicating that the first activation trigger event has failed and/or that the intended state of the first activation trigger event 1516 and/or activation instruction event 1522 has not been met. In response, the query component 1518 and/or the activation monitoring component transmits a second activation trigger event 1516 to the instruction generation component 1504. In some aspects, an activation rule 1520 determines whether the second activation trigger event 1516 is a copy of the first activation trigger event 1516 or has at least one of a different generic activation identifier, target identifier, or parameter values than the first activation trigger event 1516. For example, the target identifier of the second activation trigger event 1516 may correspond to a different HVAC device capable of affecting the temperature within the data server room. Upon receipt of the second activation trigger event 1516, the instruction generation component 1504 generates a second activation instruction event 1522 based on the second activation trigger event 1516. Accordingly, the event data managing component 110, the activation component 124, the device 100, the processor 102, executing the instruction generation component 1504 may provide means for generating, based on the second activation trigger event, by the activation component, a second activation instruction event to trigger a second action at a second actor.

At block 1810, the method 1800 includes transmitting the second activation instruction event to the second actor. For example, the instruction generation component 1504 generates a second activation instruction event 1522 corresponding to raising the temperature of an HVAC device based upon the second activation trigger event 1516. Accordingly, the event data managing component 110, the activation component 124, the device 100, the processor 102, executing the activation management component 1502 may provide means for transmitting the second activation instruction event to the second actor.

Figure 19:
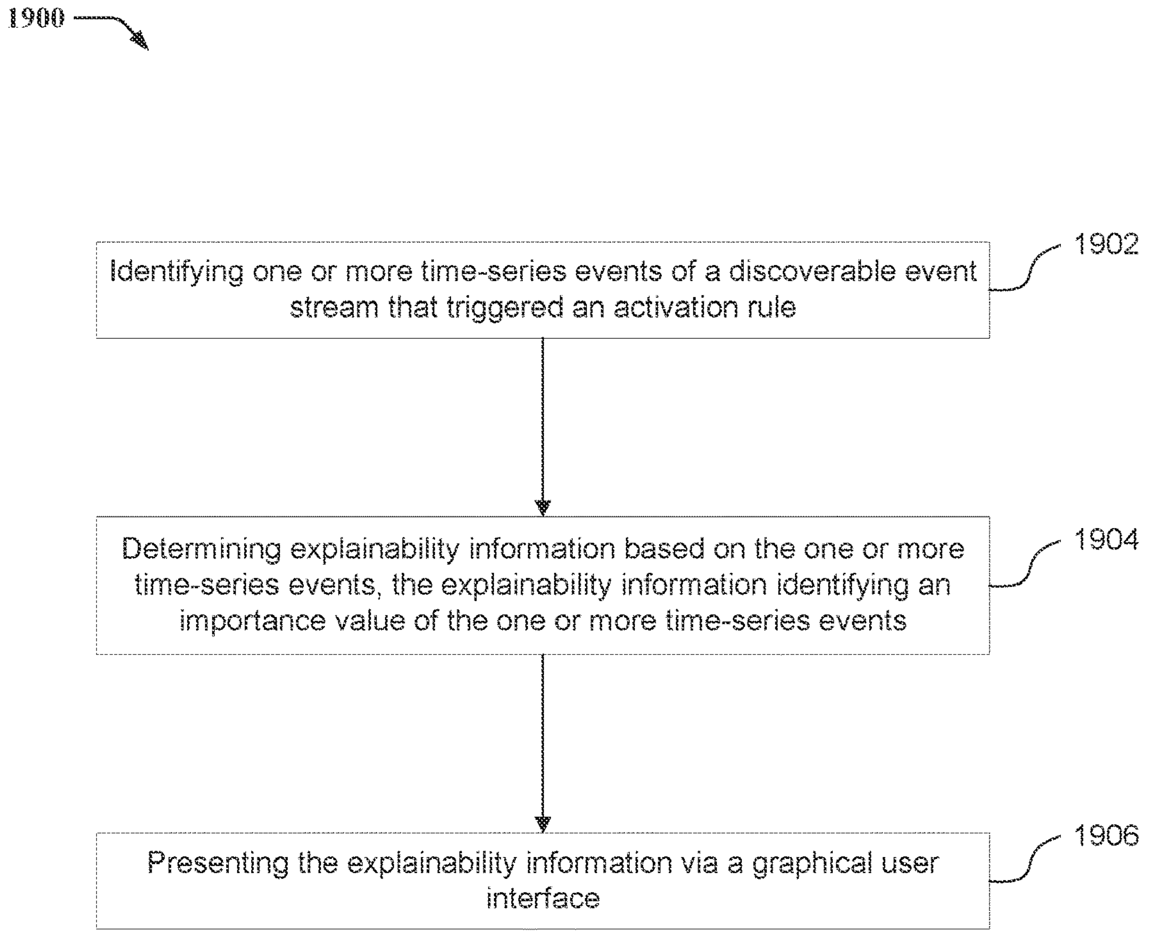
FIG. 19 is a flowchart of an example of a method for presenting explainability information, in accordance with aspects described herein.

Referring to FIG. 19, in operation, the event data managing component 110, the activation component 124, the device 100, and/or the processor 102, may perform an example method 1900 for presenting explainability information. The method 1900 may be performed by one or more components of the event data managing component 110, the activation component 124, the device 100, or any device/component described herein according to the techniques described with reference to FIGS. 1-20.

At block 1902, the method 1900 includes identifying one or more time-series events of a discoverable event stream that triggered an activation rule. For example, the activation monitoring component 1508 identifies that one or more time-series events met the activation rule 1520 corresponding to notifying management personnel when the energy consumption of an HVAC device in an energy efficient mode of an outdated firmware is above a predefined value, and caused the query component 1518 to transmit the activation trigger event 1516. In some aspects, the activation monitoring component 1508 identifies the one or more time-series events based upon a mapping of the activation trigger event 1516 to the one or more time-series events. In some other aspects, the activation monitoring component 1508 identifies the one or more time series events based upon a field of the activation trigger event 1516 including the one or more time-series events. Accordingly, the event data managing component 110, the activation component 124, the device 100, and/or the processor 102, executing the activation monitoring component 1508 may provide means for identifying one or more time-series events of a discoverable event stream that triggered an activation rule.

At block 1904, the method 1900 includes determining explainability information based on the one or more time-series events, the explainability information identifying an importance value of the one or more time-series events. For example, the explainability component 1512 employs importance values and/or a tree representation to determine explainability information 1540 indicating that the outdated firmware did not significantly contribute to the HVAC device having energy consumption above the predefined value. Accordingly, the event data managing component 110, the activation component 124, the device 100, and/or the processor 102, executing the activation monitoring component 1508 may provide means for determining explainability information based on the one or more time-series events, the explainability information identifying an importance value of the one or more time-series events.

At block 1906, the method 1900 includes presenting the explainability information via a graphical user interface. For example, the explainability component 1512 employs the UI component 126 to present the explainability information 1540 indicating the contribution of one or more types of time-series events and/or one or more components of an activation rule 1520 to the generation of activation trigger events 1516 corresponding to the activation rule 1520. Accordingly, the event data managing component 110, the activation component 124, the device 100, and/or the processor 102, executing the UI component 126 may provide means for presenting the explainability information via a graphical user interface.

UI Component Examples

Figure 20:
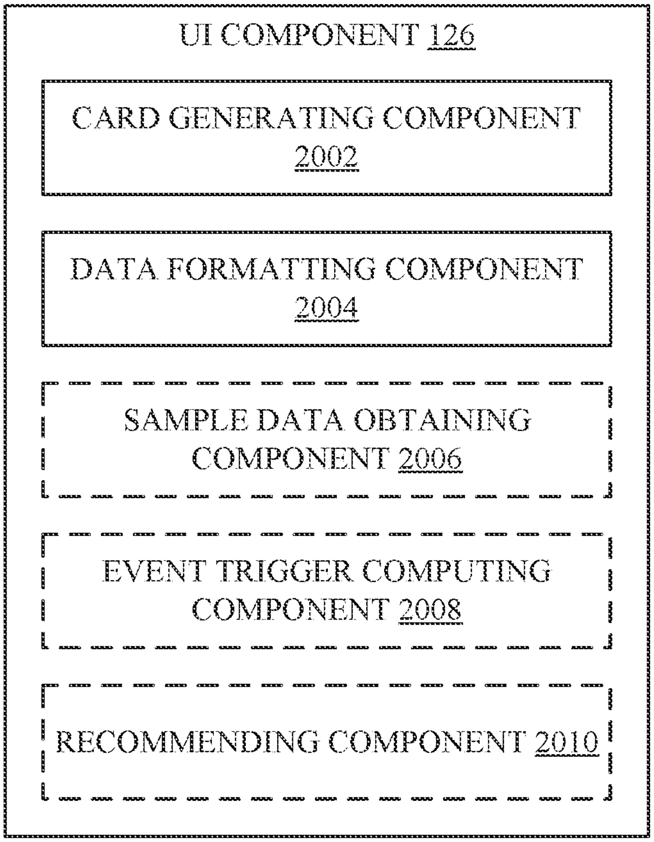
FIG. 20 illustrates an example of a user interface (UI) component, in accordance with aspects described herein.

FIG. 20 illustrates an example of a UI component 126 in accordance with aspects described herein. For example, the UI component 126 can include a card generating component 2002 for generating multiple stacked visual representations related to instances of event data, and a data formatting component 2004 for obtaining or generating a format for the event data displayed on each of the multiple stacked visual representations. UI component 126 may optionally include a sample data obtaining component 2006 for obtaining a sample of instances of event data related to a query for a model, an event trigger computing component 2008 for computing a number of activation trigger events that would be triggered for a given set of data over a time window, and/or a recommending component 2010 for presenting one or more recommendations for a model represented by stacked visual representations in the UI component 126, such as recommending values of a parameter for triggering an activation trigger event (e.g., to lower a number of events being triggered), recommending data management or policy modifications based on one or more queries of one or more models to be executed by the query component 122, etc.

In an example, UI component 126 can provide an interactive user interface to allow for generating visual representations to represent a modeling of event data in the discoverable event stream 114. For example, the UI component 126 can allow for generating or representing data or queries for data, logic for inserting event data into the discoverable event stream 114, which may include new event data having computed values for properties of objects, activation trigger events, etc. For example, card generating component 2002 can allow for generating the stacked visual representations on the UI by generating a first visual representation, and allowing for inserting objects from event data in the discoverable event stream 114.

Based on a selection of object data to be presented on a visual representation, for example, data formatting component 2004 can determine a layout or format for presenting the data on the visual representation. In one example, data formatting component 2004 can generate the format for the data based on a type of the data (e.g., a type of the property for the objected selected for display on the visual representation. For example, data formatting component 2004 can select a different format for a numeric type, string type, binary type, etc., and can display the values using the selected format.

In an example, data formatting component 2004 can also provide different representations for different uses of data. For example, data formatting component 2004 can display a stacked visual representation to include a data view, which may include event data form the discoverable event stream as a table of data, or a model view, which may include the event data as a set of time series. In another example, data formatting component 2004 can display a stacked visual representation to include a fleet view of statistics across instances of event data, or an action view of statistics of trigger activity.

In addition, for example, card generating component 2002 can allow for performing a time series function over the represented data to generate another visual representation of the data with the time series function applied. Card generating component 2002 can allow for applying a time series function at each representation of data to facilitate generating a modeling of the data. When a desired representation of data is achieved, card generating component 2002 can allow for indicating event data to be added to the discoverable event stream 114 based on the desired representation of data. UI component 126 can translate the various visual representations of data and/or event data to be added into a representation, such as a script in a scripting language, that the query component 122 can process to analyze event data in the discoverable event stream 114 and determine when to add the new event data to the discoverable event stream 114, as described above.

In another example, sample data obtaining component 2006 can obtain a sample of instances of event data for which to display values of corresponding properties on one or more stacked visual representations. This can provide a sample of the event data without querying or providing all event data. In an example, sample data obtaining component 2006 can obtain the sample of data, which can be determined and provided by the query component 122, as described above, as a sample determined to be representative of all instances of event data for the property of the object in the discoverable event stream 114. In one example, query component 122 may employ correlation analysis, prediction, lineage, etc. for determining the sample of instances of the event data to display.

In another example, where one of the stacked visual representations defines an activation trigger event for certain values of the property (or time series functions computed of values of the property), event trigger computing component 2008 can compute a number of activation trigger events that would occur of all of the instances of the corresponding event data in the discoverable event stream 114 based on the criteria for triggering the event. For example, event trigger computing component 2008 can request query component 122 to execute the corresponding query over one or more time windows for the certain values of the property (or time series functions computed of values of the property) represented by the stacked visual representations, and can compute the number of activation trigger events generated to determine the number (e.g., a count) of activation trigger events to display on the UI. Event trigger computing component 2008 can provide the number of activation trigger events for one or multiple time instances (related to the time instances of the event data being displayed on the stacked visual representations). UI component 126 can display the number(s) of trigger events in an analytics pane on the UI, which may be in one, or part of its own, stacked visual representation of data. This can provide a visual indication of the number of trigger events, which may be desirable so the user can determine whether too many triggers are generated by the model or not.

In an example, UI component 126 can display an author assistance pane, which can include an indication of, or link to, each stacked visual representation, and can allow a user to navigate to one of the stacked visual representations on the UI by interacting with the indication.

In an example, recommending component 2010 can generate one or more recommendations for the models in model store 130, the corresponding queries generated from the stacked visual representations, data management policies, etc., as described herein. For example, recommending component 2010 can generate a pop-up window or other alert to suggest certain recommendations and/or cause actions to be performed by the query component 122 or other components based on an accepted recommendation.

Figure 21:
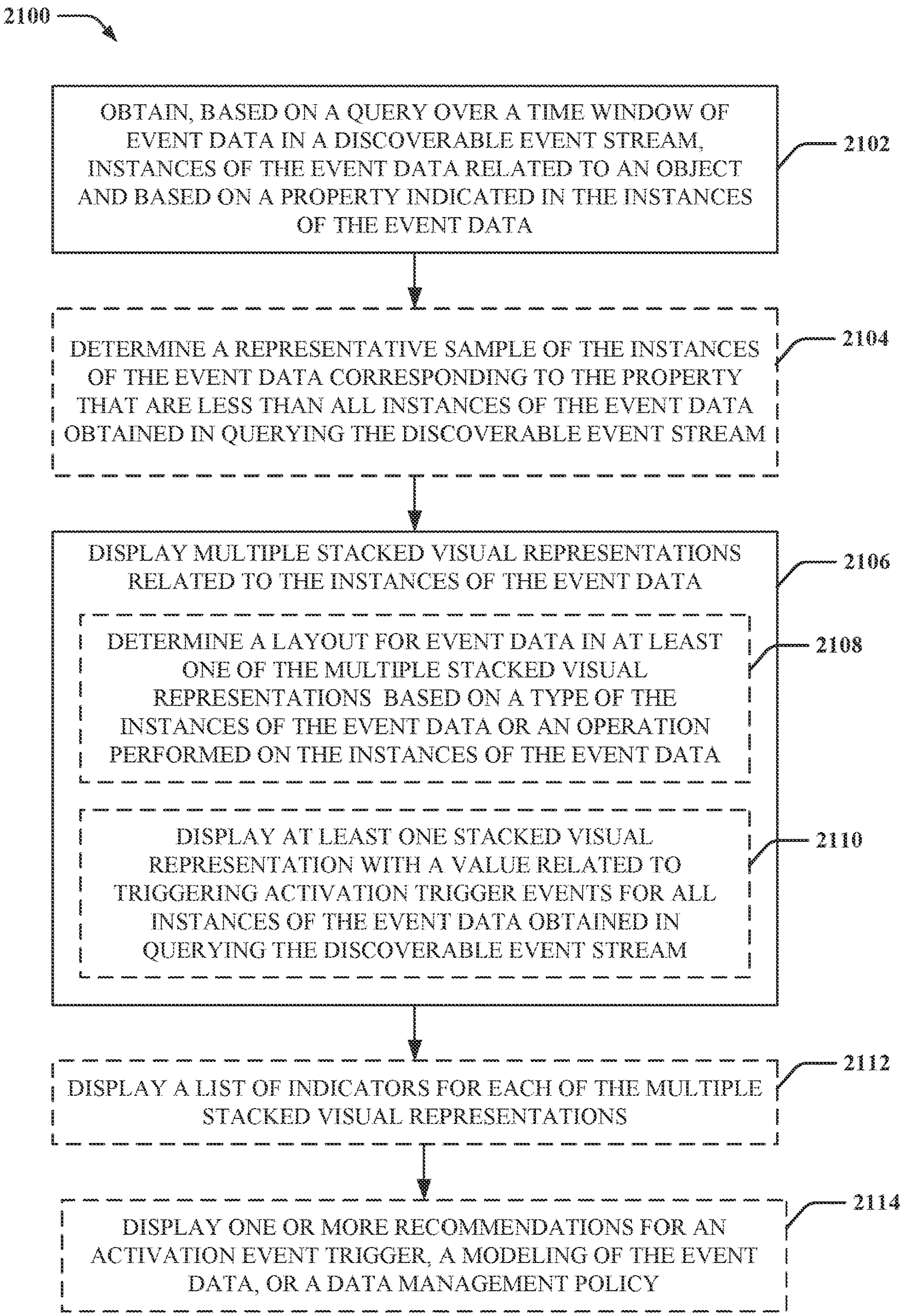
FIG. 21 is a flowchart of an example of a method for providing a UI of stacked visual representations of instances of event data for an object and/or corresponding property, in accordance with aspects described herein.

FIG. 21 is a flowchart of an example of a method 2100 for providing a UI of stacked visual representations of instances of event data for an object and/or corresponding property, in accordance with aspects described herein. For example, method 2100 can be performed by a UI component 126 and/or one or more components thereof to facilitate displaying and/or facilitating interaction with the stacked visual representations of the data.

In method 2100, at action 2102, instances of the event data related to an object and based on a property indicated in the instances of the event data can be obtained based on a query over a time window of event data in a discoverable event stream. In an example, card generating component 2002, e.g., in conjunction with processor 102, memory 104, operating system 106, UI component 126, etc., can obtain, based on the query over the time window of event data in the discoverable event stream 114, instances of the event data related to the object and based on the property indicated in the instances of the event data. For example, card generating component 2002 can obtain the instance of the event data based on an indication to obtain event data for a certain object and/or property of the object. As described herein, event data can be ingested into the discoverable event stream 114 and can be associated with an object identifier to indicate an object for which the event data is reported, one or more properties with values received in the event data, a timestamp, etc.

In an example, card generating component 2002 can display a list of objects and/or corresponding properties for which event data is available, and can allow for selecting one of the objects and/or corresponding properties for generating a data model. In this example, when a user selects an object and/or corresponding properties, card generating component 2002 can obtain at least a representative sample of the event data associated with the object and/or properties from the discoverable event stream 114 for displaying in a stacked visual representation.

In method 2100, optionally at action 2104, a representative sample of the instances of the event data corresponding to the property, that are less than all instances of the event data obtained in querying the discoverable event stream, can be determined. In an example, sample data obtaining component 2006, e.g., in conjunction with processor 102, memory 104, operating system 106, UI component 126, etc., can determine the representative sample of the instances of the event data corresponding to the property that are less than all instances of the event data obtained in querying the discoverable event stream 114. For example, sample data obtaining component 2006 can determine a number or count of the sample of instances as a number of the instances less than all instances, such as a proportion of all instances, a fixed number of all instances, etc. In addition, for example, sample data obtaining component 2006 can determine which instances to use for the number or count of instances in the sample based on randomly selecting the instances of event data, selecting ones of the instances of event data that have within a threshold variance of vales of the property of the object, selecting ones of the instances of event data determined to be representative of all of the instances (e.g., instances having a range of values for the property across the range that are similar to the range of values for the property across all instances), etc.

In method 2100, at action 2106, multiple stacked visual representations related to the instances of the event data can be displayed. In an example, card generating component 2002, e.g., in conjunction with processor 102, memory 104, operating system 106, UI component 126, etc., can display the multiple stacked visual representations related to the instances of the event data. For example, card generating component 2002 can display each of the multiple stacked visual representations as they are created by a user using the interface, as described herein, and may display the stacked visual representations as cards stacked on one another, as shown in some examples of the UI herein.

In one example, in displaying the multiple stacked visual representations at action 2106, optionally at action 2108, a layout for event data can be determined in at least one of the multiple stacked visual representations based on a type of the instances of the event data or an operation performed on the instances of the event data. In an example, data formatting component 2004, e.g., in conjunction with processor 102, memory 104, operating system 106, UI component 126, etc., can determine the layout for event data in at least one of the multiple stacked visual representations based on the type of the instances of the event data or the operation performed on the instances of the event data. For example, data formatting component 2004 can format the data in the visual representation differently for different types of data, as shown and described herein, such as a chart for numeric values, an indicator over time for binary (e.g., ON/OFF)

values, etc. In an example, data formatting component 2004 can format the representation of the event data over time to represent the time series nature of the event data. In addition, for example, UI component 126 can allow for interaction with a visual representation to create another visual representation based on a time series function for the event data. In this example, when the user selects a time series function, card generating component 2002 can generate a new stacked visual representation, and data formatting component 2004 can determine a format for representing the event data on the new stacked visual representation based on the time series function (e.g., as an aggregation of the value of the property, a comparison of the value of the property to a threshold, etc.).

In one example, in displaying the multiple stacked visual representations at action 2106, optionally at action 2110, at least one stacked visual representation can be displayed with a value related to triggering activation trigger events for all instances of the event data obtained in querying the discoverable event stream. In an example, event trigger computing component 2008, e.g., in conjunction with processor 102, memory 104, operating system 106, UI component 126, etc., can display at least one stacked visual representation with the value related to triggering activation trigger events for all instances of the event data obtained in querying the discoverable event stream. For example, when a comparison function is selected for one of the stacked visual representations, this may cause event trigger computing component 2008 to generate and display a new stacked visual representation, or at least a pane in a current stacked visual representation, that shows the count of number of triggerings of an activation trigger event that would occur at each time instance represented in the multiple stacked visual representations for the selected comparison. This information may be useful to allow a user to assess if the current comparison would cause an undesirable number of events being triggered.

In method 2100, optionally at action 2112, a list of indicators for each of the multiple stacked visual representations can be displayed. In an example, card generating component 2002, e.g., in conjunction with processor 102, memory 104, operating system 106, UI component 126, etc., can display the list of indicators for each of the multiple stacked visual indications (e.g., in an author assistance pane). For example, the indicators can be links, interaction with which can cause the UI to display an associated stacked visual representation.

In method 2100, optionally at action 2114, one or more recommendations for an activation event trigger, a modeling of the event data, or a data management policy can be displayed. In an example, recommending component 2010, e.g., in conjunction with processor 102, memory 104, operating system 106, UI component 126, etc., can display one or more recommendations for the activation event trigger, the modeling of the event data, or the data management policy. For example, recommending component 2010 can generate or obtain recommendations for providing via the UI, which may be received from the query component 122 as described. For example, the recommendations may be based on knowledge of the queries in one or more models in model store 130, results of queries, and/or the like. In one example, recommending component 2010 can recommend adjusting a comparison for an activation trigger event where a current comparison causes a high number of activation trigger events being inserted into the discoverable event stream 114. In another example, recommending component 2010 can recommend modeling a certain property in event data in the discoverable event stream that has high variability over time, or otherwise adding or modifying a model based on a variability of a value of a property. In another example, recommending component 2010 can recommend modification to data retention times in a data retention policy based on time windows associated with queries, as described.

FIGS. 22-30 illustrate examples of UIs that can be displayed via UI component 126, and/or one or more components thereof, for interaction therewith to establish one or more models of event data, corresponding activation trigger events, etc. in the discoverable event stream. The UI component 126 can use the query component 122 to collect event data for representing on the UIs, performing optimizations for improved results times for the event data represented on the UIs, etc., as described above.

Figure 22:
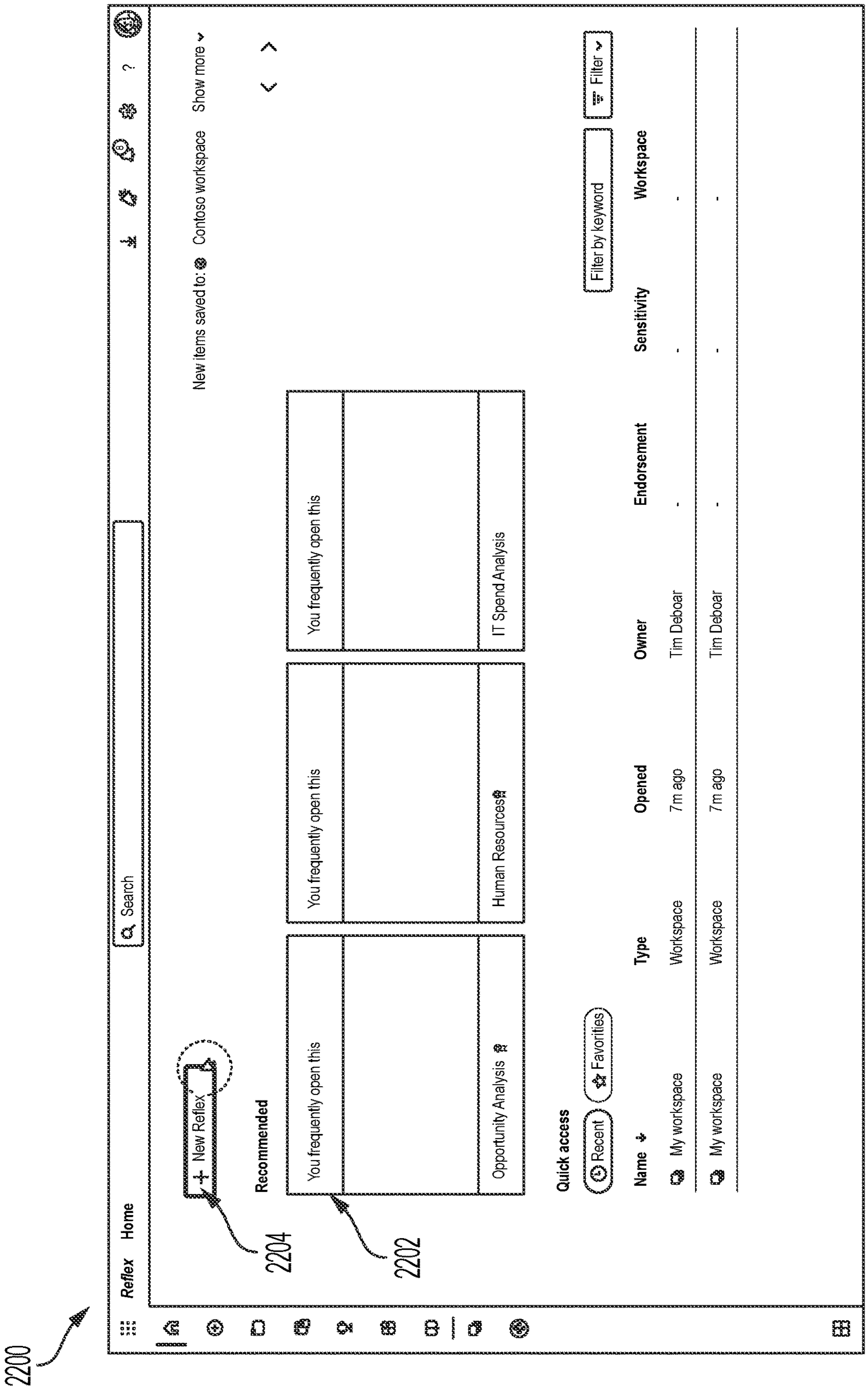
FIG. 22 illustrates an example of a UI including one or more recommendations, in accordance with aspects described herein.

FIG. 22 illustrates an example of a UI 2200 including one or more recommendations 2202, such as to open certain data models, and a selectable option 2204 to add a new event data model.

Figure 23:
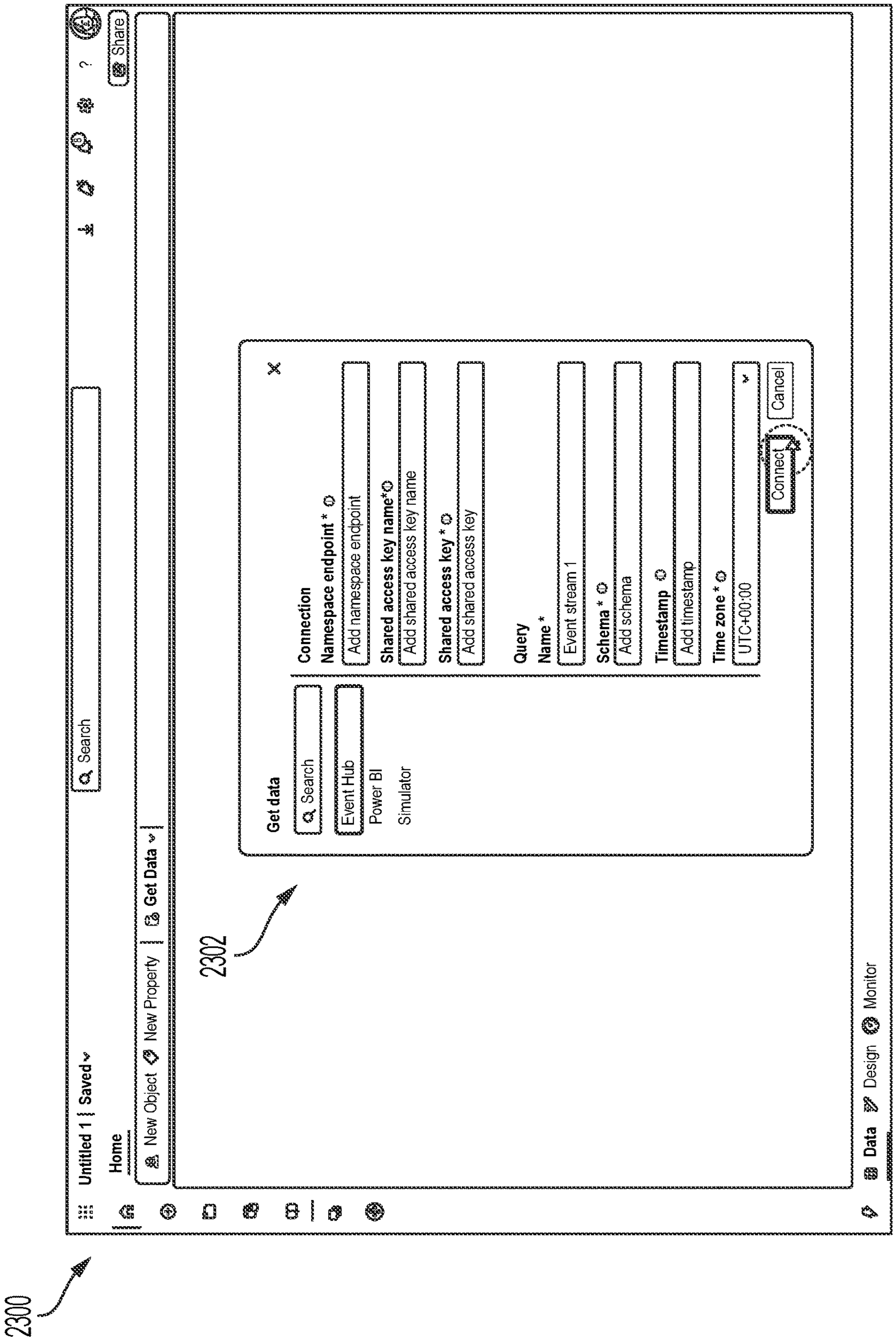
FIG. 23 illustrates an example of a UI that may be displayed for adding a new event data model, in accordance with aspects described herein.

FIG. 23 illustrates an example of a UI 2300 that may be displayed for adding a new event data model. UI 2300 includes a data input box 2302 to allow for specifying object data to be modeled by the UI component 126. For example, data input box 2302 can include fields for a namespace end point, which can allow for filtering event data in the discoverable event stream 114 based on a namespace, a shared access key name and/or key that can allow for retrieving the event data from the discoverable event stream 114, and one or more query parameters. The query parameters can include a query name, schema for values to be obtained in the query, a timestamp and/or time zone.

FIG. 24 illustrates an example of a UI 2400 that may be displayed based on the query indicated in UI 2300. UI 2400 can include a table of event data 2402 retrieved from the discoverable event stream 114 for the query indicated in UI 2300. In one specific example, as shown in FIG. 24, the table of event data 2402 can include certain fields of the data as received from a data source, such as event ID, event time, freezer ID (where the events relate to freezer appliances in this specific example), interior temperature and humidity measured for a freezer at each event, ambient temperature and humidity measured for a freezer at each event, status code for a freezer at each event, store ID where the freezer at each event is located, etc. In an example, UI 2400 can allow for interaction for a user to specify which field can be used as an object identifier for modeling this event data. In an example, freezer ID can be selected as the object identifier. In addition, for example, UI 2400 can allow for interaction for a user to specify which field(s) can be used as properties for event data modeling. In an example, interior temperature can be selected as a property to be modeled. In an example, query component 122 can query the discoverable event stream 114 or event source (e.g., a data source connection) for the event data 112.

Figure 25:
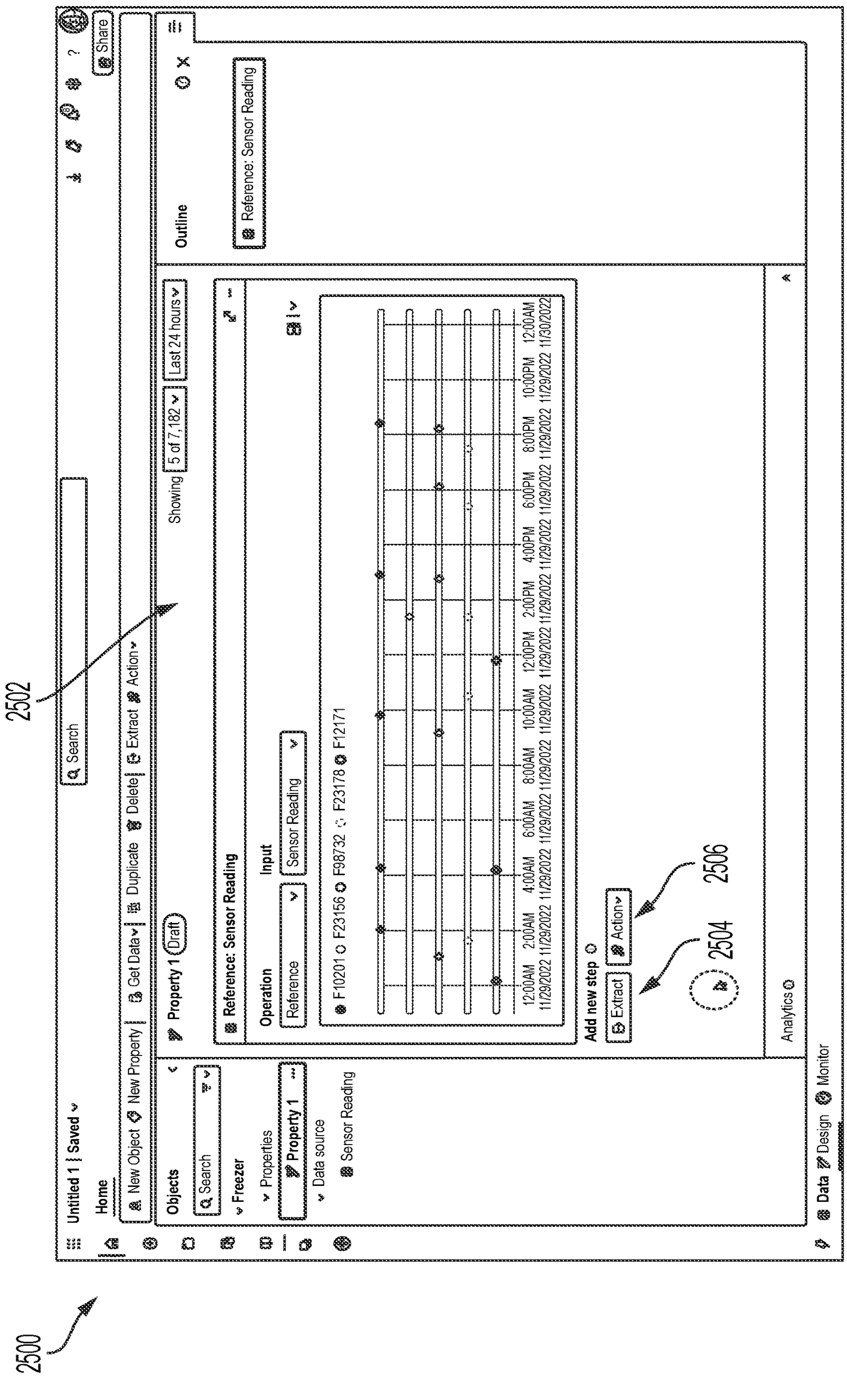
FIG. 25 illustrates an example of a UI that may be displayed based on selecting the object identifier, in accordance with aspects described herein.

FIG. 25 illustrates an example of a UI 2500 that may be displayed based on selecting the object identifier. UI 2500 includes a visual representation 2502 of the event data for the property and the object ID, which in the above example can include a freezer ID and a corresponding interior temperature reported over time (in a time series). As described above, for example, a sample data obtaining component 2006 can obtain the sample of the instances, less than all instances, for displaying on UI 2500. For example, additional instances shown in UI 2400 are not included in the selection of five objects selected for UI 2500, such to allow further adjusting the model without having to view all of the available data. This can provide a simplified view of the representative event data for more intuitive modeling without having to view all the instances of event data. In an example, card generating component 2002 can generate the UI as a first visual representation 2502 along with options for further modeling the data, including an "Extract" option 2504, and one or more "Action" options 2506, such as adding an activation trigger event for the displayed event data.

Figure 26:
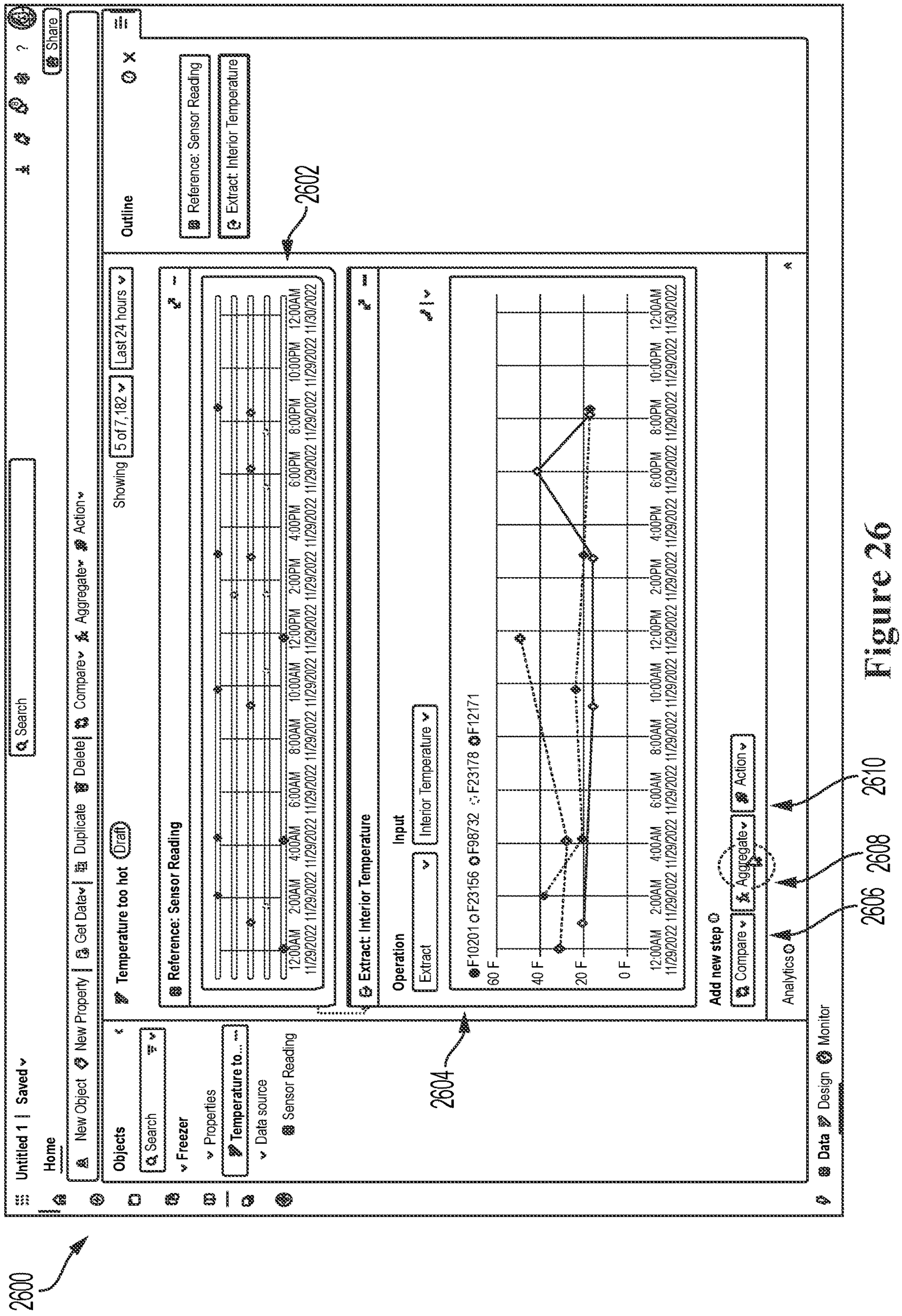
FIG. 26 illustrates an example of a UI that may be displayed for extracting values of a property of an object, in accordance with aspects described herein.

FIG. 26 illustrates an example of a UI 2600 that may be displayed for extracting values of a property of an object. For example, UI 2600 can be displayed based on selecting the Extract option 2504 in UI 2500. UI 2600 can include an indication of the previous visual representation 2602 and a new visual representation 2604 displaying an extracted view of the property of the object. The visual representations 2602 and 2604 can be referred to herein as stacked visual representations, and/or cards that are generated via the UI component 126. Visual representation 2604 can be for the Extract operation and can display the values of the property (e.g., interior temperature) of the objects (e.g., the selection of freezers) on a graph having time on the horizontal axis and range of values on the vertical axis, where each object can be represented by a different color and the values for a given object can be connected by lines to show variance in the value for the property of the given object over time. In an example, visual representation 2604 can only display values that have changed within the depicted time window, and as such, no data is shown for some object IDs. In an example, as described, data formatting component 2004 can generate the format of the event data to be in graph form based at least in part on the property having a numeric type of value. UI 2600 can also include a "Compare" option 2606 for comparing the values of the property in a new visual representation, an "Aggregate" option 2608 for aggregating the values of the property in a new visual representation, and one or more "Action" options 2610, such as adding an activation trigger event for the displayed event data.

Figure 27:
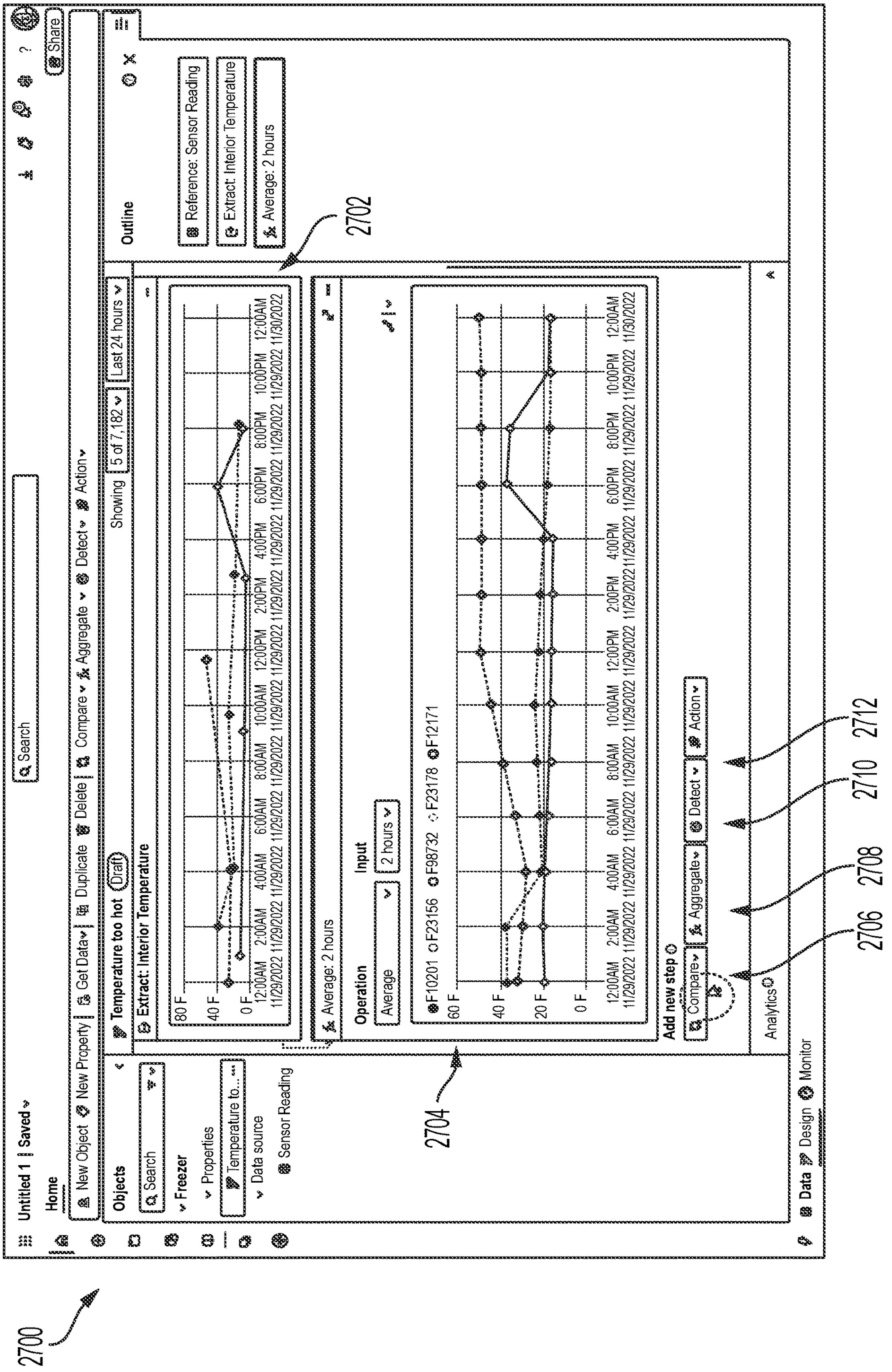
FIG. 27 illustrates an example of a UI that may be displayed for aggregating values of a property of an object over instances of time, in accordance with aspects described herein.

FIG. 27 illustrates an example of a UI 2700 that may be displayed for aggregating values of a property of an object over instances of time. UI 2700 can include an indication of the previous visual representation 2702 and a new visual representation 2704 displaying values for the property of an object as aggregated in specific time instances (e.g., rather than as the value changes) such to normalize the values for the property in the specific time instances. Visual representation 2704 can be for the Aggregate operation and can display the values of the property (e.g., interior temperature) of the objects (e.g., the selection of freezers) on a graph at each of multiple time instances, having time on the horizontal axis and range of values on the vertical axis, where each object can be represented by a different color and the values for a given object can be connected by lines to show variance in the value for the property of the given object over time. In an example, visual representation 2704 can only display values that have changed within the depicted time window, and as such, no data is shown for some object IDs. In an example, as described, data formatting component 2004 can generate the format of the aggregated event data to be in graph form based at least in part on the property having a numeric type of value. UI 2700 can also include a "Compare" option 2706 for comparing the values of the property in a new visual representation, an "Aggregate" option 2708 for aggregating the values of the property in a new visual representation, a "Detect" option 2710 for detecting certain specific values of the property, and one or more "Action" options 2712, such as adding an activation trigger event for the displayed event data.

Figure 28:
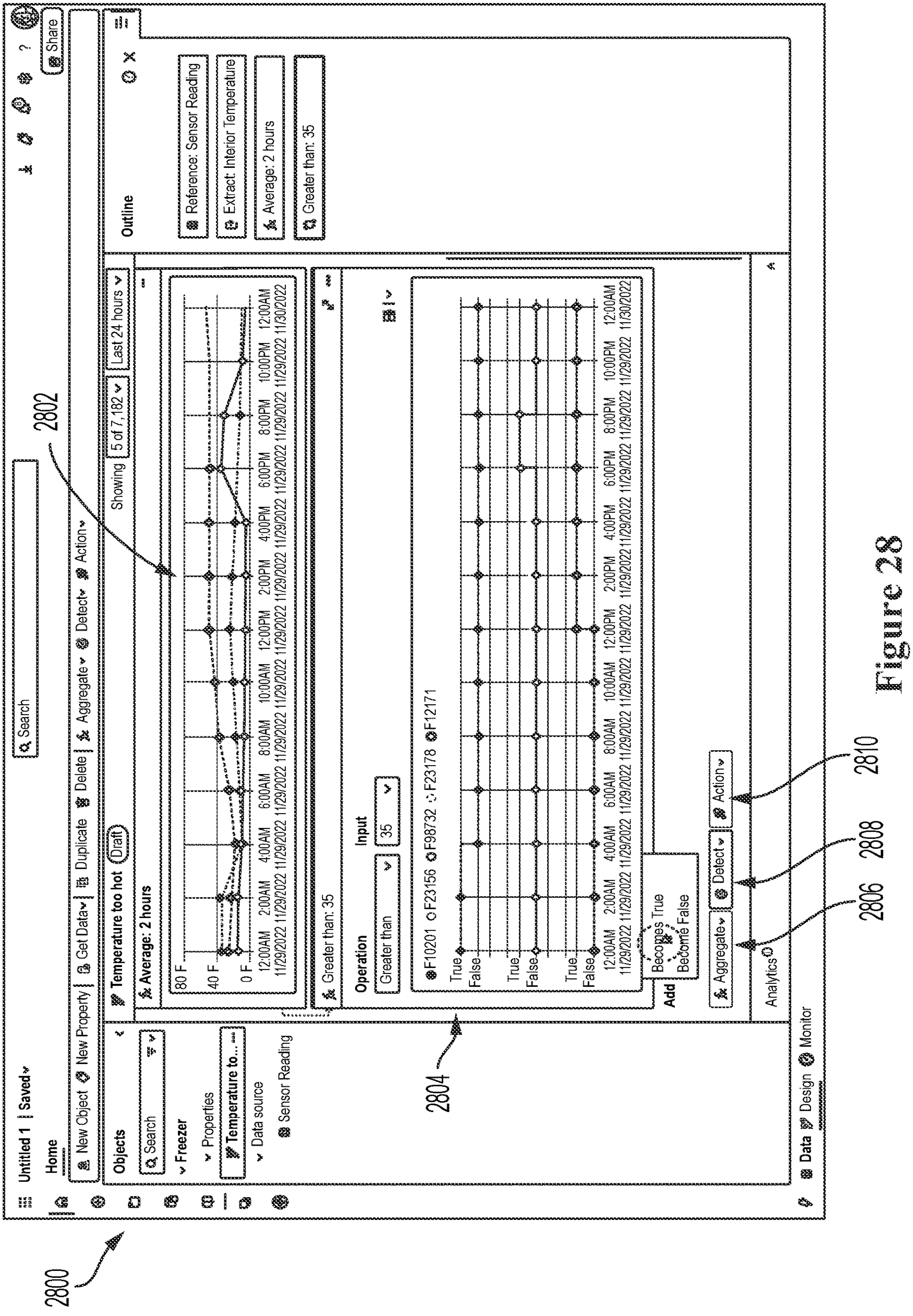
FIG. 28 illustrates an example of a UI that may be displayed for comparing values of a property of an object to a threshold value, in accordance with aspects described herein.

FIG. 28 illustrates an example of a UI 2800 that may be displayed for comparing values of a property of an object to a threshold value. UI 2800 can include an indication of the previous visual representation 2802 and a new visual representation 2804 displaying comparison results of the value for the property of an object to a threshold over specific time instances. Visual representation 2804 can be for the Compare operation and can display, for each given object, the comparison results of the values of the property (e.g., interior temperature) of the objects (e.g., the selection of freezers) to a threshold as a binary value of whether the values are greater than the threshold (e.g., True or False) on a graph at each of multiple time instances. The graph can have time on the horizontal axis and the objects on the vertical axis where a value for each object can be True (e.g., the comparison for the value in the time instance is true) or False (e.g., the comparison for the value in the time instance is false). In an example, as described, data formatting component 2004 can generate the format of the comparison event data to be in a True/False representation for each object based at least in part on the Comparison property of the visual representation 2804. UI 2800 can also include an "Aggregate" option 2806 for aggregating the values of the property in a new visual representation, a "Detect" option 2808 for detecting certain specific values of the property, and one or more "Action" options 2810, such as adding an activation trigger event for the displayed event data.

Figure 29:
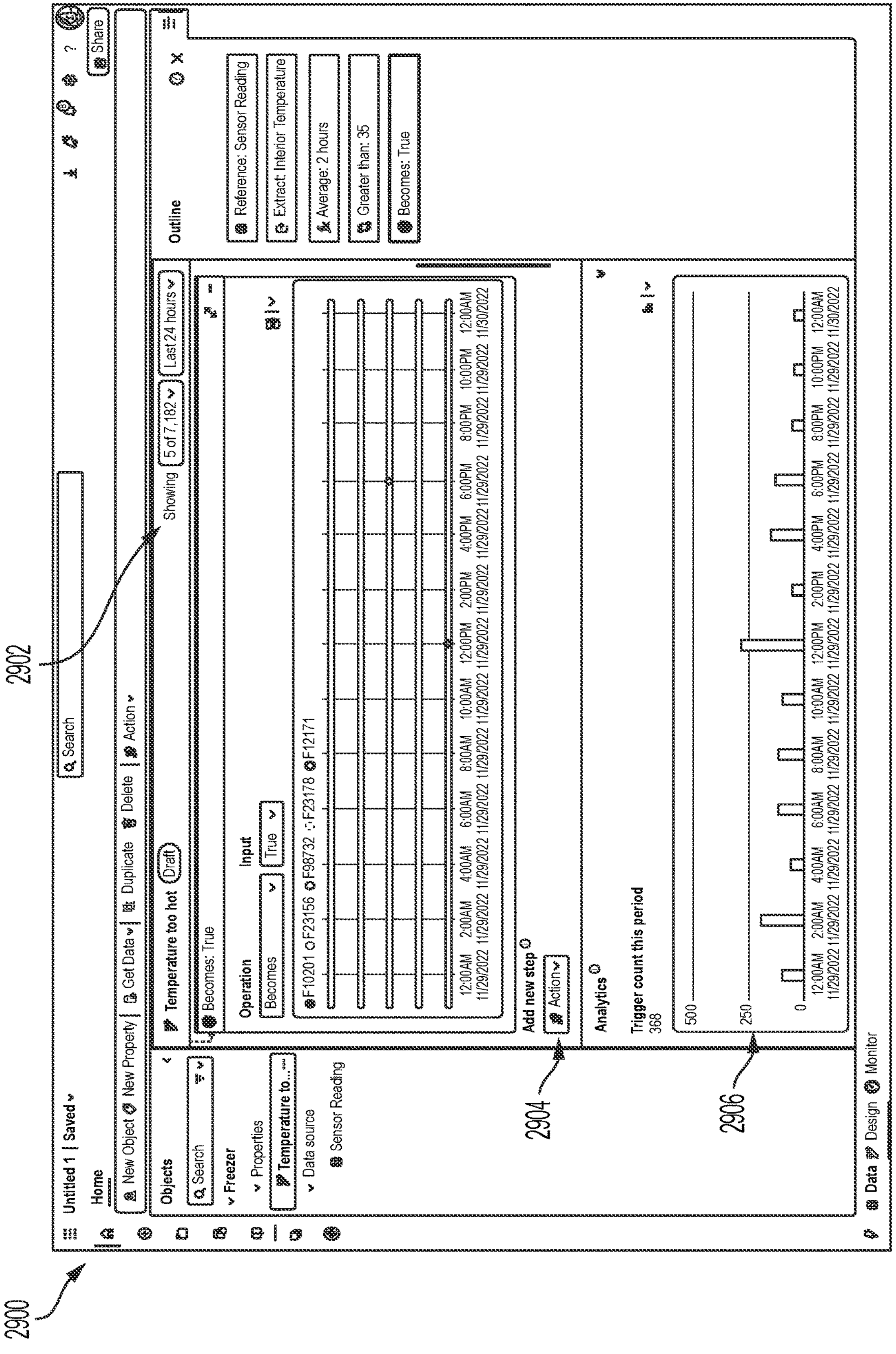
FIG. 29 illustrates an example of a UI that may be displayed for indicating a detected value related to a property of an object, in accordance with aspects described herein.

FIG. 29 illustrates an example of a UI 2900 that may be displayed for indicating a detected value related to a property of an object. UI 2900 can include a new visual representation 2902 displaying detection results for data of the previous visual representation 2804. For example, visual representation 2902 can be for the Detect operation performed over the previous compare results associated with visual representation 2804. Visual representation 2902 can display, for each given object where the comparison result becomes true, the time instance where the comparison result of the value of the property to the threshold becomes true. The graph can have time on the horizontal axis and the objects on the vertical axis showing time instances where the comparisons for each object's property value to the threshold becomes true. In an example, as described, data formatting component 2004 can generate the format of the detected event data to be in a detected value representation for each object based at least in part on the Detect property of the visual representation 2902. UI 2900 can also include one or more "Action" options 2904, such as adding an activation trigger event for the displayed event data. UI 2900 can also include a trigger count pane 2906 showing how many triggers would be generated over all instances of the event data in the discoverable event stream 114 for the object based on the current modeling of data. In this example, the trigger count pane 2906 can indicate, based on all instances of the event data, a total count of objects having the comparison result of the property value to the threshold becoming true in each time instance, which can provide an indication of a possible number of events that would be triggered based on detecting this comparison result in the data model.

Figure 30:
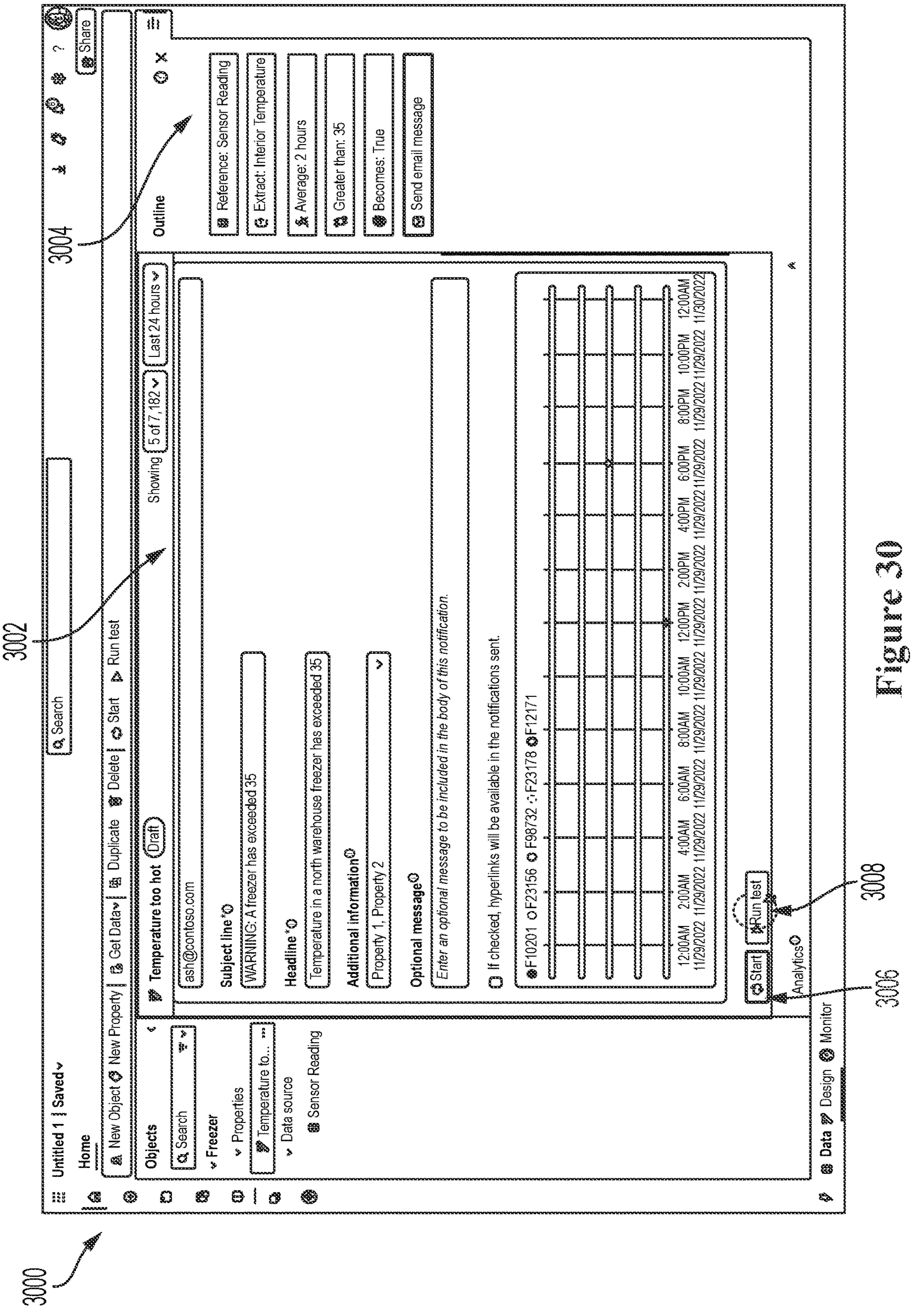
FIG. 30 illustrates an example of a UI that may be displayed for specifying an activation trigger event for a positive comparison result for a detected value related to a property of an object, in accordance with aspects described herein.

FIG. 30 illustrates an example of a UI 3000 that may be displayed for specifying an activation trigger event for a positive comparison result for a detected value related to a property of an object. UI 3000 can include an activation trigger event defining pane 3002 displaying options for creating an activation trigger event for True results of a comparison associated with visual representation 2902. For example, UI 3000 can present the activation event trigger defining pane 3002 based on selecting the Action option 2904 in UI 2900. Pane 3002 can include an activation trigger event for an email type, including inputs for a To address, a Subject Line, a Headline, Additional Information from the event data (e.g., property values to display), a Message box, etc. UI 3000 can also include an author assistance pane 3004 that can include indications of each of the stacked visual representations, interaction with which can cause display of the corresponding visual representation. Other UIs described above, such as UIs 2500, 2600, 2700, 2800, and 2900, can include similar author assistance panes as shown, at each step of adding stacked visual representations. UI 3000 can also include a Start option 3006 and a Run Test option 3008 The Run Test option 3008 can initiate the activation trigger event.

The Start option 3006 can cause the model to be stored in model store 130. The model can be stored in a script language or other representation that can be processed by the query component 122. For example, the model can include queries to obtain each stacked visual representation of the event data, and to add the activation trigger event to the discoverable event stream 114 when a corresponding comparison result becomes true, in the specific examples described above. In one example, storing the model in the model store 130 can also cause ingestion component 120 to ingest data source event data 112 into the discoverable event stream 114 based on the object identifier specified in UI 2400, and including corresponding properties specified in UI 2400, adding a timestamp and/or other fields from a common schema, etc. In an example, once the data is ingested, query component 122 can execute the queries for the model in certain time instances (e.g., periodically or according to other triggers, which may also be specified using a UI provided by UI component 126). In addition, for example, for at least the comparison result portion of the model, UI component 126 can generate a query for adding the comparison result data to the discoverable event stream 114 in a change function, where the change in value can be detected and/or may trigger an activation trigger event, in accordance with aspects described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly included and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method comprising:

identifying a namespace associated with an activation trigger;

identifying a plurality of time-series based events of a discoverable event stream associated with the namespace, wherein the discoverable event stream includes the plurality of time-series based events, received from multiple objects, in a single stream ordered by time;

determining that an activation rule is met over the plurality of time-series based events;

publishing an activation trigger event to the discoverable event stream, the activation trigger event including a generic activation identifier identifying an action to perform, and an actor identifier identifying an actor to perform the action;

obtaining, based on monitoring the discoverable event stream, the activation trigger event via the discoverable event stream, the activation trigger event including the generic activation identifier and the actor identifier;

generating, based on the generic activation identifier and the actor identifier, an activation instruction event for causing an action associated with the generic activation identifier at an actor corresponding to the actor identifier, including mapping a field within the activation instruction event to a configuration value within the activation trigger event to which the field corresponds;

configuring, based on the activation trigger event, the activation instruction event to trigger the action at the actor; and transmitting the activation instruction event to the actor based on the actor identifier.

2. The method of claim 1, wherein the generic activation identifier identifies at least one of sending a notification, sending a state change instruction to an external device, sending a state change instruction to an external system, sending an invocation instruction to an external system, sending an invocation instruction to a data processing system, or sending an analysis instruction to a data processing system.

3. The method of claim 1, wherein generating the activation instruction event for causing the action comprises:

identifying a collection of commands associated with the actor; and selecting, from the collection of commands, a command for the activation instruction event.

4. The method of claim 1, wherein configuring the activation instruction event comprises:

detecting a presence of a parameterized value within the activation trigger event;

identifying a parameterized value field of the activation instruction event that corresponds to the parameterized value;

determining a static value for the parameterized value field based on the parameterized value; and mapping the parameterized value field to the static value within the activation instruction event.

5. The method of claim 4, wherein the parameterized value is a role and/or role group, and the static value is one or more communication addresses.

6. The method of claim 1, wherein generating the activation instruction event comprises:

detecting a presence of the configuration value within the activation trigger event;

identifying the field of the activation instruction event that corresponds to the configuration value.

7. The method of claim 1, wherein activation instruction event is a first activation instruction event, the action is a first action, and further comprising:

generating a second activation instruction event for causing a second action associated with the actor;

identifying a conflict between the first action and the second action; and determining, based on the conflict, not to send the second activation instruction event to the actor.

8. The method of claim 1, wherein the activation trigger event is a first activation trigger event, activation instruction event is a first activation instruction event, and further comprising:

receiving a second activation trigger event via the discoverable event stream;

identifying a conflict between the first activation trigger event and the second activation trigger event; and determining, based on the conflict, not to generate a second activation instruction event corresponding to the second activation trigger event.

9. The method of claim 1, wherein the activation instruction event causes the actor to perform the action, and generate an activation event corresponding to the action within the discoverable event stream.

10. The method of claim 1, further comprising:

identifying the plurality of time-series based events of the discoverable event stream that triggered the activation rule;

determining explainability information based on the plurality of time-series based events, the explainability information identifying an importance value of the plurality of time-series based events; and presenting the explainability information via a graphical user interface.

11. The method of claim 10, further comprising:

generating a tree structure representing one or more activation rules including the activation rule, and wherein determining the explainability information comprises determining the explainability information based on a relationship between the activation rule and other activation rules within the tree structure.

12. An apparatus, comprising:

a memory; and a processor coupled with the memory and configured to:

identify a namespace associated with an activation trigger;

identify a plurality of time-series based events of a discoverable event stream associated with the namespace, wherein the discoverable event stream includes the plurality of time-series based events, received from multiple objects, in a single stream ordered by time;

determine that an activation rule is met over the plurality of time-series based events;

publish an activation trigger event to the discoverable event stream, the activation trigger event including a generic activation identifier identifying an action to perform, and an actor identifier identifying an actor to perform the action;

obtain, based on monitoring the discoverable event stream, the activation trigger event via the discoverable event stream, the activation trigger event including the generic activation identifier and the actor identifier;

generate, based on the generic activation identifier and the actor identifier, an activation instruction event for causing an action associated with the generic activation identifier at an actor corresponding to the actor identifier, including mapping a field within the activation instruction event to a configuration value within the activation trigger event to which the field corresponds;

configure, based on the activation trigger event, the activation instruction event to trigger the action at the actor; and transmit the activation instruction event to the actor based on the actor identifier.

13. The apparatus of claim 12, wherein the activation instruction event is a first activation instruction event, the action is a first action, and wherein the processor is further configured to:

generate a second activation instruction event for causing a second action associated with the actor;

identify a conflict between the first action and the second action; and determine, based on the conflict, not to send the second activation instruction event to the actor.

14. The apparatus of claim 12, wherein the activation trigger event is a first activation trigger event, the activation instruction event is a first activation instruction event, and wherein the processor is further configured to:

receive a second activation trigger event via the discoverable event stream;

identify a conflict between the first activation trigger event and the second activation trigger event; and determine, based on the conflict, not to generate a second activation instruction event corresponding to the second activation trigger event.

15. The apparatus of claim 12, wherein the processor is further configured to:

identify the plurality of time-series based events of the discoverable event stream that triggered the activation rule;

determine explainability information based on the plurality of time-series based events, the explainability information identifying an importance value of the plurality of time-series based events; and present the explainability information via a graphical user interface.

16. The apparatus of claim 12, wherein the generic activation identifier identifies at least one of sending a notification, sending a state change instruction to an external device, sending a state change instruction to an external system, sending an invocation instruction to an external system, sending an invocation instruction to a data processing system, or sending an analysis instruction to a data processing system.

17. The apparatus of claim 12, wherein the processor is configured to generate the activation instruction event for causing the action including:

identifying a collection of commands associated with the actor; and selecting, from the collection of commands, a command for the activation instruction event.

18. The apparatus of claim 12, wherein the processor is configured to configure the activation instruction event including:

detecting a presence of a parameterized value within the activation trigger event;

identifying a parameterized value field of the activation instruction event that corresponds to the parameterized value;

determining a static value for the parameterized value field based on the parameterized value; and mapping the parameterized value field to the static value within the activation instruction event.

19. A non-transitory computer-readable device having instructions thereon that, when executed by at least one computing device, causes the at least one computing device to perform operations comprising:

identifying a namespace associated with an activation trigger;

identifying a plurality of time-series based events of a discoverable event stream associated with the namespace, wherein the discoverable event stream includes the plurality of time-series based events, received from multiple objects, in a single stream ordered by time;

determining that an activation rule is met over the plurality of time-series based events;

publishing an activation trigger event to the discoverable event stream, the activation trigger event including a generic activation identifier identifying an action to perform, and an actor identifier identifying an actor to perform the action;

obtaining, based on monitoring the discoverable event stream, the activation trigger event via the discoverable event stream, the activation trigger event including the generic activation identifier and the actor identifier;

generating, based on the generic activation identifier and the actor identifier, an activation instruction event for causing an action associated with the generic activation identifier at an actor corresponding to the actor identifier, including mapping a field within the activation instruction event to a configuration value within the activation trigger event to which the field corresponds;

configuring, based on the activation trigger event, the activation instruction event to trigger the action at the actor; and transmitting the activation instruction event to the actor based on the actor identifier.

20. The non-transitory computer-readable device of claim 19, wherein the operations further comprise:

identifying the plurality of time-series based events of the discoverable event stream that triggered the activation rule;

determining explainability information based on the plurality of time-series based events, the explainability information identifying an importance value of the plurality of time-series based events; and presenting the explainability information via a graphical user interface.

* * * * *